US010552215B1

(12) United States Patent
Xu

(10) Patent No.: US 10,552,215 B1
(45) Date of Patent: Feb. 4, 2020

(54) SYSTEM AND METHOD OF HANDLING REAL-TIME PROCESS OVERRUNS ON A MULTIPROCESSOR

(71) Applicant: Jia Xu, Toronto (CA)

(72) Inventor: Jia Xu, Toronto (CA)

( * ) Notice: Subject to any disclaimer, the term of this patent is extended or adjusted under 35 U.S.C. 154(b) by 206 days.

(21) Appl. No.: 15/669,898

(22) Filed: Aug. 5, 2017

(51) Int. Cl.
*G06F 9/48* (2006.01)
*G06F 9/52* (2006.01)

(52) U.S. Cl.
CPC .......... *G06F 9/4887* (2013.01); *G06F 9/4812* (2013.01); *G06F 9/526* (2013.01); *G06F 2209/485* (2013.01)

(58) Field of Classification Search
None
See application file for complete search history.

(56) References Cited

U.S. PATENT DOCUMENTS

| | | | | |
|---|---|---|---|---|
| 5,671,361 A * | 9/1997 | Brown | ................... | G06Q 10/06 705/7.23 |
| 6,085,218 A * | 7/2000 | Carmon | .............. | G06F 11/0757 708/100 |
| 6,189,022 B1 * | 2/2001 | Binns | ................... | G06F 9/4887 718/100 |
| 6,230,303 B1 * | 5/2001 | Dave | ..................... | G06F 9/4881 716/105 |
| 6,349,321 B1 * | 2/2002 | Katayama | ............. | G06F 9/4881 718/102 |
| 6,438,573 B1 * | 8/2002 | Nilsen | ...................... | G06F 8/10 718/100 |
| 6,964,048 B1 * | 11/2005 | Isham | ................... | G06F 9/4887 718/100 |
| 7,140,022 B2 * | 11/2006 | Binns | ..................... | G06F 9/4887 718/105 |
| 7,302,685 B2 * | 11/2007 | Binns | ..................... | G06F 9/4887 370/415 |
| 7,444,638 B1 * | 10/2008 | Xu | ........................ | G06F 9/4887 718/100 |

(Continued)

OTHER PUBLICATIONS

Koran, 1995, "Dover: an optimal on-line scheduling algorithm for overloaded uniprocessor real-time systems," SIAM Journal on Computing, vol. 24, No. 2, pp. 318-339.

(Continued)

*Primary Examiner* — Isaac T Tecklu

(57) ABSTRACT

A system and method are provided to allow real-time processes to overrun on a single processor or on a multiprocessor until either the latest start time of another real-time process has been reached or their own deadlines have been reached, and effectively utilize multiple processor resources by allowing process executions to be selectively preempted by other process executions and migrate from one processor to another processor at any time at run time to provide greater flexibility in utilizing any unused processor capacity and meeting deadlines, thus increase the chances that real-time processes will still be able to complete their computations despite overrunning, while guaranteeing satisfaction of important predetermined timing constraints, and increase both processor utilization and system robustness in the presence of inaccurate estimates of the worst-case computation times of real-time processes on a single processor or multiprocessor in a real-time system.

12 Claims, 39 Drawing Sheets

(56) References Cited

U.S. PATENT DOCUMENTS

| | | | | |
|---|---|---|---|---|
| 7,484,067 | B1* | 1/2009 | Bollella | G06F 12/0269 707/999.202 |
| 7,613,595 | B2 | 11/2009 | MacLay | |
| 8,321,065 | B2* | 11/2012 | Kirchhof-Falter | G06F 9/4887 701/1 |
| 2002/0138542 | A1* | 9/2002 | Bollella | G06F 9/4887 718/102 |
| 2002/0194048 | A1* | 12/2002 | Levinson | G06Q 10/06311 705/7.26 |
| 2006/0079979 | A1* | 4/2006 | Giebels | G05B 19/41865 700/96 |
| 2006/0200795 | A1* | 9/2006 | MacLay | G06F 9/455 717/106 |
| 2009/0013322 | A1 | 1/2009 | MacLay | |
| 2013/0318506 | A1* | 11/2013 | Sohm | G06F 11/323 717/128 |
| 2014/0365992 | A1* | 12/2014 | MacLay | G06F 9/4887 717/104 |
| 2015/0006226 | A1* | 1/2015 | Smith | G06Q 10/06313 705/7.23 |

OTHER PUBLICATIONS

Gardner, 1999, "Performance ofcalgorithms for scheduling real-time systems with overrun and overload," Proc. 11th Euromicro Conference on Real-Time Systems, pp. 9-11.

Lehoczky, 1995, "The deferrable server algorithm for enhanced aperiodic responsiveness in hard real-time environments," IEEE Trans. On Computers, vol. 44, No. 1, pp. 73-91.

Shen, 1993, "Resource reclaiming in multiprocessor real-time systems," IEEE Tran. on Par. and Distr. Sys., vol. 4, n. 4, pp. 382-397.

Sprunt, 1989, "Aperiodic process scheduling for hard real-time systems," Journal of Real-Time Systems, vol. 1, pp. 27-60.

Stewart, 1997, "Mechanisms for detecting and handling timing errors," Communications of the ACM, vol. 40, No. 1, pp. 87-90.

Zhang, 2003, "Handling overruns and underruns in preruntime scheduling in hard real-time systems," M. Sc. Thesis, York University, Toronto, Canada.

Lin, 2005, "Improving soft real-time performance through better slack reclaiming," Proc. 26th IEEE Real-Time Systems Symposium, Miami, pp. 410-420.

Caccamo, 2005, "Efficient reclaiming in reservation-based real-time systems with variable execution times," IEEE Tran. Computers, vol. 54, n. 2, pp. 198-213.

Xu, 1993, "Multiprocessor scheduling of processes with release times, deadlines, precedence, and exclusion relations," IEEE Trans. on Software Engineering, vol. 19, pp. 139.

Xu, 2003, "On inspection and verification of software with timing requirements," IEEE Trans. on Software Engineering, vol. 29 (8), pp. 705-720.

Xu, 1990, "Scheduling processes with release times, deadlines, precedence, and exclusion relations," IEEE Trans. on Software Engineering, vol. 16 (3), pp. 360-369.

Xu, 1993, "On Satisfying Timing Constraints in Hard-Real-Time Systems," IEEE Trans. on Software Engineering, vol. 19 (1), pp. 1-17.

Xu, 2000, "Fixed priority scheduling versus pre-run-time scheduling," Real-Time Systems, vol. 18 (1), pp. 7-23.

Chetto, 1989, "Some results of the earliest deadline scheduling algorithm," IEEE Transactions on Software Engineering, vol. 15 (2), pp. 1261-1269.

Han, 20013, "A fault-tolerant scheduling algorithm for real-time periodic tasks with possible software faults", IEEE Transactions on Computers, vol. 52 (3), pp. 362-372.

Mochocky, 2002, "A realistic variable voltage scheduling model for real-time applications", IEEE/ACM Conference on Computer Aided Design.

Ramamritham, 1984, "Dynamic Task Scheduling in HardReal-Time Distributed systems", IEEE Software, Jul. 1964, pp. 65-75.

Andrei, 2011, "Quasi-Static Voltage Scaling for Energy Minimization with Time Constraints", IEEE Transactions on Very Large Scale Integration (VLSI) Systems, pp. 10-23.

Abdelzaher, 1995, "Optimal Combined Task and Message Scheduling in Distributed Real••Time Systems," IEEE Real-Time Systems Symposium.

Brandt, 2003, "Dynamic integrated scheduling of hard real-time, soft real-time and non-real-time processes," http://ieeexplore.ieee.org/document/1253287.

Stankovic, 1995, "Implications of classical scheduling results for real-time systems", http://ieeexplore.ieee.org/document/386982.

Shepard, 1991, A pre-run-time scheduling algorithm for hard real-time systems, http://ieeexplore.ieee.org/document/83903.

Frederickson, 1983, "Scheduling unit-time tasks with integer release times and deadlines", http://www.sciencedirect.com/science/article/pii/0020019083901175.

Burns, 1991, "Scheduling hard real-time systems a review", http://ieeexplore.ieee.org/document/76598.

* cited by examiner

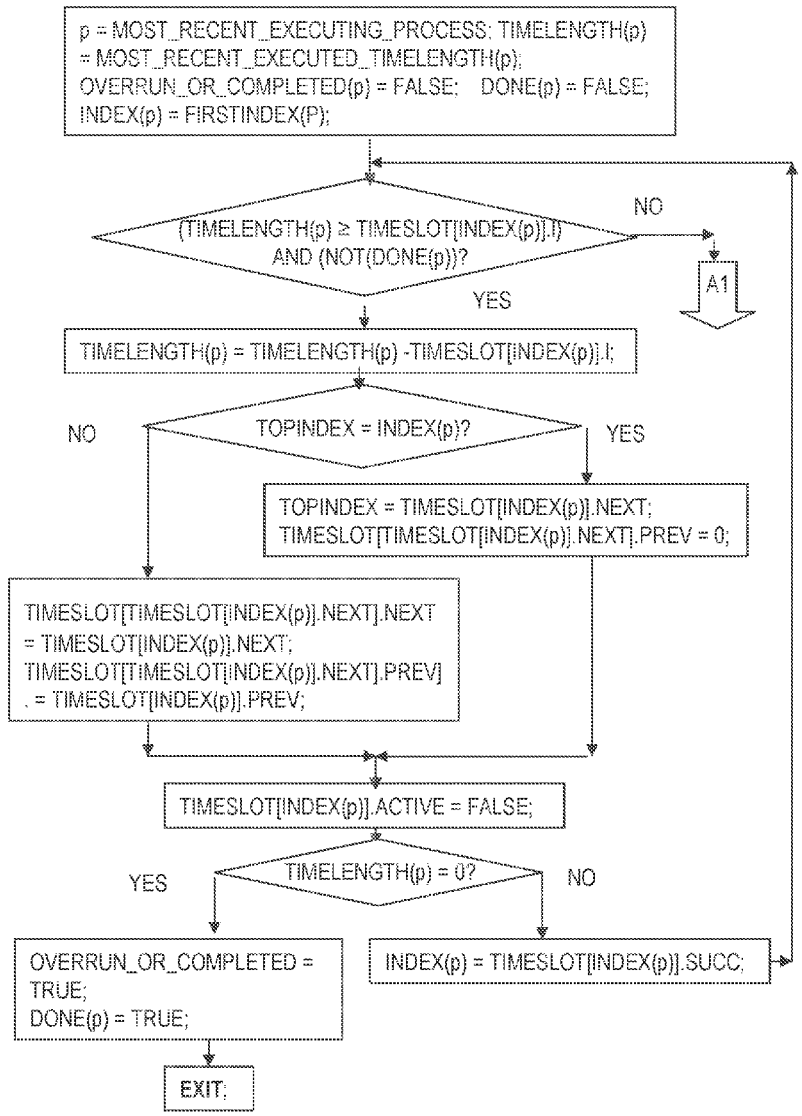

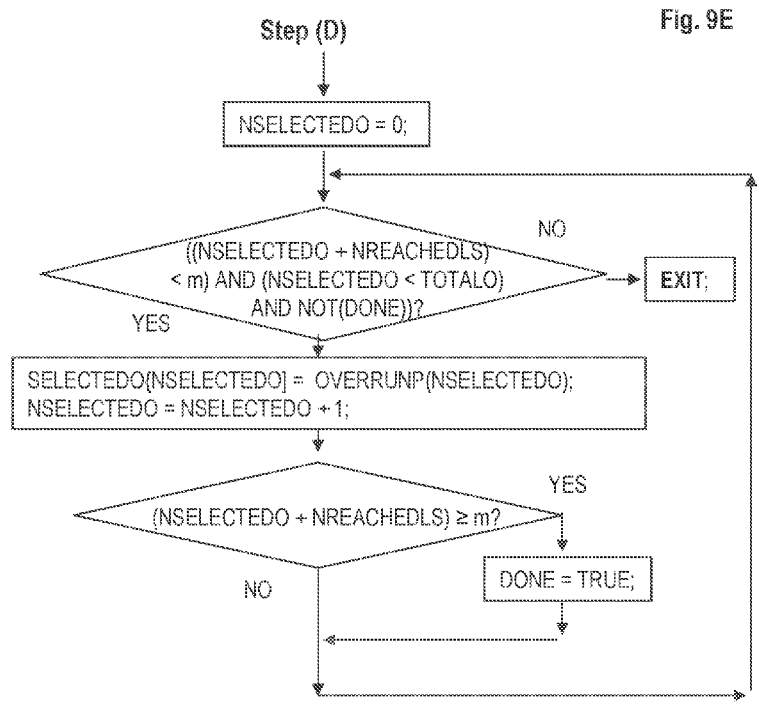

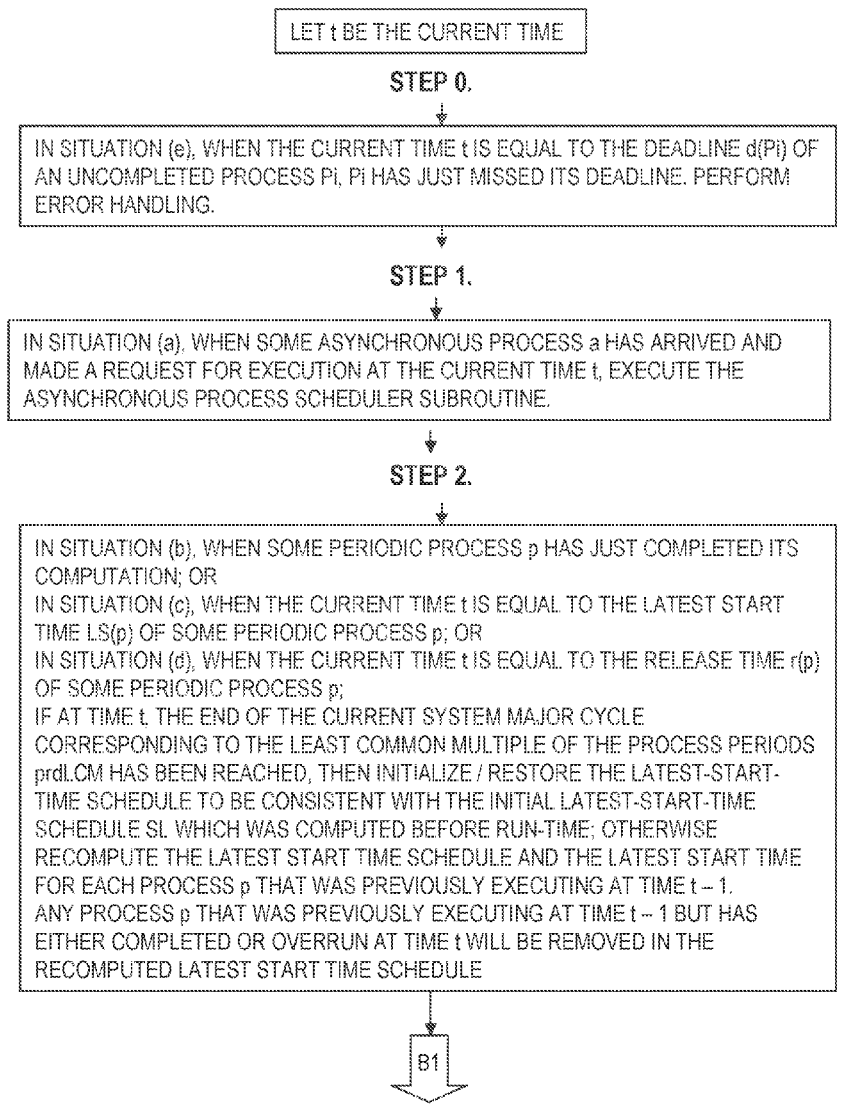

Fig. 9H

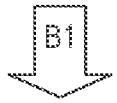

STEP 3.

SELECT UP TO m PROCESSES TO EXECUTE ON THE m PROCESSORS USING THE METHOD IN STEP (C), STEP (D), AND STEP (E)

STEP 4

AT TIME 0 AND AFTER SERVICING EACH TIMER INTERRUPT, AND PERFORMING NECESSARY ERROR DETECTION, ERROR HANDLING, LATEST START TIME RECALCULATIONS, AND MAKING SCHEDULING DECISIONS, RESET THE TIMER TO INTERRUPT AT THE EARLIEST TIME THAT ANY OF THE EVENTS/SITUATIONS (c), (d) AND (e) ABOVE MAY OCCUR.

STEP 5.

LET THE PROCESSES THAT WERE SELECTED IN STEP 3 START TO EXECUTE AT RUN-TIME t.

END

SYSTEM AND METHOD OF HANDLING REAL-TIME PROCESS OVERRUNS ON A MULTIPROCESSOR

CROSS-REFERENCE TO RELATED APPLICATIONS

This application claims the benefit of Provisional Patent Application No. 62/380,500, filed Aug. 29, 2016, filed by the present inventor, which is hereby incorporated by reference.
Prior application Ser. No. 14/451,420, filed Aug. 4, 2014, prior application Ser. No. 12/285,045, filed Sep. 29, 2008, now U.S. Pat. No. 8,627,319 B1, prior application Ser. No. 11/341,713, filed Jan. 30, 2006, now U.S. Pat. No. 7,444,638, and prior application Ser. No. 09/336,990, filed Jun. 21, 1999, now U.S. Pat. No. 7,165,252 B1, are hereby incorporated by reference.

FEDERALLY SPONSORED RESEARCH

Not Applicable

NAMES OF PARTIES TO A JOINT RESEARCH AGREEMENT

Not Applicable

SEQUENCE LISTING OR PROGRAM

Not Applicable

BACKGROUND PRIOR ART

The following is a tabulation of some prior art that presently appears relevant:

| U.S. patents | | | |
| --- | --- | --- | --- |
| Pat. No. | Kind Code | Issue Date | Patentee |
| 8,321,065 | B1 | 2012 Nov. 27 | Kirchhof-Falter |
| 6,085,218 | B1 | 2000 Jul. 04 | Carmon |
| 7,613,595 | B1 | 2009 Nov. 03 | MacLay |
| 6,189,022 | B1 | 2001 Feb. 13 | Binns |
| 7,302,685 | B1 | 2007 Nov. 27 | Binns |
| 7,140,022 | B1 | 2006 Nov. 21 | Binns |
| 6,964,048 | B1 | 2005 Nov. 08 | Isham |

| U.S. patent application publications | | | |
| --- | --- | --- | --- |
| Publication Nr. | Kind Code | Publ. Date | Applicant |
| 20020138542 | A1 | 2002 Sep. 26 | Bollella |
| 20090013322 | A1 | 2009 Jan. 08 | MacLay |
| 20060200795 | B1 | 2006 Sep. 07 | MacLay |

NONPATENT PUBLICATIONS 1. (Koren et al 1995) Koren, G., and Shasha, D., 1995, "Dover: an optimal on-line scheduling algorithm for overloaded uniprocessor real-time systems," SIAM Journal on Computing, Vol. 24, no. 2, pp. 318-339.
2. (Gardner et al 1999) Gardner, M. K., and Liu, J. W. S., 1999, "Performance of algorithms for scheduling real-time systems with overrun and overload," Proc. 11th Euromicro Conference on Real-Time Systems, University of York, England, pp. 9-11.
3. (Lehoczky et al 1995) Lehoczky, J. P., Sha, L., and Strosnider, J. K., 1995, "The deferrable server algorithm for enhanced aperiodic responsiveness in hard real-time environments," IEEE Trans. On Computers, vol. 44, no. 1, pp. 73-91.
4. (Shen et al 1993) Shen, C., Ramamritham, K., and Stankovic, J. A., 1993, "Resource reclaiming in multiprocessor real-time systems," IEEE Tran. on Par. and Distr. Sys., vol. 4, n. 4, pp. 382-397.
5. (Sprunt et al 1989) Sprunt, B., Sha, L., and Lehoczky, J. P., 1989, "Aperiodic process scheduling for hard real-time systems," Journal of Real-Time Systems, vol. 1, pp. 27-60.
6. (Stewart et al 1997) Stewart, D. B., and Khosla, 1997, "Mechanisms for detecting and handling timing errors," Communications of the ACM, vol. 40, no. 1, pp. 87-90.
7. (Zhang 2003) Zhang, L., 2003, "Handling overruns and underruns in prerun-time scheduling in hard real-time systems," M. Sc. Thesis, York University, Toronto, Canada.
8. (Lin et al 2005) Lin, C., and Brandt, S. A., 2005, "Improving soft real-time performance through better slack reclaiming," Proc. 26th IEEE Real-Time Systems Symposium, Miami, pp. 410-420.
9. (Caccamo et al 2005) Caccamo, M., Buttazzo, G. C., and Thomas, D. C., 2005, "Efficient reclaiming in reservation-based real-time systems with variable execution times," IEEE Tran. Computers, vol. 54, n. 2, pp. 198-213.
10. (Xu 1993) Xu, J., 1993, "Multiprocessor scheduling of processes with release times, deadlines, precedence, and exclusion relations," IEEE Trans. on Software Engineering, Vol. 19 (2), pp. 139-154.
11. (Xu 2003) Xu, J., 2003, "On inspection and verification of software with timing requirements," IEEE Trans. on Software Engineering, Vol. 29 (8), pp. 705-720.
12. (Xu, Parnas 1990) Xu, J. and Parnas, D. L., 1990, "Scheduling processes with release times, deadlines, precedence, and exclusion relations," IEEE Trans. on Software Engineering, Vol. 16 (3), pp. 360-369.
13. (Xu, Parnas 1993) Xu, J. and Parnas, D. L., 1993, "On Satisfying Timing Constraints in Hard-Real-Time Systems," IEEE Trans. on Software Engineering, Vol. 19 (1), pp. 1-17.
14. (Xu, Parnas 2000) Xu, J. and Parnas, D. L., 2000, "Fixed priority scheduling versus pre-run-time scheduling," Real-Time Systems, Vol. 18 (1), pp. 7-23.
15. (Xu 2009) Xu, J., 2019 "Pre-run-time scheduling of asynchronous and periodic processes with offsets, release times, deadlines, precedence and exclusion relations." ASME/IEEE Int. Conf. on Mechatronic and Embedded Systems and Applications, August 2009, San Diego, USA.
16. (Gupta et al 2000) Gupta, I., Manimaran, G. and Siva Ram Murthy, C., 2000, "A new strategy for improving the effectiveness of resource reclaiming algorithms in multiprocessor real-time systems." J. of Parallel and Distributed Computing, 60, pp. 113-133.
17. (Caccamo et al 2005) Caccamo, M., Buttazzo, G. C., and Thomas, D. C., 2005, 'Efficient reclaiming in reservation-based real-time systems with variable execution times," IEEE Tran. Computers, vol. 54, n. 2, pp. 198-213.
18. (Xu 2014) Xu, J., 2014, "A method for handling process overruns and underruns in real-time embedded systems," 10th IEEE/ASME International Conference on Mechatronic and Embedded Systems and Applications, Senigallia, Italy, on Sep. 10-12, 2014.

19. (Xu 2015) Xu, J., 2015, "Efficiently handling process overruns and underruns in real-time em-bedded systems." 11th ASME/IEEE Int. Conf. on Mechatronic and Embedded Systems and Applications, August 2015, Boston, USA.

In operation of a computer system, executions of certain periodically or asynchronously occurring real-time processes must be guaranteed to be completed before specified deadlines, and in addition satisfying various constraints and dependencies, such as release times, offsets, precedence relations, and exclusion relations on either a single processor or a multiprocessor.

Embedded, real-time systems with high assurance requirements often must execute many different types of real-time processes with complex timing and other constraints. Some of the real-time processes may be periodic and some of them may be asynchronous. Some of the real-time processes may have hard deadlines and some of them may have soft deadlines. For some of the real-time processes, especially the hard real-time processes, complete knowledge about their characteristics can and must be acquired before run-time. For other real-time processes, a prior knowledge of their worst case computation time and their data requirements may not be known.

Some real-time processes may have complex constraints and dependencies between them. For example, a real-time process may need to input data that are produced by other real-time processes. In this case, a real-time process may not be able to start before those other real-time processes are completed. Such constraints are referred to herein as precedence relations.

Exclusion relations may exist between real-time processes when some real-time processes must prevent simultaneous access to shared resources such as data and I/O devices by other real-time processes. For some periodic real-time processes, they may not be able to start immediately at the beginning of their periods. In this case, those real-time processes have release time constraints. For some periodic real-time processes, the beginning of their first period may not start immediately from time zero, that is, the system start time. In this case, those real-time processes have offset constraints.

Examples of such systems include plant control systems, aviation control systems, air traffic control systems, satellite control systems, communication systems, multimedia systems, on-line financial service systems, various embedded systems such as for automotive applications, etc.

Systems and methods related to scheduling executions of real-time processes can be broadly divided into two categories:

(a) systems and methods in which determination of the execution schedule of all the real-time processes is done entirely at run-time (on-line); and (b) systems and methods in which a latest-start-time scheduler computes a latest-start-time schedule for a substantial subset of the real-time processes by before run-time (off-line); then at run-time, a run-time scheduler uses information in the latest-start-time schedule together with information that is available at run-time, to schedule the execution of all the real-time processes.

As explained in the article "Fixed priority scheduling versus pre-run-time scheduling," by Xu, J. and Parnas, D. L., Real-Time Systems, Vol. 18 (1), pp. 7-23 (Xu, Parnas 2000), and the article "On inspection and verification of software with timing requirements," by Xu, J., IEEE Trans. on Software Engineering, Vol. 29 (8), pp. 705-720 (Xu 2003), systems and methods that perform all scheduling activities at run-time, have the following disadvantages:

(a) High run-time overhead due to scheduling and context switching;

(b) Difficulty in analyzing and predicting the run-time behavior of the system;

(c) Difficulty in handling various application constraints and real-time process dependencies;

(d) Low processor utilization.

In contrast to conventional approaches where most of the real-time processes are scheduled at run-time, with pre-run-time scheduling the schedule for most of the real-time processes is computed off-line; this approach requires that the major characteristics of the real-time processes in the system be known, or bounded, in advance. It is known that it is possible to use pre-run-time scheduling to schedule periodic real-time processes. One possible technique consists of computing off-line a latest-start-time schedule for the entire set of periodic real-time processes occurring within a time period that is equal to the least common multiple of the periods of the given set of real-time processes, then at run-time, let a run-time scheduler use information in the latest-start-time schedule together with information that is available at run-time, to schedule the real-time process executions.

In pre-run-time scheduling, several alternative schedules may be computed off-line for a given time period, each such schedule corresponding to a different "mode" of operation. A small run-time scheduler can be used to select among the alternative schedules according to information that is available at run-time. This small run-time scheduler can also be used to allocate resources for asynchronous real-time processes that have not been converted into periodic real-time processes.

It is possible to translate an asynchronous real-time process into an equivalent periodic real-time process, if the minimum time between two consecutive requests is known in advance, and the deadline is not too short. Thus it is also possible to schedule such asynchronous real-time processes using pre-run-time scheduling. See U.S. Pat. Nos. 7,444,638, and 7,165,252.

Systems and methods that compute a latest-start-time schedule before run-time, then at run-time, let a run-time scheduler use information in the latest-start-time schedule together with information that is available at run-time, to schedule the real-time process executions, have the following advantages:

(a) ability to effectively handle complex constraints and dependencies;

(b) lower run-time overhead;

(c) higher processor utilization; and (d) ease of predicting the system's behaviour.

In the majority of real-time applications, the bulk of the processing is performed by periodic real-time processes for which the major characteristics of the real-time processes, including offsets, release times, worst-case execution times, deadlines, precedence and exclusion relations, and any other constraints, are known before run-time. For asynchronous real-time processes, generally their worst-case computation times, deadlines, and the minimum time between two consecutive requests (interarrival times) are known in advance. Asynchronous real-time processes normally are few in number, and often can be converted into new periodic real-time processes that can be used to service the corresponding asynchronous real-time process requests in a manner similar to polling. Thus it is not only possible, but highly desirable to compute a pre-run-time schedule for all the periodic real-time processes, including the new periodic real-time processes that are converted from some of the asynchronous real-time processes, before run-time, rather than completely relying on a run-time scheduler to schedule them at run-time.

For the real-time processes whose characteristics are known before run-time, such as periodic real-time processes, one may realize important advantages if a pre-run-time schedule is computed before run-time, instead of completely relying on a run-time scheduler to schedule them at run-time. This is because when scheduling is done before run-time, there is almost no limit on the running time of the scheduler, optimal scheduling methods can be used to maximize the possibility of finding a feasible schedule for the set of real-time processes to be scheduled and to handle complex constraints and dependencies. In contrast, when real-time processes are scheduled at run-time, the time available to the scheduler is very limited. This limits the ability of the scheduler to find a feasible schedule and to take into account the different types of constraints and knowledge about the system real-time processes. Once a pre-run-time schedule for the periodic real-time processes has been computed before run-time, the run-time scheduler can also use this information to schedule asynchronous real-time processes more efficiently.

Other reasons for computing a pre-run-time schedule before run-time include: this greatly reduces the run-time resource requirements needed for scheduling and context switching. With pre-run-time scheduling, it is possible to avoid using sophisticated run-time synchronization mechanisms by directly defining precedence relations and exclusion relations on pairs of real-time process segments to achieve real-time process synchronization and prevent simultaneous access to shared resources. Because the schedule is known in advance, automatic code optimization is possible; one can determine in advance the minimum amount of information that needs to be saved and restored, and one can switch processor execution from one real-time process to another real-time process through very simple mechanisms such as procedure calls, or simply by concatenating code when no context needs to be saved or restored, which greatly reduces the amount of run-time overhead.

When the use of sophisticated run-time synchronization mechanisms is avoided, the benefits are multi-fold: not only is the amount of run-time overhead reduced, but it is also much easier to analyze and predict the run-time behavior of the system. Compared with the complex schedulability analysis required when run-time synchronization mechanisms are used, it is much more straightforward to verify that all real-time processes will meet their deadlines and that all the additional application constraints will be satisfied in an off-line computed schedule.

There has long been an interest in systems and methods for the purpose of automating the process of pre-run-time scheduling, as described in the article by S. R. Faulk and D. L. Parnas "On Synchronization in Hard-Real-time Systems", Commun. ACM vol 31, pp. 274-287, March, 1988. Cyclic executives, a form of pre-run-time scheduling, have been used in safety critical systems, e.g. as described by G. D. Carlow in the article "Architecture of the Space Shuttle Primary Avionics Software System", Commun. ACM, September 1984. However, in the past, cyclic executives have mainly been constructed by hand, and are difficult to construct and maintain. Techniques for transforming an asynchronous real-time process into an equivalent periodic real-time process, as well as methods for solving the problem of scheduling real-time processes with release times, deadlines, exclusion and precedence relations are given in U.S. Pat. Nos. 7,444,638, and 7,165,252, and in nonpatent publications by J. Xu and D. Parnas see the articles (Xu, Parnas 1990) J. Xu and D. Parnas in "Scheduling Processes with Release Times, Deadlines, Precedence and Exclusion Relations", IEEE Trans. on Software Engineering, vol 16, pp 360-369, March 1990, by J. Xu and D. L. Parnas in "Pre-run-time Scheduling of Processes with Exclusion Relations on Nested or Overlapping Critical Sections", Proc. Eleventh Annual IEEE International Phoenix Conference on Computers and Communications, IPCCC-92, Scottsdale, Ariz., Apr. 1-3, 1992, (Xu 1993) J. Xu in "Multiprocessor Scheduling of Processes with Release Times, deadlines, Precedence and Exclusion Relations", IEEE Trans. on Software Engineering, vol 19, pp 139-154, February 1993, and (Xu, Parnas 1993) J. Xu and D. L. Parnas in "On Satisfying Timing Constraints in Hard-Real-Time Systems", IEEE Trans. on Software Engineering, vol 19, pp 1-17, January 1993, which are incorporated herein by reference.

However, until now, unsolved problems have been main obstacles to fully automating the process of constructing scheduling systems that combine the pre-run-time scheduling with run-time scheduling of real-time processes, as discussed below.

It is often difficult to estimate the worst-case computation times of real-time processes with sufficient precision during real-time and embedded system design. As discussed in the article by Stewart, D. B., and Khosla, 1997, "Mechanisms for detecting and handling timing errors," Communications of the ACM, vol. 40; and in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al 2005); low-level mechanisms in modern computer architecture, such as interrupts, DMA, pipelining, caching, and prefetching, can introduce nondeterministic behaviour in the computation time of real-time processes. As the complexity and scale of embedded system applications have increased dramatically in recent years, the demand for average-case performance enhancing technologies that have a corresponding negative impact on worst-case performance, such as larger and larger caches, have also increased. Real time and embedded systems have also become more dependent on sophisticated operating system support, while operating systems, under constant pressure to provide more and more new features and capabilities, have also become more and more complex. All these developments present significant challenges to determining the worst-case computation times of real-time processes with sufficient precision. If the actual computation time of a real-time process during run-time exceeds the estimated worst-case computation time, an overrun will occur, which may cause the real-time process to not only miss its own deadline, but also cause a cascade of other real-time processes to also miss their deadline, possibly resulting in total system failure. However, if the actual computation time of a real-time process during run-time is less than the estimated worst-case computation time, an underrun will occur, which may result in under-utilization of system resources.

Prior art related to handling underruns and overruns that presently appear relevant are listed in the previously provided tabulation of U.S. Patents, U.S. Patent Applications, and nonpatent publications.

In the article by Zhang, L., 2003, "Handling overruns and underruns in prerun-time scheduling in hard real-time systems," M. Sc. Thesis, York University, Toronto, Canada (Zhang, 2003), a method is presented that is not capable of handling exclusion relations or preemptions between tasks, because in Zhang, the slack time of a task is defined to be "the difference between its adjusted deadline and pre-computed finish time," and it assumes that each task, once started, should always be able to continuously execute for the duration of that task's entire worst-case execution time plus all of its slack time, right up to that task's adjusted deadline without being preempted by any other task. In Zhang it states that, " . . . we assume that there is no preemption in the pre-computed schedule, that is, every task is treated as an independent task without any relations between them. If task A is preempted by B, A is divided into two parts, . . . these are treated as separate tasks in our algorithm." This assumption in Zhang rules out the possibility of defining any exclusion relation between other tasks and A, and enforcing those exclusion relations at run-time; it also rules out the possibility of allowing the run-time scheduler to have the capability to allow tasks to preempt other tasks at any appropriate time at run-time. The latter capability is also very important and necessary because the preemption points at run-time will in general be different from the preemption points in the pre-run-time schedule, and allowing tasks to preempt other tasks at any appropriate time at run-time can allow tasks to have more room to overrun, thus increase the chances that real-time processes will be able to complete their computations, reduce the chances of system failure, and increase both system utilization and robustness.

Zhang does not compute latest start times for processes that can preempt other processes at arbitrary points in time. Zhang is not capable of calculating task attributes, including latest start times, for the run-time preemption scenarios shown in Examples 2-3, 5-10 in this disclosure. In contrast Examples 2-3, 5-10 of this disclosure describe how embodiments allow tasks to preempt other tasks at any appropriate time.

The article by Shen, C., Ramamritham, K., and Stankovic, J. A., 1993, "Resource reclaiming in multiprocessor real-time systems," IEEE Tran. on Par. and Distr. Sys., vol. 4 (Shen et al, 1993), considers resource reclaiming, but do not consider overruns; furthermore, preemptions are not allowed. It also does not compute latest start times for uncompleted processes. The methods in the article by Caccamo, M., Buttazzo, G. C., and Thomas, D. C., 2005, "Efficient reclaiming in reservation-based real-time systems with variable execution times," IEEE Tran. Computers, vol. 54 (Caccamo et al, 2005); and the article by Lehoczky, J. P., Sha, L., and Strosnider, J. K., 1995, "The deferrable server algorithm for enhanced aperiodic responsiveness in hard real-time environments," IEEE Trans. On Computers, vol. 44, do not compute latest start times for uncompleted processes, do not consider latest-start-time schedules, or release times or precedence relations. The article by Sprunt, B., Sha, L., and Lehoczky, J. P., 1989, "Aperiodic process scheduling for hard real-time systems," Journal of Real-Time Systems, vol. 1, presents the Sporadic Server algorithm, which utilizes spare processor capacity to service sporadic processes, but does not compute latest start times for uncompleted processes, does not consider latest-start-time schedules, or release times or precedence relations. The article by Koren, G., and Shasha, D., 1995, "Dover: an optimal on-line scheduling algorithm for overloaded uniprocessor real-time systems," SIAM Journal on Computing, Vol. 24, presents an on-line scheduling algorithm for overloaded systems, but it does not compute latest start times for uncompleted processes, does not consider latest-start-time schedules, and the algorithm is only applicable to completely unrelated processes. The article by Lin, C., and Brandt, S. A., 2005, "Improving soft real-time performance through better slack reclaiming," Proc. 26th IEEE Real-Time Systems Symposium, introduces slack reclaiming algorithms, but does not compute latest start times for uncompleted processes, does not consider latest-start-time schedules; the algorithms only consider soft real-time processes, and do not guarantee that deadlines of real-time processes will not be missed.

None of the prior art, including

U.S. Pat. No. 8,321,065, to Kirchhof-Falter, U.S. Pat. No. 6,085,218, to Carmon, U.S. Pat. No. 7,613,595 to MacLay, U.S. Pat. No. 6,189,022 to Binns, U.S. Pat. No. 7,302,685 to Binns, et al., U.S. Pat. No. 7,140,022 to Binns, U.S. Pat. No. 6,964,048 to Isham, U.S. Patent Application No. 20020138542 by Bollella, U.S. Patent Application No. 20090013322 by MacLay, U.S. Patent Application No. 20060200795 by MacLay; consider using a latest-start-time schedule. Furthermore, none of them are capable of simultaneously satisfying various important constraints and dependencies, such as release times, offsets, precedence relations, and exclusion relations with other real-time processes, while effectively handling underruns and overruns.

In addition, prior art do not provide any system or method for handling real-time process underruns and overruns on a multiprocessor that allows multiple processor resources are effectively utilized by allowing real-time processes to be preempted and migrate from one processor to another processor, to effectively use spare capacity that becomes available when other processes underrun on any processor. Prior art on reclaiming resources on multiprocessors, such as the article by Shen, C., Ramamritham, K., and Stankovic, J. A., 1993, "Resource reclaiming in multiprocessor real-time systems," IEEE Tran. on Par. and Distr. Sys., vol. 4, n. 4, pp. 382-397 (Shen et al 1993), and the article by Gupta, I., Manimaran, G. and Siva Ram Murthy, C., 2000, "A new strategy for improving the effectiveness of resource reclaiming algorithms in multiprocessor real-time systems." J. of Parallel and Distributed Computing, 60, pp. 113-133 (Gupta et al 2000), assume that each process can only execute nonpreemptively on one processor. In comparison, in the system and method presented in this application, multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.

In comparison with Prior application Ser. No. 14/451,420, filed Aug. 4, 2014, also filed by the present inventor, the present application solves a distinct problem—the problem of providing a system and method for handling real-time process underruns and overruns on a multiprocessor, which effectively tracks and utilizes unused processor time resources on a multiprocessor to reduce the chances of missing real-time process deadlines, thereby providing the capability to significantly increase both system utilization and system robustness in the presence of inaccurate estimates of the worst-case computation times of real-time processes on a multiprocessor, and which allows multiple processor resources to be effectively utilized by allowing real-time processes to be preempted and migrate from one processor to another processor to effectively use spare capacity that becomes available when other processes underrun on any processor, while simultaneously satisfying additional specified constraints, such as exclusion relations, that is, preventing real-time periodic processes and asynchronous processes from concurrently accessing a shared data memory resource; and precedence relations defined on ordered pairs of real-time periodic processes on a multiprocessor. Prior application Ser. No. 14/451,420, filed Aug. 4, 2014, does not solve the problem of providing a system and method for handling real-time process underruns and overruns on a multiprocessor and effectively utilize multiple processor resources.

SUMMARY

An embodiment providing a system and method for handling real-time process underruns and overruns on a multiprocessor, which effectively tracks and utilizes unused processor time resources on a multiprocessor to reduce the chances of missing real-time process deadlines, thereby providing the capability to significantly increase both system utilization and system robustness in the presence of inaccurate estimates of the worst-case computation times of real-time processes on a multiprocessor, and which allows multiple processor resources to be effectively utilized by allowing real-time processes to be preempted and migrate from one processor to another processor to effectively use spare capacity that becomes available when other processes underrun on any processor, while simultaneously satisfying additional specified constraints, such as exclusion relations, that is, preventing real-time periodic processes and asynchronous processes from concurrently accessing a shared data memory resource; and precedence relations defined on ordered pairs of real-time periodic processes. The embodiment computes a "latest start time" for each uncompleted periodic real-time process, such that if all real-time processes start execution on or before their respective latest start times at run-time, then it can be guaranteed that all real-time processes will always be able to complete on or before their respective deadlines. At run-time, the illustrative embodiment of the method uses the latest start times in combination with a multiprocessor timer interrupt mechanism to effectively handle real-time process underruns and overruns while scheduling the real-time processes on a multiprocessor such that multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.

An embodiment provides a system and method for handling real-time process underruns and overruns on a single processor or a multiprocessor, which effectively tracks and utilizes unused processor time resources on a single or a multiprocessor to reduce the chances of missing real-time process deadlines, thereby providing the capability to significantly increase both system utilization and system robustness in the presence of inaccurate estimates of the worst-case computation times of real-time processes on a single processor or a multiprocessor, and in which multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines. A plurality of illustrative embodiments of the latest-start-time-scheduler method with different characteristics and different advantages, compute a plurality of latest-start-time schedules with different characteristics and different advantages, and compute latest start times for uncompleted real-time processes, where a latest start time is such that, if an uncompleted real-time process does not start at its latest start time, then at least one of the predetermined constraints may not be satisfied. The single processor or multiprocessor timer interrupt mechanism is programmed to interrupt a currently executing real-time process at times which may include at least one latest start time. A plurality of run-time schedulers may also modify or create new latest-start-time schedules to compute updated latest start times to take into account the most recent knowledge of changes in the states of the processes at run-time.

In accordance with another embodiment, latest-start-time schedules on either a single processor or a multiprocessor are created and information in the latest-start-time schedules are used by the run-time scheduler in order to exploit information known both before run-time and during run-time when scheduling real-time process executions on either a single processor or a multiprocessor. With the information provided in the latest-start-time schedule, multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.

In accordance with another embodiment, all of the following can be achieved simultaneously:

(1) At run-time, latest start times are used to handle real-time process underruns and overruns while scheduling the real-time processes on either a single processor or a multiprocessor. Real-time processes which overrun, are able to utilize any spare processor capacity in the system, including any additional unused processor capacity made available at run-time by real-time process underruns, to maximize their chances of still meeting deadlines despite overrunning, thereby providing the capability to significantly increase both system utilization and system robustness in the presence of inaccurate estimates of the worst-case computation times of real-time processes in a single processor or multiprocessor real-time system.

(2) Multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.

(3) Exclusion relations can be used to prevent simultaneous access to shared resources at run-time on either a single processor or a multiprocessor.

(4) Any real-time process that does not exclude a particular real-time process is able to preempt that particular real-time process at any appropriate time at run-time, which allows real-time processes to have more room to overrun on either a single processor or a multiprocessor.

(5) Precedence relations can be used to ensure the proper ordering of real-time process executions at run-time on either a single processor or a multiprocessor.

In accordance with other embodiments, systems and methods compute an latest-start-time schedule on either a single processor or a multiprocessor for a set of periodic real-time processes P with arbitrary precedence and exclusion relations defined on ordered pairs of real-time processes in P, in which all time slots for the real-time processes in the original pre-run-time schedule are shifted to the right as far as possible while still satisfying the original precedence and exclusion relations. The latest start times of uncompleted real-time processes are determined by the start times of real-time processes in the latest-start-time schedule on either a single processor or a multiprocessor. At run-time, with the information provided in the latest-start-time schedule, multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines in a single processor or multiprocessor real-time system.

In accordance with another embodiment, a run-time scheduling system and method, uses a latest-start-time schedule on either a single processor or a multiprocessor that satisfies all the previously mentioned constraints, including precedence and exclusion relations between the real-time processes, with which multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines. The run-time scheduler is invoked to perform a scheduling action during the following main situations:

(a) At a time t when some asynchronous real-time process a has arrived and made a request for execution.

(b) At a time t when some real-time process x has just completed its computation.

(c) At a time t that is equal to the latest start time $LS(p_j)$ of a real-time process $p_j$ that is earliest among all latest start times $LS(p_i)$ for all uncompleted real-time processes $p_i$.

(d) At a time t that is equal to the release time $r_{p_k}$ of a real-time process $p_k$ that has not started execution when there does not exist any real-time process $p_j \in P\text{-}g$ that is currently running, that is, has started but not completed.

(e) At a time t that is equal to the deadline $d_{p_j}$, of an uncompleted real-time process $p_i$. (In this case, $p_i$ has just missed its deadline, and the system should handle the error.)

In situation (a) above, the run-time scheduler is invoked by an interrupt handler responsible for servicing requests generated by an asynchronous real-time process.

In situation (b) above, the run-time scheduler is usually invoked by a kernel function responsible for handling real-time process completions.

In situations (c), (d), and (e) above, the run-time scheduler is invoked by programming the single processor or multi-processor timer interrupt mechanism to interrupt at the appropriate time.

In accordance with another embodiment, a run-time scheduling system and method, uses a latest-start-time schedule on either a single processor or a multiprocessor that satisfies all the previously mentioned constraints, including precedence and exclusion relations between the real-time processes, with which multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines. The run-time scheduler is invoked to perform a scheduling action during the following main situations:

(a) At a time t when some asynchronous real-time process a has arrived and made a request for execution.

(b) At a time t when some real-time process x has just completed its computation.

(c) At a time t that is equal to the latest start time LS(p j) of a real-time process pj that is earliest among all latest start times LS(pi) for all uncompleted real-time processes pi.

(d) At a time t that is equal to the release time $r_{p_k}$ of a real-time process $p_k$ that has not started execution when there does not exist any real-time process $p_j \in P\text{-}g$ that is currently running, that is, has started but not completed.

(e) At a time t that is equal to the deadline dpi of an uncompleted real-time process pi. (In this case, pi has just missed its deadline, and the system should handle the error.)

(f) At a time t when some real-time process p has overrun, that is, its remaining computation time is not greater than zero, and p has not yet completed its computation, that is, $\neg(C'(p)>0) \wedge \neg(e(p) \leq t)$.

In situation (a) above, the run-time scheduler is invoked by a single processor or multiprocessor interrupt mechanism interrupt handler responsible for servicing requests generated by an asynchronous real-time process.

In situation (b) above, the run-time scheduler is usually invoked by a kernel function responsible for handling real-time process completions.

In situations (c), (d), (e) and (f) above, the run-time scheduler is invoked by programming the single processor or multiprocessor timer interrupt mechanism to interrupt at the appropriate time.

In accordance with another embodiment, an alternative procedure can be used to re-compute, at run-time, using a very short amount of time, the latest start time LS(p) of an uncompleted real-time process p that has not overrun, when given a most recent latest-start-time schedule on either a single processor or a multiprocessor.

In accordance with another embodiment, the worst-case time complexity of the run-time scheduler for re-computing latest start times and for selecting real-time processes for execution a single processor or multiprocessor at run-time is significantly reduced.

(a) In the embodiment the run-time scheduler only needs to re-compute the latest start time for the real-time processes that had just been preempted, instead of re-computing the latest start times for all the real-time processes.

(b) In addition, in the embodiment the run-time scheduler only needs to visit each time slot of the real-time processes that had just been preempted at most once.

(c) In the embodiment, at the start of each system major cycle corresponding to the least common multiple of the real-time process periods, the time slot data will be initialized/restored to be consistent with a feasible latest-start-time schedule on a single processor or multiprocessor of all the uncompleted real-time processes, the "initial latest-start-time schedule", which can be computed off-line by an embodiment of a Multiprocessor Time Slot Right Shift procedure.

(d) In the embodiment, when the run-time scheduler needs to select real-time processes for execution at any time t during run-time, it only needs to examine the first few time slots in the sequence of time slots in order to find the real-time processes that have the earliest latest start times among all real-time processes that are ready, since the order of the time slots is always consistent with the order of the latest start times of the real-time processes that are associated with each of the time slots.

In accordance with another embodiment, (1) In a Pre-Run-Time Phase 1, a feasible pre-run-time schedule SO on a single processor or on a multiprocessor is constructed for the set of periodic real-time processes that satisfies all the release times, deadlines, precedence and exclusion constraints, for all occurrences of all the periodic real-time processes within the interval [0, prdLCM], where prdLCM is the least common multiple of the real-time process periods.

(2) In a Pre-Run-Time Phase 2, a latest-start-time schedule SL on a single processor or a multiprocessor is constructed, for the set of periodic real-time processes that satisfies all the release times, deadlines, precedence and exclusion constraints, for all occurrences of all the periodic real-time processes within the interval [0, prdLCM], where prdLCM is the least common multiple of the real-time process periods, in which the beginning of the time slot for each uncompleted real-time process p in SL is equal to its latest start time LS[p], by scheduling all real-time processes in P starting from time t equal to the latest deadline among all the real-time processes in P, in reverse time order, using a Latest-Release-Time-First" scheduling strategy that is equivalent to a reverse application of the well known Earliest-Deadline-First strategy that also satisfies all PREC relations in the feasible pre-run-time schedule SO; and using adjusted release times and adjusted deadlines for real-time processes for which a PREC relation holds; such that with the information provided in the latest-start-time schedule SL, multiple processor resources can be effectively utilized: real-time process executions can be selectively preempted by other real-time process executions and can migrate from one processor to another processor at any time and as many times as necessary at run time to provide greater flexibility in utilizing any unused processor capacity and meeting deadlines.

(3) In a Run-Time-Phase, at run-time, the information provided in the latest-start-time schedule SL and latest start times is used to schedule periodic real-time processes such that multiple processor resources can be effectively utilized: real-time process executions can be selectively preempted by other real-time process executions and can migrate from one processor to another processor at any time and as many times as necessary at run time to provide greater flexibility in utilizing any unused processor capacity and meeting deadlines.

At run-time a run-time scheduler will be invoked to perform a scheduling action at any of the following times:
(a) At a time t when some asynchronous real-time process a has arrived and made a request for execution.
(b) At a time t when some real-time process x has just completed its computation.
(c) At a time t that is equal to the latest start time LS(pj) of a real-time process pj.
(d) At a time t that is equal to the release time Rpk of some real-time process pk.
(e) At a time t that is equal to the deadline dpi of an uncompleted real-time process pi.
(In this case, pi has just missed its deadline, and the system should handle the error.)

In situation (a) above, the run-time scheduler is usually invoked by an interrupt handler responsible for servicing requests generated by an asynchronous real-time process.

In situation (b) above, the run-time scheduler is usually invoked by a kernel function responsible for handling real-time process completions.

In situations (c), (d), and (e) above, the run-time scheduler is invoked by programming the single processor or multiprocessor timer interrupt mechanism to interrupt at the appropriate time.

When the run-time scheduler is invoked it will perform the following steps:
Let t be the current time.
Step 0. In situation (e) above, check whether any real-time process p has missed its deadline dp. If so perform error handling.
Step 1. In situation (a) above, if an asynchronous real-time process ai has arrived, execute the asynchronous real-time processor scheduler subroutine.
Step 2. Whenever the run-time scheduler is invoked due to any of the situations (b), (c) and (d) above at time t:
If at time t, the end of the current system major cycle corresponding to the least common multiple of the real-time process periods prdLCM has been reached, then initialize/restore the latest-start-time schedule and latest start times to be consistent with the initial latest-start-time schedule SL, which was computed before run-time by an embodiment of a Multiprocessor Time Slot Right Shift procedure; otherwise:
(i) recompute the latest start time LS(p) for each real-time process p that was previously executing at time t−1 and had just been preempted and has not completed and has not overrun.
(ii) Any real-time process p that was previously executing at time t−1 but has either completed or has overrun at time t will be removed from the re-computed latest start time schedule.
Step 3. Select up to m real-time processes if possible to execute on the m processors at time t.
Step 4. At time 0 and after servicing each single processor or multiprocessor timer interrupt mechanism interrupt, and performing necessary error detection, error handling, latest start time re-calculations, and making scheduling decisions; —reset the single processor or multiprocessor timer interrupt mechanism to interrupt at the earliest time that any of the events (c), (d), and (e) above may occur.
Step 5. Let the real-time processes that were selected in Step 3 start to execute at run-time t.

According to yet another embodiment of the present invention, one can construct a feasible latest-start-time schedule SL on a single processor or a multiprocessor without first constructing a separate pre-run-time schedule SO, for the set of periodic real-time processes that satisfies all the release times, deadlines, precedence and exclusion constraints, for all occurrences of all the periodic real-time processes within the interval [0, prdLCM], where prdLCM is the least common multiple of the real-time process periods, in which the beginning of the time slot for each uncompleted real-time process p in SL is equal to its latest start time LS[p], by scheduling all real-time processes in P starting from time t equal to the latest deadline among all the real-time processes in P, in reverse time order, using a Latest-Release-Time-First" scheduling strategy that is equivalent to a reverse application of the well known Earliest-Deadline-First strategy that also satisfies precedence and exclusion constraints, then at run-time using a run-time scheduler which uses the information provided in the feasible latest-start-time schedule SL, including all PREC relations in the feasible latest-start-time schedule SL, to schedule the periodic real-time processes, such that multiple processor resources can be effectively utilized: real-time process executions can be selectively preempted by other real-time process executions and can migrate from one processor to another processor at any time and as many times as necessary at run time to provide greater flexibility in utilizing any unused processor capacity and meeting deadlines.

According to yet another embodiment of the present invention, the single processor or multiprocessor interrupt mechanism can be programmed to only interrupt/preempt as few real-time processes as possible, so that the run-time scheduler only needs to reschedule as few real-time processes as possible to execute on the available processors whenever at run-time the run-time scheduler is invoked to perform a scheduling action at any of the following times:
(a) At a time t when some asynchronous real-time process a has arrived and made a request for execution.
(b) At a time t when some real-time process x has just completed its computation.
(c) At a time t that is equal to the latest start time LS(pj) of a real-time process pj.
(d) At a time t that is equal to the release time Rpk of some real-time process pk.
(e) At a time t that is equal to the deadline dpi of an uncompleted real-time process pi.
(In this case, pi has just missed its deadline, and the system should handle the error.)

when the run-time scheduler is invoked to perform a scheduling action in situations (a), (c), (d) if the number of asynchronous real-time processes that have arrived at time t plus the number of real-time processes for which a latest start time has been reached at time t plus the number of real-time processes for which a release time has been reached at time t is n1, and the number of processors idle at time t is n2, then only at most max{0, n1−n2} of the currently executing real-time processes may need to be interrupted/preempted, in order for the newly arrived asynchronous real-time processes or periodic real-time processes that have just become ready or their latest start time has just been reached to be scheduled for execution on one of the processors; —when the run-time scheduler is invoked to perform a scheduling action in situations (b), (e), when a real-time process has completed or a real-time process has reached its deadline, no other currently executing real-time process may need to be interrupted/preempted.

ADVANTAGES

An embodiment which allows real-time processes, when necessary, to be able to overrun, while still guaranteeing the satisfaction of various timing constraints on either a single processor or a multiprocessor, reduces the chances of real-time process or system failure, thereby providing the capability to significantly increase both system utilization and system robustness in the presence of inaccurate estimates of the worst-case computation times of real-time processes on either a single processor or a multiprocessor, and in which multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.

In accordance with another embodiment, all of the following can be achieved simultaneously:
(1) At run-time, latest start times are used to handle real-time process underruns and overruns while scheduling the real-time processes on either a single processor or a multiprocessor. Real-time processes which overrun, are able to utilize any spare processor capacity in the system on either a single processor or a multiprocessor, including any additional unused processor capacity made available at run-time by real-time process underruns, to maximize their chances of still meeting deadlines despite overrunning, thereby providing the capability to significantly increase both system utilization and system robustness in the presence of inaccurate estimates of the worst-case computation times of real-time processes.
(2) Multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.
(3) Exclusion relations can be used to prevent simultaneous access to shared resources at run-time on either a single processor or a multiprocessor.
(4) Any real-time process that does not exclude a particular real-time process is able to preempt that particular real-time process at any appropriate time at run-time, which allows real-time processes to have more room to overrun on either a single processor or a multiprocessor.
(5) Precedence relations can be used to ensure the proper ordering of real-time process executions at run-time on either a single processor or a multiprocessor.

In other embodiments, latest start times for uncompleted real-time processes can be efficiently updated on either a single processor or a multiprocessor, to allow real-time processes to be able to overrun for longer amounts of time, based on the most recent knowledge of changes in the states of the real-time processes at run-time, while guaranteeing the satisfaction of all the previously mentioned constraints, including precedence and exclusion relations between the real-time processes.

In accordance with another embodiment, exclusion relations can be used to prevent simultaneous access to shared resources at run-time on either a single processor or a multiprocessor. This allows one to avoid using complex synchronization mechanisms, which significantly reduces system complexity. This makes it much easier to verify system correctness, and makes it much easier to debug the system.

In accordance with another embodiment, any real-time process that does not exclude a particular real-time process is able to preempt that particular real-time process at any appropriate time at run-time on either a single real-time processor or a multiprocessor, which allows real-time processes to have more room to overrun. This in turn increase both system utilization and system robustness in the presence of inaccurate estimates of the worst-case computation times of real-time processes on either a single processor or a multiprocessor.

In accordance with another embodiment, precedence relations can be used to ensure the proper ordering of real-time process executions at run-time on either a single processor or a multiprocessor. Many real-time processes in real-world applications have precedence constraints in the form of producer-consumer relationships, Thus the embodiments overcome a common weakness of priority scheduling methods—priority scheduling methods in general are incapable of ensuring the proper ordering of real-time process executions at run-time.

In accordance with another embodiment, a system and methods create a plurality of different latest-start-time schedules on either a single processor or a multiprocessor with different characteristics and different advantages, and using the information in the latest-start-time schedule to schedule the executions of both periodic and asynchronous real-time processes with hard or soft deadlines, with different a priori knowledge of the real-time process characteristics, and with constraints and dependencies, such as offsets, release times, precedence relations, and exclusion relations, exploits to a maximum extent any knowledge about real-time processes' characteristics that are available to the scheduler both before run-time and during run-time, and in which multiple processor resources are effectively utilized: real-time process executions can be selectively preempted by other real-time process executions and can migrate from one processor to another processor at any time and as many times as necessary at run time to provide greater flexibility in utilizing any unused processor capacity and meeting deadlines.

This allows the scheduler to, on either a single processor or a multiprocessor:

(a) effectively handle complex application constraints and dependencies between the real-time real-time processes;

(b) minimize run-time overhead;

(c) make the most efficient use of available processor capacity;

(d) maximize the chances of satisfying all the timing constraints;

(e) provide firm and tight response time guarantees for all the real-time processes whose characteristics are known before run-time; and (f) make it easier to verify that all timing constraints and dependencies will always be satisfied.

In accordance with another embodiment, an alternative procedure can be used to re-compute, at run-time, on either a single processor or a multiprocessor, using a very short amount of time, the latest start time LS(p) of an uncompleted real-time process p that has not overrun, when given a most recent latest-start-time schedule. This provides flexibility to minimize system overhead at run-time when time is critical.

In accordance with another embodiment, the worst-case time complexity of the run-time scheduler for re-computing latest start times and for selecting real-time processes for execution a single processor or multiprocessor at run-time is significantly reduced.

This is significant in practice in hard real-time and embedded single processor or multiprocessor system real-world applications, because it is very important to strive to minimize the run-time overhead of the scheduler as much as possible, especially in hard real-time and embedded single processor or multiprocessor systems with limited processor and system resources.

(a) In the embodiment the run-time scheduler only needs to re-compute the latest start time on either a single processor or a multiprocessor for the specific real-time processes that had just been preempted, instead of re-computing the latest start times for all the real-time processes.

(b) In addition, in the embodiment the run-time scheduler only needs to visit each time slot of the real-time processes that had just been preempted on either a single processor or a multiprocessor at most once.

(c) In the embodiment, at the start of each system major cycle corresponding to the least common multiple of the real-time process periods, the time slot data will be initialized/restored to be consistent with a feasible latest-start-time schedule on a single processor or multiprocessor of all the uncompleted real-time processes, the "initial latest-start-time schedule", which can be computed off-line by an embodiment of a Multiprocessor Time Slot Right Shift procedure.

(d) In the embodiment, selecting real-time processes for execution at any time t during run-time on either a single processor or a multiprocessor is also highly efficient, because it only needs to examine the first few time slots in the sequence of time slots in order to find the real-time processes that have the earliest latest start times among all real-time processes that are ready, since the order of the time slots is always consistent with the order of the latest start times of the real-time processes that are associated with each of the time slots.

In accordance with another embodiment, the following advantages are achieved:

(a) Real-time processes do not need to be interrupted as soon as they overrun on either a single processor or a multiprocessor. Instead, the only times at which a real-time process is interrupted is when its deadline has expired, or when the latest start time of another real-time process has been reached.

(b) Thus real-time processes which overrun, are able to utilize any spare processor capacity in the system on either a single processor or a multiprocessor, including any additional unused processor capacity made available at run-time by real-time process underruns, to maximize their chances of still meeting deadlines despite overrunning.

(c) The most complex scheduling decisions, such as the overall order in which real-time processes are to be executed on either a single processor or a multiprocessor, are made before run-time, thus better algorithms can be used to take advantage of known real-time process characteristics, handle more complex constraints, and achieve higher schedulability.

(d) It is possible to avoid the use of complicated single processor or multiprocessor run-time synchronization mechanisms in which deadlocks or starvation can happen, and for which it is often extremely difficult to obtain reasonable and accurate execution time bounds. Thus the method makes it much easier to verify the system timing properties in a single processor or multiprocessor real-time system.

DRAWINGS—FIGURES

FIGS. 1A and 1B are flowchart diagrams showing an embodiment of a Multiprocessor Time Slot Right Shift procedure which uses adjusted release times and adjusted deadlines based on "PREC" relations which are determined by PRECEDES and EXCLUDES relations defined on ordered pairs of real-time processes in a given feasible pre-run-time schedule $S_O$ and other information to compute a "latest-start-time schedule" $S_L$ on either a single processor or a multiprocessor, for a set of uncompleted periodic real-time processes P, such that the beginning of the time slot for each uncompleted real-time process p in $S_L$ is equal to its "latest start time" LS[p], when given a feasible pre-run-time schedule $S_O$, on either a single processor or a multiprocessor, in which arbitrary PRECEDES and EXCLUDES relations defined on ordered pairs of real-time processes are satisfied.

FIGS. 2A, 2B, 2C, 2D, 2E, 2F, and 2G are flowchart diagrams showing an embodiment of a run-time scheduler method for scheduling real-time process executions during run-time given the latest start times of the real-time processes on either a single processor or a multiprocessor.

FIGS. 3A, 3B, and 3C are flowchart diagrams showing an embodiment of an alternative Multiprocessor Time Slot Right Shift procedure which, when given a feasible pre-run-time schedule $S_O$ on either a single processor or a multiprocessor for a set of real-time processes with arbitrary PRECEDES and EXCLUDES relations defined on ordered pairs of real-time processes, uses adjusted release times and adjusted deadlines based on "PREC" relations which are determined by the PRECEDES and EXCLUDES relations defined on ordered pairs of real-time processes in the feasible pre-run-time schedule $S_O$ and other information to compute a latest-start-time schedule $S_L$, for the set of uncompleted periodic real-time processes, while maintaining the order defined in the "PREC" relations, such that the beginning of the time slot for each uncompleted real-time process i is equal to its "latest start time" LS[i], and all the PRECEDES and EXCLUDES relations are satisfied on either a single processor or a multiprocessor.

FIG. 4A is an example of an original feasible pre-run-time schedule on two processors for the set of real-time processes A, B, C, D, E, F, G, H, H, I, J, K, L, X, Y, Z.

FIG. 4B is an example of an initial latest-start-time schedule and the latest start times and end times for the set of real-time processes A, B, C, D, E, F, G, H, H, I, J, K, L, X, Y, Z on two processors computed off-line by an embodiment of a Multiprocessor Time Slot Right Shift procedure from the original feasible pre-run-time schedule in FIG. 4A. The initial latest-start-time schedule and the latest start times and end times on two processors for the set of real-time processes are computed off-line by the procedure from the original feasible pre-run-time schedule, and will be used at run-time t=0, and at the beginning of each Least Common Multiple of the real-time process periods.

Figure 4A:
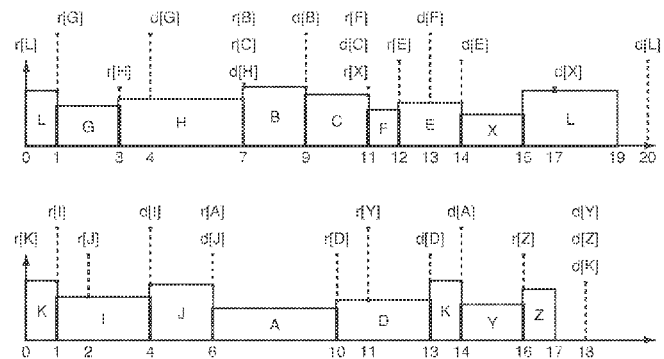
FIG. 4C is an example of a timing diagram of a possible run-time execution of the set of real-time processes A, B, C, D, E, F, G, H, H, I, J, K, L, X, Y, Z on two processors using the latest-start-time schedule and the latest start times and end times in FIGS. 4B, 4D, 4E, 4F, 4G, 4H, 4I, 4J, and 4K.
FIG. 4D shows examples of a latest-start-time schedule and the latest start times and end times for the set of real-time processes A, B, C, D, E, F, G, H, H, I, J, K, L, X, Y, Z on two processors computed at run-time t=1.
FIG. 4E shows examples of part of a latest-start-time schedule and the latest start times of real-time processes H, I, J on two processors at run-time t=2; and part of a latest-start-time schedule and the latest start times of real-time processes H, B, I, J, A on two processors at run-time t=3.
Figure 4B:
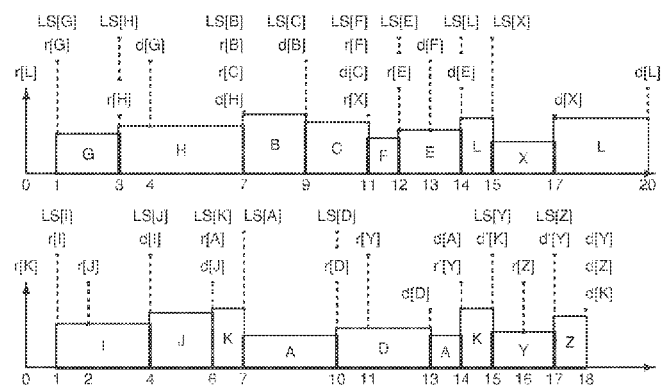
Figure 4C:
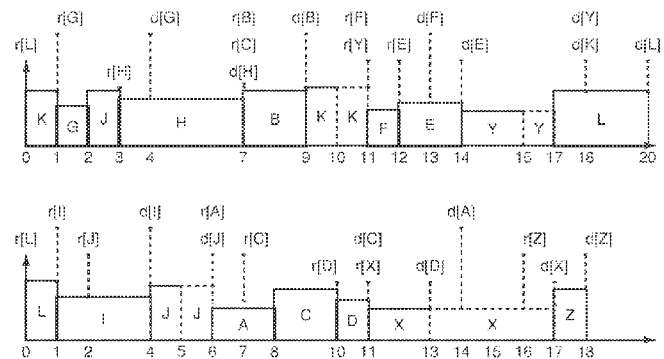
Figure 4D:
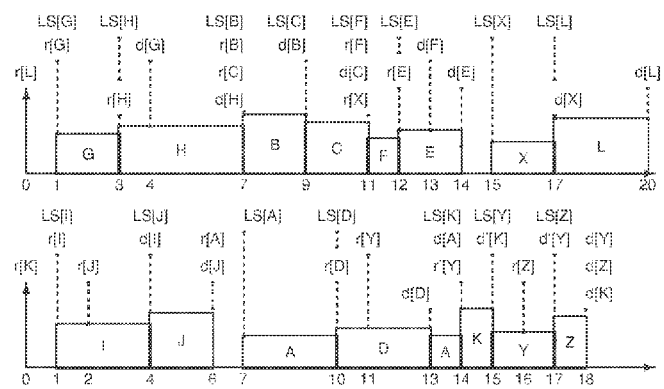
Figure 4E:
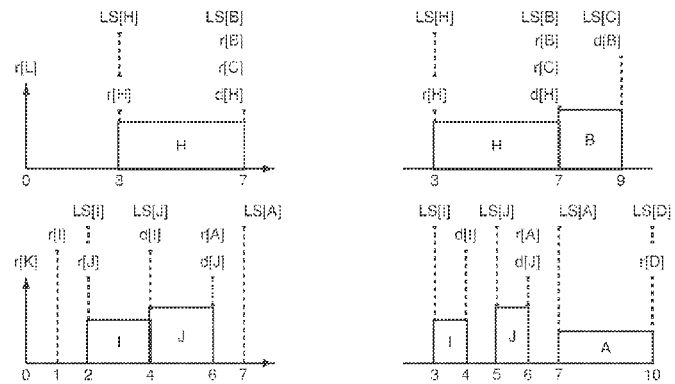
Figure 4F:
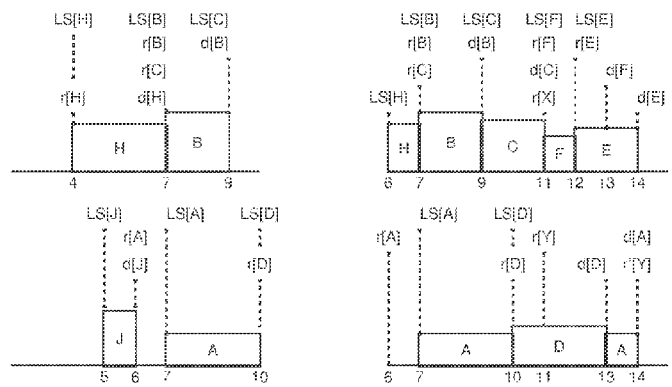
Figure 4G:
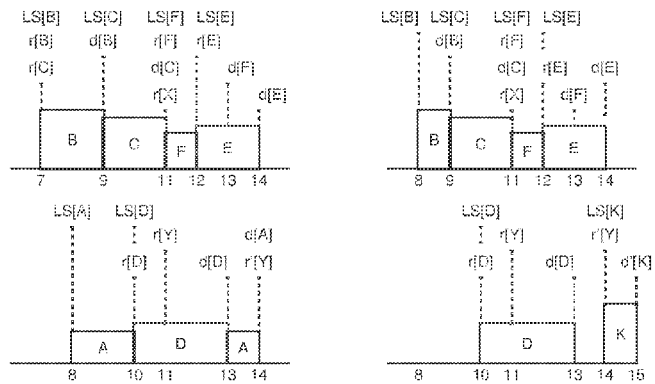

FIG. 4F shows examples of part of a latest-start-time schedule and the latest start times of real-time processes H, B, J, A on two processors at run-time t=4; and part of a latest-start-time schedule and the latest start times of real-time processes H, B, C, F, E, A, D on two processors at run-time t=6 FIG. 4G shows examples of part of a latest-start-time schedule and the latest start times of real-time processes B, C, F, E, A, D on two processors at run-time t=7; and part of a latest-start-time schedule and the latest start times of real-time processes B, C, F, E, D, K on two processors at run-time t=8.

Figure 4H:
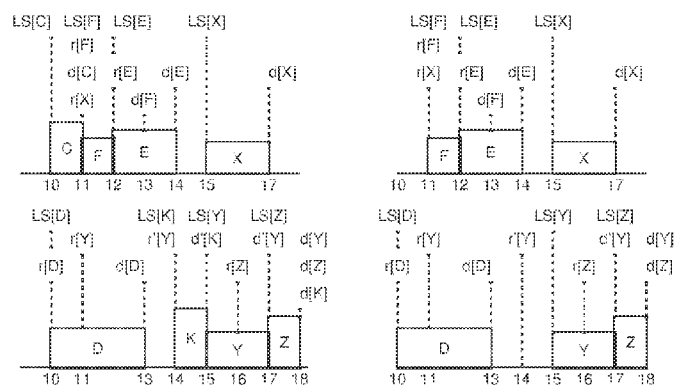

FIG. 4H shows examples of part of a latest-start-time schedule and the latest start times of real-time processes C, F, E, X, D, K, Y, Z on two processors at run-time t=9; and part of a latest-start-time schedule and the latest start times of real-time processes F, E, X, D, Y, Z on two processors at run-time t=10.

Figure 4I:
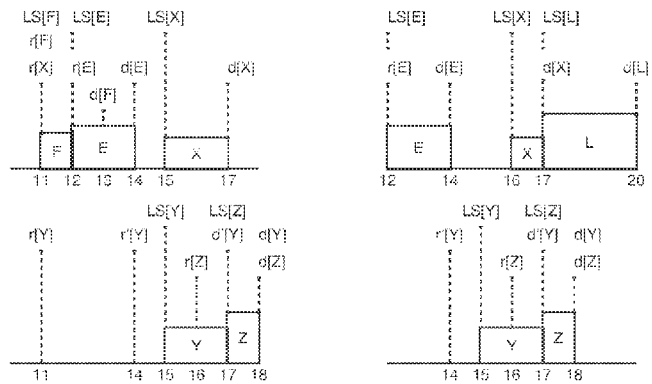

FIG. 4I shows examples of part of a latest-start-time schedule and the latest start times of real-time processes F, E, X, Y, Z on two processors at run-time t=11; and part of a latest-start-time schedule and the latest start times of real-time processes E, X, L, Y, Z on two processors at run-time t=12.

Figure 4J:
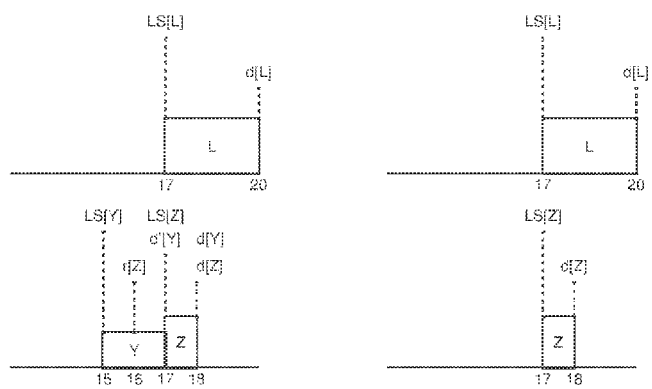

FIG. 4J shows examples of part of a latest-start-time schedule and the latest start times of real-time processes L, Y, Z on two processors at run-time t=14; and part of a latest-start-time schedule and the latest start times of real-time processes L, Z on two processors at run-time t=17.

Figure 4K:
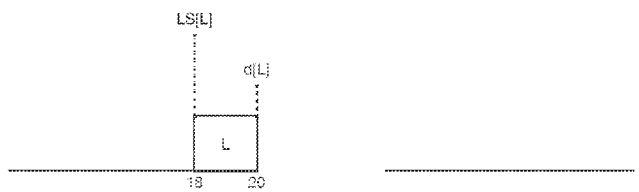

FIG. 4K shows examples of part of a latest-start-time schedule and the latest start time of real-time process L on two processors at run-time t=18; and part of a latest-start-time schedule on two processors at run-time t=20.

Figure 5:
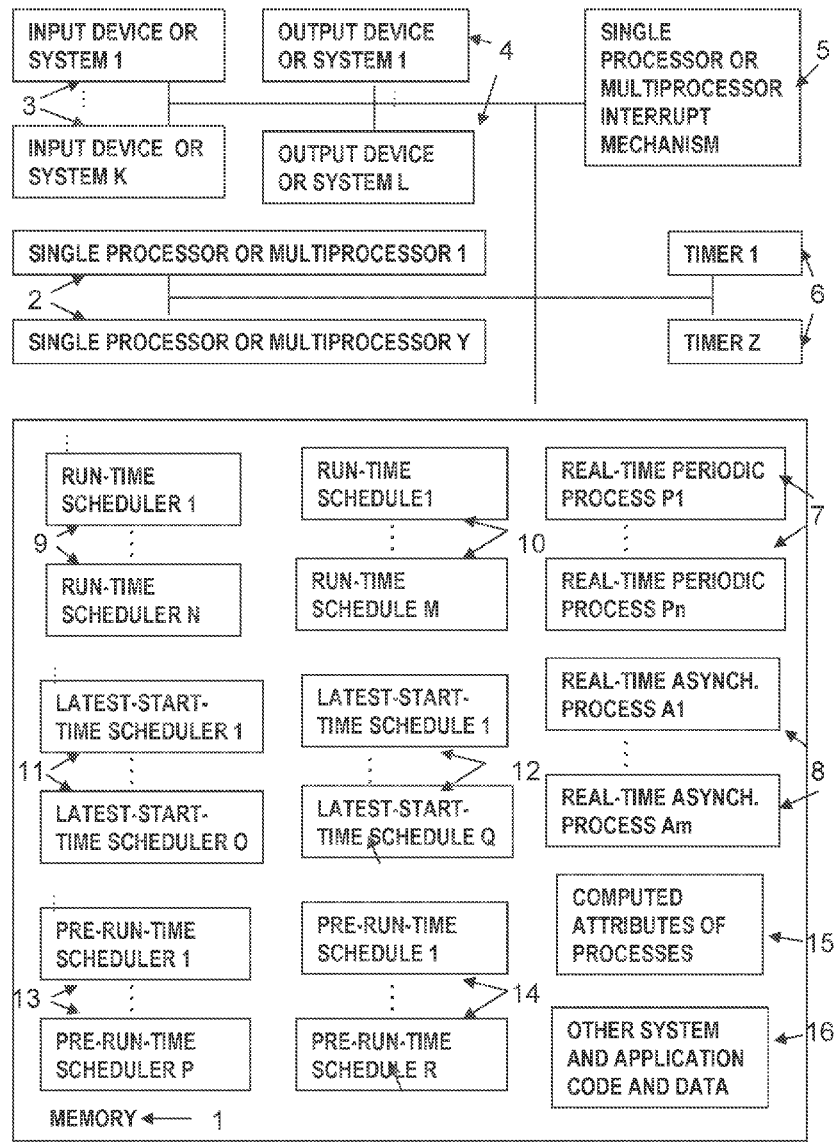

FIG. 5 is a block diagram showing various possible computer system components that various embodiments may involve, including input device or system 1 to K, output device or system 1 to L, processors 1 to Y, timers 1 to Z, single processor or multiprocessor interrupt mechanism, system and application code and data in memory, including run-time scheduler 1 to N, run-time schedule 1 to M, latest-start-time scheduler 1 to O, latest-start-time schedule 1 to Q, pre-run-time scheduler 1 to P, pre-run-time schedule 1 to R, real-time periodic processes P1 to Pn, real-time asynchronous processes A1 to Am, and other system and application code and data, etc.

Figure 6:
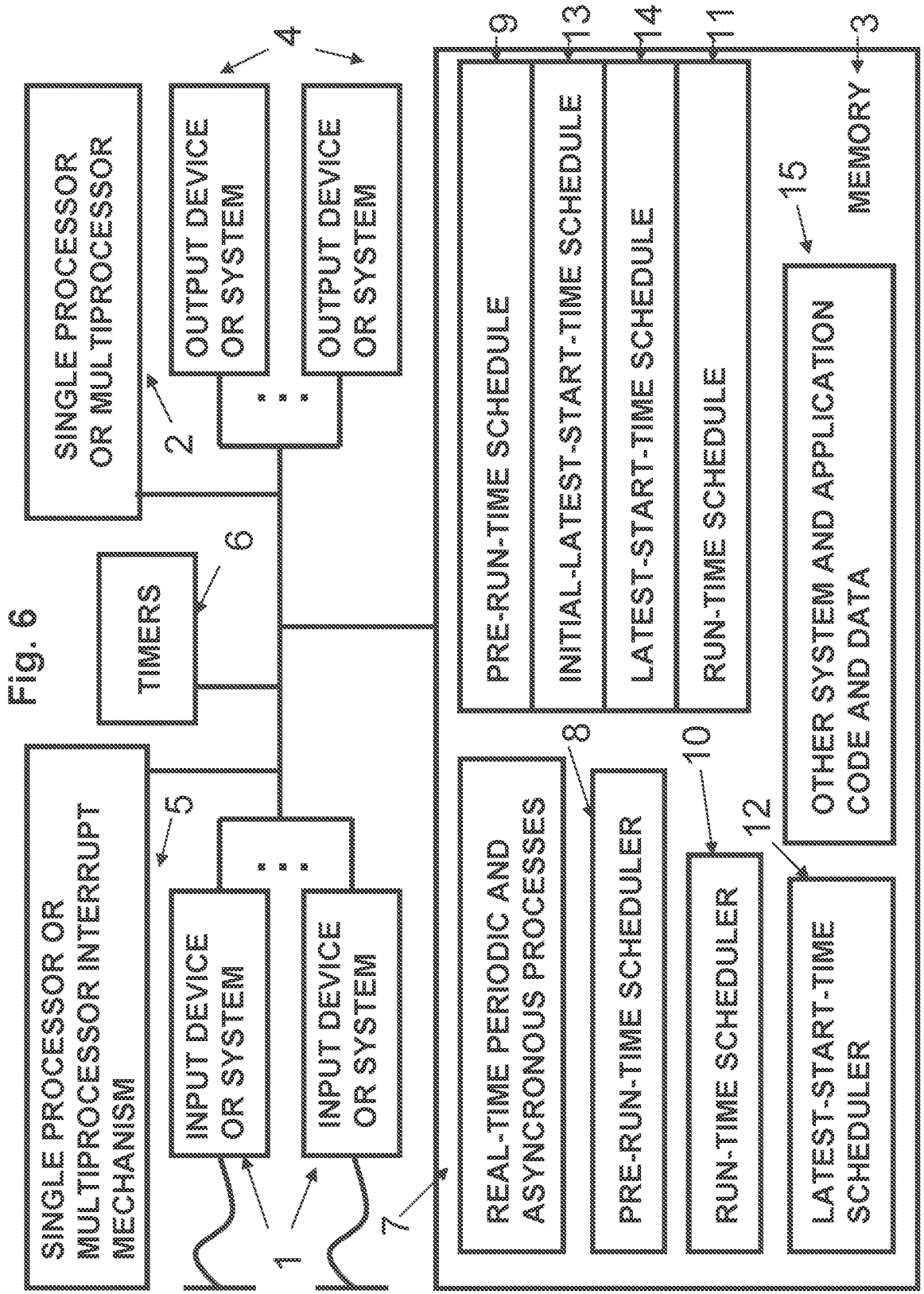

FIG. 6 is a block diagram showing various possible computer system components that various embodiments may involve, including single processor or multiprocessor, timers, single processor or multiprocessor interrupt mechanism, system and application code and data in memory, including run-time scheduler, run-time schedule, latest-start-time scheduler, latest start-time schedule, pre-run-time scheduler, pre-run-time schedule, real-time periodic and asynchronous processes, and other system and application code and data, etc.

Figure 7A:
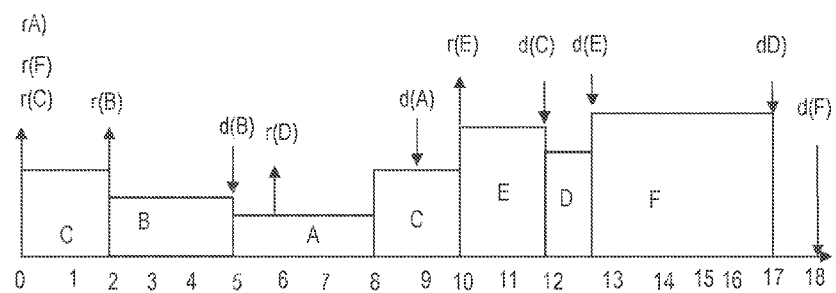

FIG. 7A is an example of an original feasible pre-run-time schedule on a single processor for the set of real-time processes A, B, C, D, E, F.

Figure 7B:
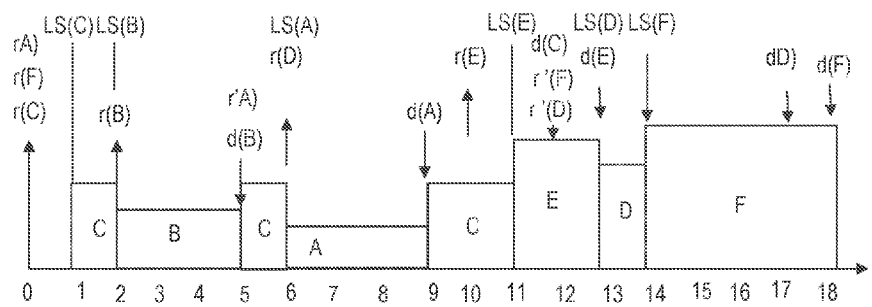

FIG. 7B is an example of a latest-start-time schedule and the latest start times and end times for the set of real-time processes A, B, C, D, E, F on a single processor computed by the procedure from the original feasible pre-run-time schedule in FIG. 7A.

Figure 7C:
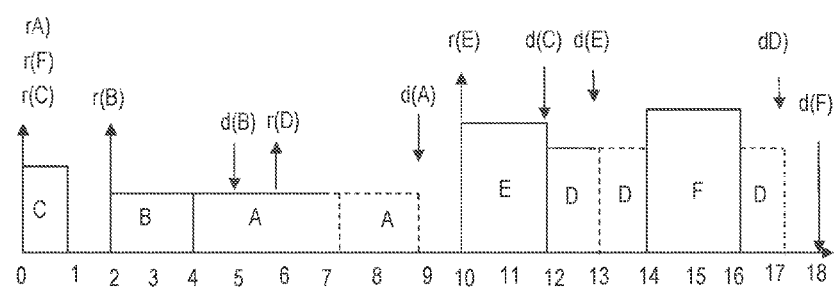

FIG. 7C is an example of a timing diagram of a possible run-time execution of the set of real-time processes A, B, C, D, E, F on a single processor using the latest-start-time schedule and the latest start times and end times in FIGS. 7B, 7D, 7E, 7F, 7G, 7H, and 7I.

Figure 7D:
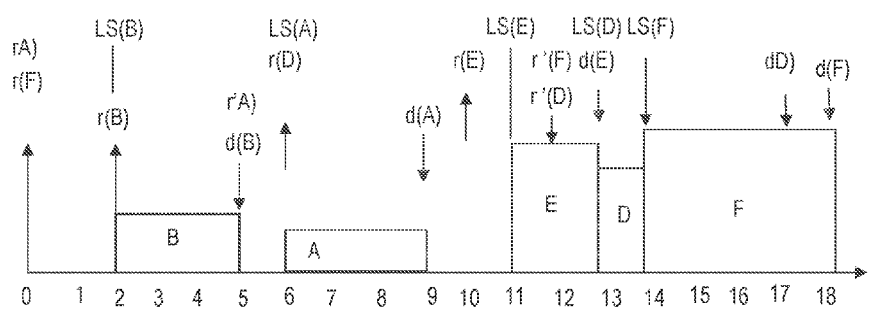

FIG. 7D shows examples of a latest-start-time schedule and the latest start times and end times for the set of real-time processes A, B, C, D, E, F on a single processor computed at run-time t=1 and t=2.

Figure 7E:
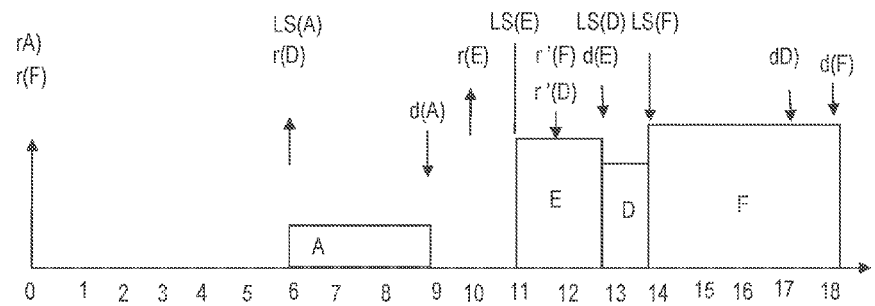

FIG. 7E shows examples of a latest-start-time schedule and the latest start times and end times for the set of real-time processes A, D, E, F on a single processor computed at run-time t=4.

Figure 7F:
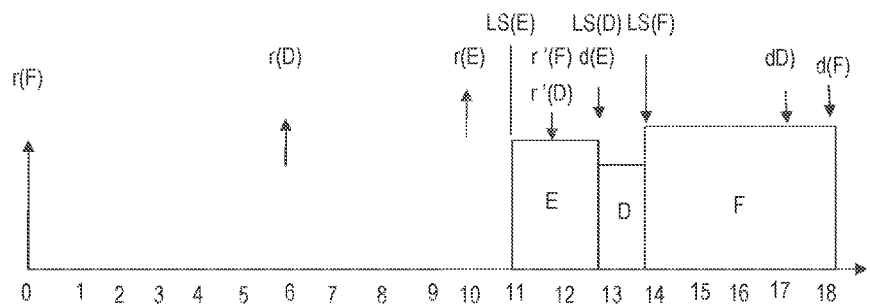

FIG. 7F shows examples of a latest-start-time schedule and the latest start times and end times for the set of real-time processes D, E, F on a single processor computed at run-time t=9 and t=10.

Figure 7G:
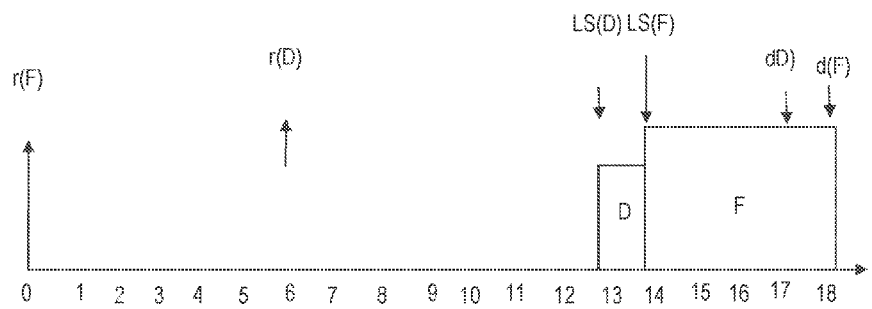

FIG. 7G shows examples of a latest-start-time schedule and the latest start times and end times for the set of real-time processes D, F on a single processor computed at run-time t=12.

Figure 7H:
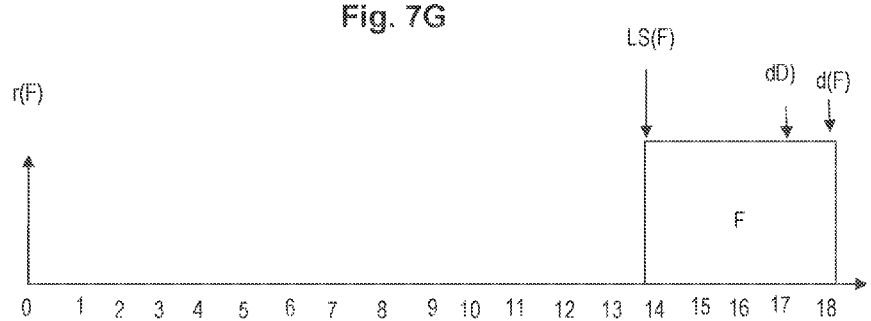

FIG. 7H shows examples of a latest-start-time schedule and the latest start times and end times for the set of real-time processes F on a single processor computed at run-time t=14.

Figure 7I:
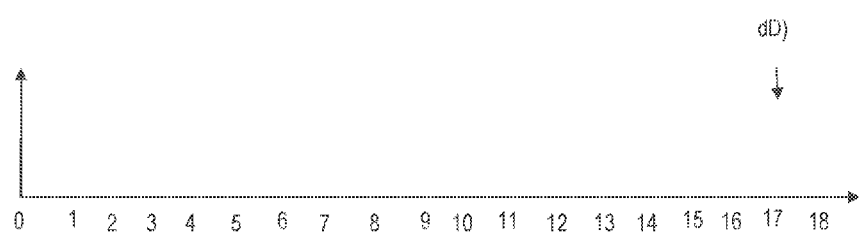

FIG. 7I shows examples of a latest-start-time schedule on a single processor computed at run-time t=16.

Figure 8A:
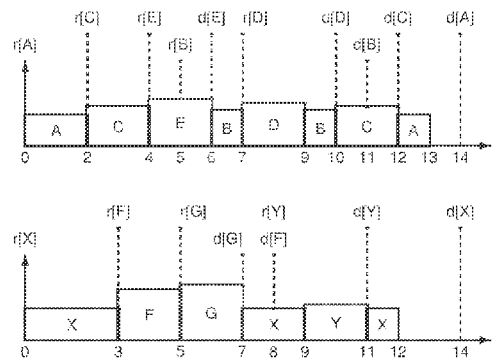

FIG. 8A shows examples of a feasible pre-run-time schedule on two processors for real-time processes A, B, C, D, E, F, G, X, Y. It is assumed that the following precedence and exclusion relations must be satisfied: D EXCLUDES Y.

Figure 8B:
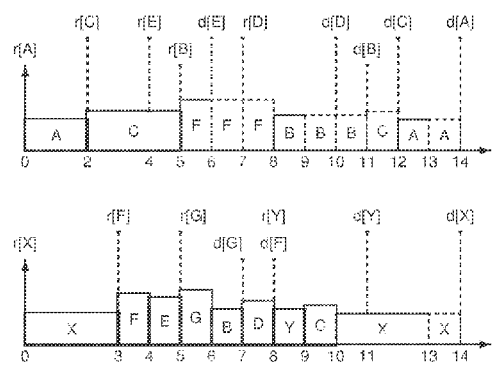

FIG. 8B shows an example of a possible run-time execution scenario on two processors for A, B, C, D, E, F, G, X, Y that results from using the Second Illustrative Embodiment of the Main-Run-Time-Scheduler Method.

Figure 8C:
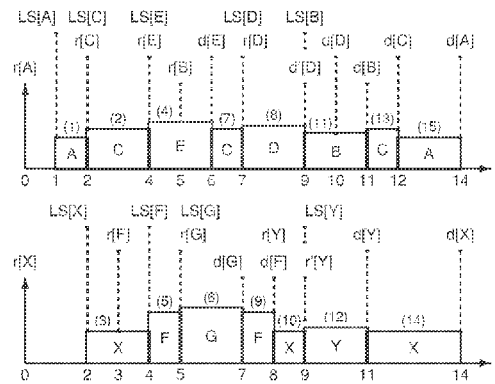

FIG. 8C shows examples of an initial latest-start-time schedule on two processors and latest start times for real-time processes A, B, C, D, E, F, G, X, Y, that can be computed before run-time using an embodiment of a Multiprocessor Time Slot Right Shift procedure when given the feasible pre-run-time schedule on two processors in FIG. 8A.

The initial latest-start-time schedule on two processors and the latest start times and end times for the set of real-time processes are computed off-line by an embodiment a Multiprocessor Time Slot Right Shift procedure from the original feasible pre-run-time schedule, and will be used at run-time t=0, and at the beginning of each Least Common Multiple of the real-time process periods.

FIGS. 8D-8O show latest-start time schedules on two processors that could be re-computed during run-time more efficiently by the Second Illustrative Embodiment of the Method For Recomputing Latest Start Times on a Single Processor Or a Multiprocessor At Run Time.

Figure 8D:
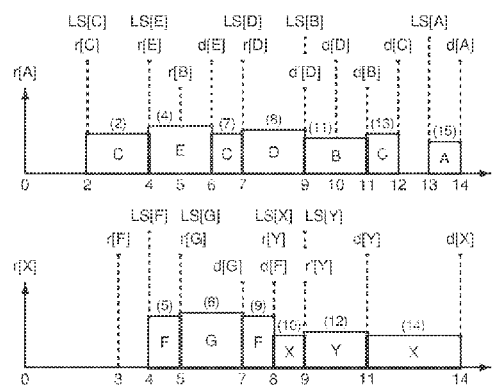

FIG. 8D shows examples of a latest-start-time schedule on two processors and the latest start times and end times for the set of real-time processes A, B, C, D, E, F, G, X, Y on two processors computed at run-time t=2.

Figure 8E:
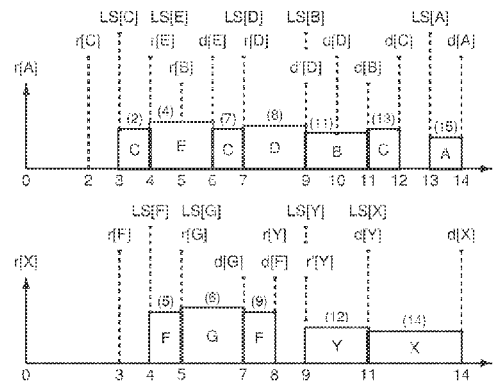

FIG. 8E shows examples of a latest-start-time schedule on two processors and the latest start times and end times for the set of real-time processes A, B, C, D, E, F, G, X, Y on two processors computed at run-time t=3.

Figure 8F:
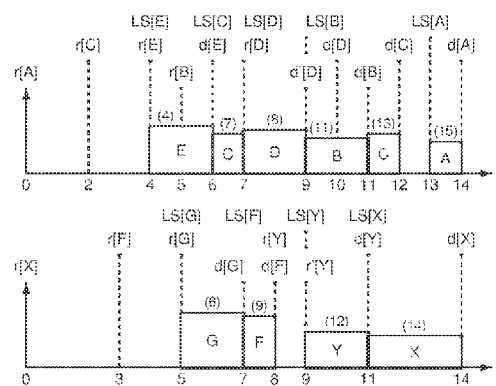

FIG. 8F shows examples of a latest-start-time schedule on two processors and the latest start times and end times for the set of real-time processes A, B, C, D, E, F, G, X, Y on two processors computed at run-time t=4.

Figure 8G:
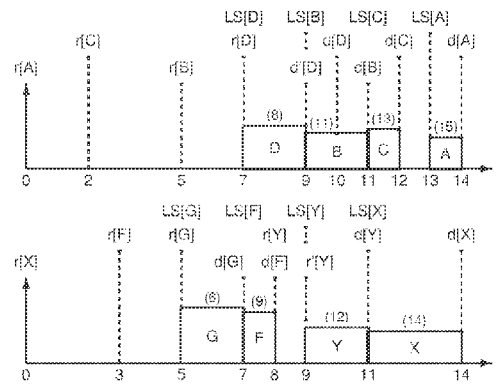

FIG. 8G shows examples of a latest-start-time schedule on two processors and the latest start times and end times for the set of real-time processes A, B, C, D, F, G, X, Y on two processors computed at run-time t=5.

Figure 8H:
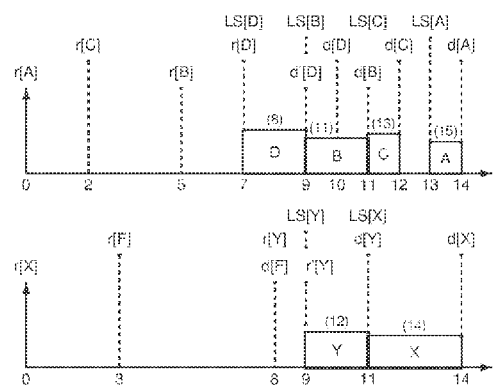

FIG. 8H shows examples of a latest-start-time schedule on two processors and the latest start times and end times for the set of real-time processes A, B, C, D, X, Y on two processors computed at run-time t=6.

Figure 8I:
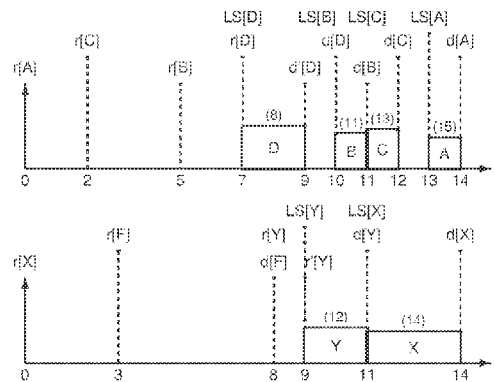

FIG. 8I shows examples of a latest-start-time schedule on two processors and the latest start times and end times for the set of real-time processes A, B, C, D, X, Y on two processors computed at run-time t=7.

Figure 8J:
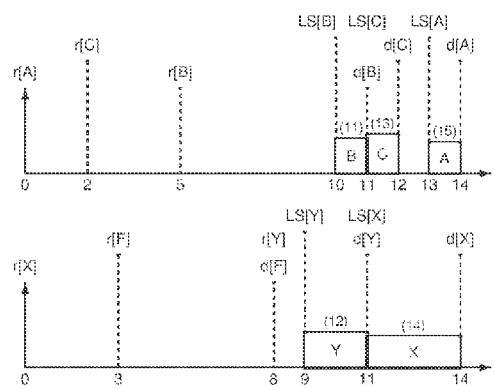

FIG. 8J shows examples of a latest-start-time schedule on two processors and the latest start times and end times for the set of real-time processes A, B, C, X, Y on two processors computed at run-time t=8.

Figure 8K:
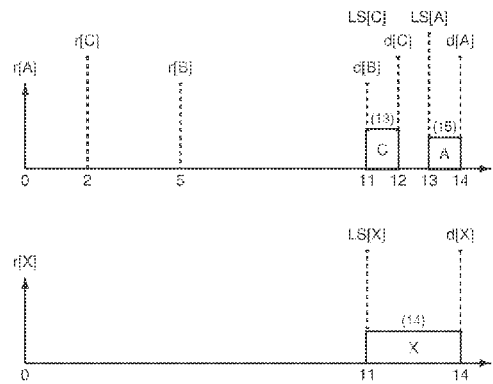

FIG. 8K shows examples of a latest-start-time schedule on two processors and the latest start times and end times for the set of real-time processes A, C, X on two processors computed at run-time t=9.

Figure 8L:
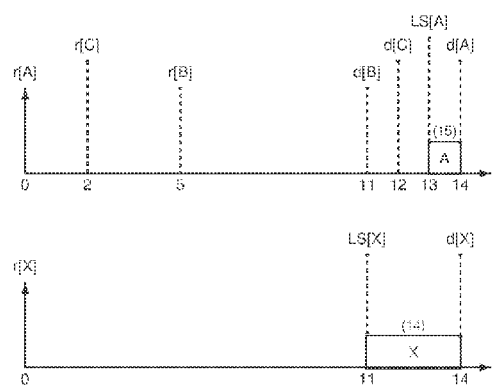

FIG. 8L shows examples of a latest-start-time schedule on two processors and the latest start times and end times for the set of real-time processes A, X on two processors computed at run-time t=10.

Figure 8M:
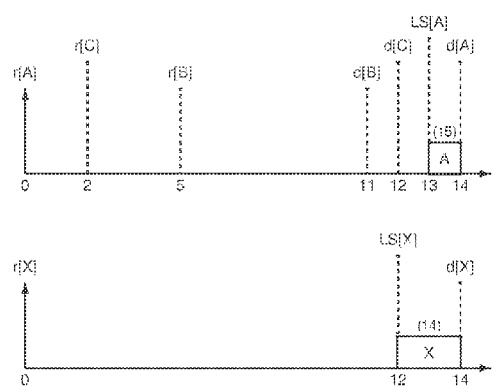

FIG. 8M shows examples of a latest-start-time schedule on two processors and the latest start times and end times for the set of real-time processes A, X on two processors computed at run-time t=11.

Figure 8N:
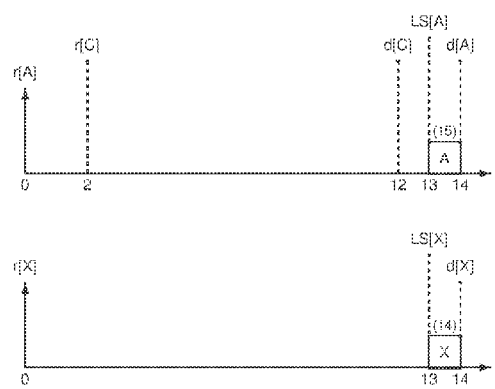

FIG. 8N shows examples of a latest-start-time schedule and the latest start times and end times for the set of real-time processes A, X on two processors computed at run-time t=12.

Figure 8O:
Figure 8O:
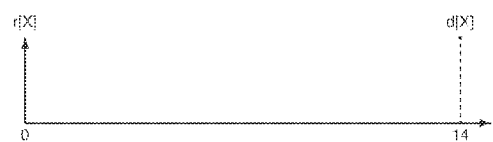

FIG. 8O shows an example of a latest-start-time schedule on two processors computed at run-time t=13.

Figure 9B:
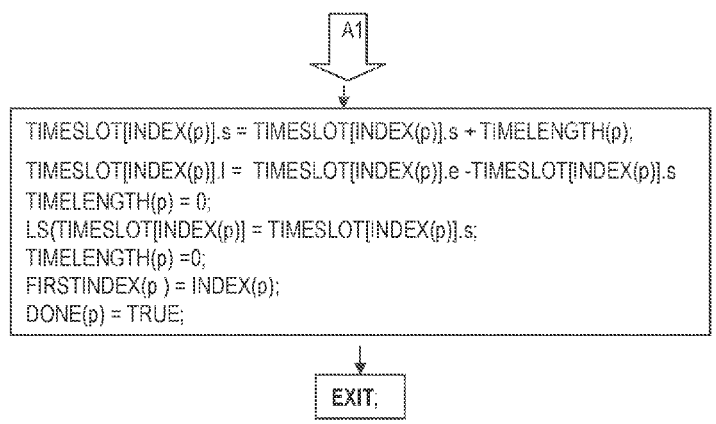

FIGS. 9A and 9B show an example of a flowchart for Step (A) of the Second Illustrative Embodiment of the Method For Recomputing Latest Start Times on a Single Processor Or Multiprocessor At Run Time.

Figure 9C:
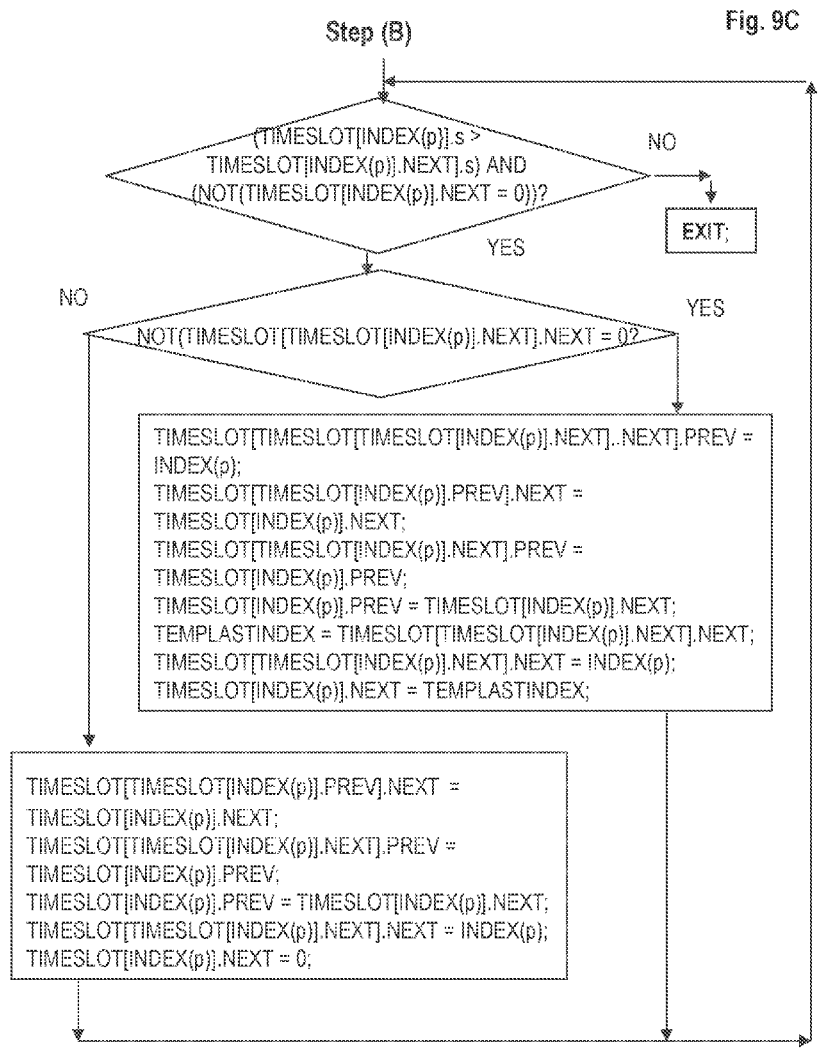

FIG. 9C shows an example of a flowchart for Step (B) of the Second Illustrative Embodiment of the Method For Recomputing Latest Start Times on a Single Processor Or Multiprocessor At Run Time.

Figure 9D:
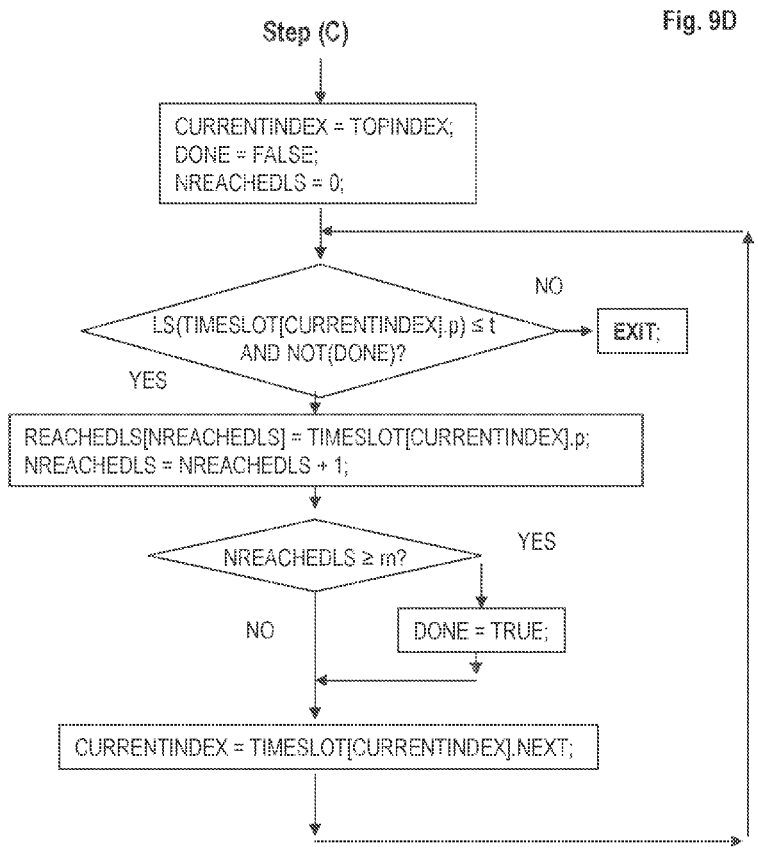

FIG. 9D shows an example of a flowchart for Step (C) of the Second Illustrative Embodiment of the Method For Selecting Processes For Execution on a Single Processor Or Multiprocessor At Run Time.

FIG. 9E shows an example of a flowchart for Step (D) of the Second Illustrative Embodiment of the Method For Selecting Real-Time Processes For Execution on a Single Processor Or Multiprocessor At Run Time.

Figure 9F:
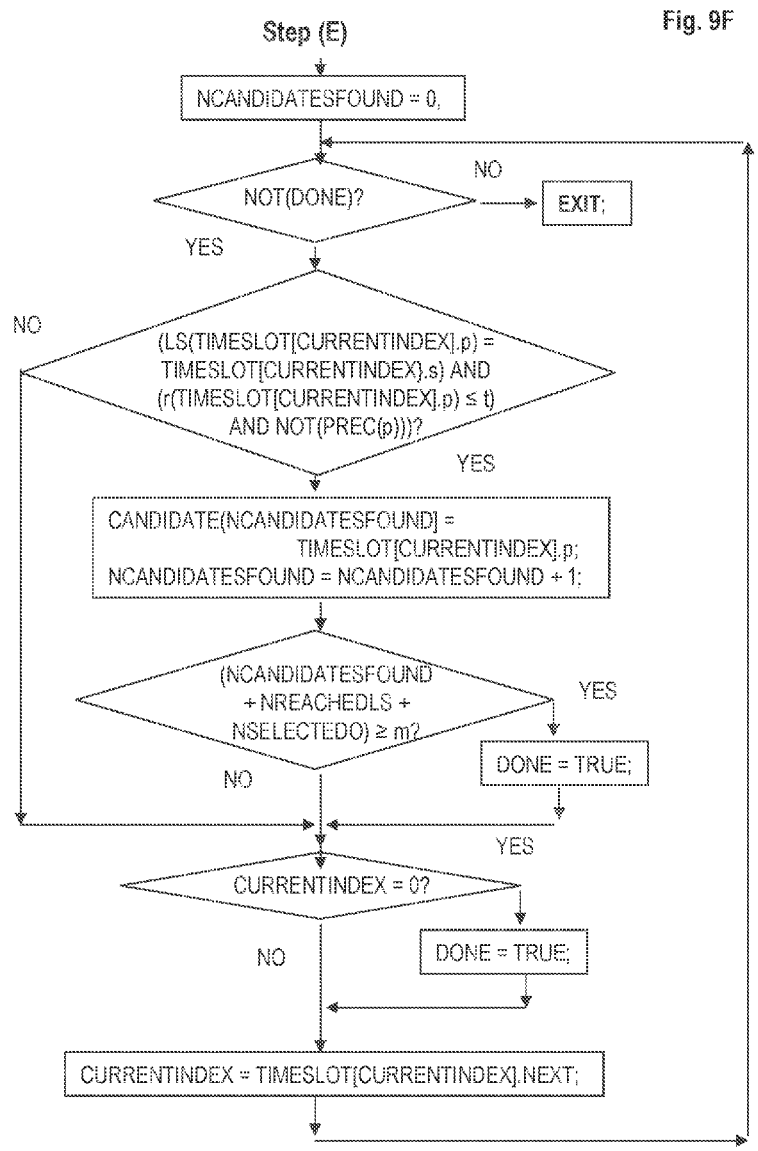

FIG. 9F shows an example of a flowchart for Step (E) of the Second Illustrative Embodiment of the Method For Selecting Real-Time Processes For Execution on a Single Processor Or Multiprocessor At Run Time.

FIGS. 9G and 9H show an example of a flowchart for of the Second Illustrative Embodiment of the Main Run-Time Scheduler Method For Scheduling Real-Time Processes on a Single Processor Or Multiprocessor At Run Time.

DESCRIPTION OF THE EMBODIMENTS

In the following detailed description of embodiments of the system and method, reference is made to the accompanying drawings which form a part hereof, and in which is shown by way of illustration specific embodiments in which the methods may be practiced. These embodiments are described in sufficient detail to enable those skilled in the art to practice the method, and it is to be understood that other embodiments may be utilized and that logical, mechanical, and electrical changes may be made without departing from the spirit and scope of the present methods. The following detailed description is, therefore, not to be taken in a limiting sense, and the scope of the present method is defined only by the appended claims.

Example embodiments will now be given which illustrate operation and advantages of the present system and method. Some of the embodiments will be described in pseudocode, which is a shorthand form of English understandable to persons skilled in the field of this method.

FIG. 6 illustrates an example of a system on which the embodiments described herein can be carried out. Plural input devices or systems 1, plural output devices or systems 4, a single processor or multiprocessor interrupt mechanism 5, plural timers 6, a single processor or multiprocessor 2, and memory 3 are coupled together in a system on which the embodiments described herein can be carried out.

Any of plural input devices or systems 1 provides input signals which require processing. For example, input devices or systems can be a keyboard, a sensor, an emergency response telephone system, an alarm clock, a program running in background on a processor, a pipeline, an automotive navigation system, an on-board aircraft surveillance radar system, etc.

Any of plural output devices or systems 4, which receives the output result of the execution of the real-time periodic and asynchronous processes by the single processor or multiprocessor 2. For example, output devices or systems can be actuators, a display, an automotive navigation system, an on-board aircraft surveillance radar system, etc.

A single processor or multiprocessor 2 can be any physical or virtual structure which can perform one or more functions. A single processor or multiprocessor can be one or more machines, computer processors, logic devices, etc. It should be noted that while the described embodiments can be carried out in a software programmed single processor or multiprocessor, and have been described with such a single processor or multiprocessor as an example, they, or one or more steps in the embodiments, can alternatively be carried out by hardware such as gate arrays or by other fixed or programmable structures, or combinations of these structures.

A single processor or multiprocessor interrupt mechanism 5 in combination with plural timers 6 can be programmed to interrupt and cause the preemption of the executions of one or more particularly chosen processes among the real-time periodic or asynchronous processes 7 on one or more particularly chosen processors on the single processor or multiprocessor 2 at any particularly chosen times, and activate a run-time scheduler 10 to perform run-time scheduling of the periodic or asynchronous processes 7 on the single processor or multiprocessor 2 at predetermined times. The plural timers 6 can also be used to keep track of the current time, and the amount of time that each periodic or asynchronous real-time processes 7 had been executing on the single processor or multiprocessor 2.

A memory 3 stores real-time periodic and asynchronous processes 7, e.g. series of instructions, for carrying out various real-time industrial processes. The memory can be in the form of any storage structure, and can be, for instance a store for a series of electronic, pneumatic, hydraulic, etc. control signals for operating a plurality of industrial real-time processes that require scheduling in accordance with the demands of the input signals. In one embodiment, the memory can be a random access memory, of well known form and the input signals can be electronic. In another embodiment, in the case in which the memory is in the form of industrial real-time process structures, the input signals can be fluids, photons, objects, audio, data or other signals, etc, which are to be scheduled to be processed by the various real-time periodic and asynchronous industrial processes.

The memory 3 may also store a run-time scheduler 10, a run-time schedule 11, a latest-start-time scheduler 12, an initial latest-start-time schedule 13 which is computed off-line and used at the beginning of each least-common-multiple of the periodic real-time process periods, a latest-start-time schedule 14 which is updated from time to time, and a pre-run-time scheduler 8 and pre-run-time schedule 7, for scheduling the execution of the real-time periodic and asynchronous processes 7 stored in the memory 3.

A real-time periodic or real-time asynchronous process 7 can be any task or job that requires a finite amount of time to complete on a certain processor 2 and must be completed before a specified deadline. For example, a real-time periodic task 7 can be an avionics task in a traffic alert and collision avoidance system which inputs transponder interrogation signals sent by other aircraft that are received by an input device or system 1 consisting of an on-board aircraft surveillance radar system, processes those transponder interrogation signals sent by other aircraft to detect the location, direction, and speed of nearby aircraft, and generates output transponder signals to an output device or system 4 consisting of an on-board aircraft surveillance radar system to interrogate all other aircraft in a determined range about their position, direction, and speed, and reply to the interrogations sent by other aircraft, and automatically negotiate a mutual avoidance maneuver between two (or more) conflicting aircraft in order to avoid a midair collision whenever a midair collision threat is detected. This interrogation-and-response cycle may occur periodically and the task has a specified deadline—the task must be completed on or before the end of each interrogation-and-response cycle period, otherwise the entire traffic alert and collision avoidance system may fail and result in a midair collision, so in this case the task will be a safety-critical real-time periodic process 7. When a pilot presses a button on the input button device or system 1, to initiate an emergency operation to modify the flight path of the aircraft in order to avoid a midair collision, the task which detects the input signal from the input button device or system 1, initiates the emergency operation, and sends output signals to an output device or system 4 consisting of an on-board aircraft surveillance radar system, to send an output transponder signal to the other aircraft, to inform the other aircraft of details of the emergency operation such as whether this aircraft will climb or descend, could be a task that is started at any point in time, and the task must also be completed so that the output devices or systems receive the output results on or before a specified strict deadline, otherwise the other aircraft may not receive information about the emergency operation, and the flight paths of both aircraft may not be modified correctly or in time to avoid a midair collision, so in the latter case the task could be a safety-critical real-time asynchronous task 7.

Computation time is the amount of time that a real-time periodic or asynchronous process requires from start to completion on a certain single processor or multiprocessor.

In operation, the system receives input signals from the input devices and systems 1 which demand that specific real-time periodic and asynchronous processes 7 stored in the memory 3 (or which are received from other control or interrupt inputs, not shown) are executed on either a single processor or a multiprocessor 2 and completed before their respective deadlines and also satisfy various additional constraints such as exclusion relations to prevent errors caused by simultaneous access a shared data resource by the real-time periodic and asynchronous processes, and precedence relations to ensure proper order of the executions of the real-time periodic and asynchronous processes. Before run-time, the latest start time scheduler 12, may use information in the pre-run-time schedule 9 and other system and application code and data 15 stored in the memory 3, and the characteristics of the real-time periodic and asynchronous processes 7 from the memory 3, to create an initial latest-start-time schedule 13 on either a single processor or a multiprocessor. At run-time, the run-time scheduler 10 uses information about the latest start times of the real-time periodic processes that have not completed and have not overrun in the initial latest-start-time schedule 13, or in a latest start time schedule 14 which is updated from time to time during run-time and stored in memory 3 by the run-time scheduler when there is sufficient time to perform the update and when the current latest start time has changed when compared with the most recently stored latest start time for one or more real-time periodic processes that have not completed and have not overrun, to schedule the real-time periodic and asynchronous processes 7 on either a single processor or a multiprocessor 2, producing output signals to the output devices or systems 4, and producing a run-time schedule 11 on the single processor or multiprocessor in which all the real-time periodic and asynchronous processes 7 are completed and the corresponding output devices or systems 4 receive the output results of the computations of the real-time periodic and asynchronous processes 7 before specified deadlines and also satisfy various additional constraints such as exclusion relations and precedence relations. The single processor or multiprocessor timer interrupt mechanism 5 in combination with the one or more timers 6 can be programmed before run-time, or during run-time by the run-time scheduler 10, to interrupt and cause the pre-emption of one or more particularly chosen real-time periodic or asynchronous processes 7 on one or more particularly chosen processors on the single process or multiprocessor 2 at any particularly chosen times, for example at the deadline, or latest start time, or release time of a real-time periodic process 7, and re-activate the run-time scheduler 10. The run-time scheduler 10 can be activated by interrupts generated by the single processor or multiprocessor timer interrupt mechanism 5 in combination with the one or more timers 6, or can be activated by the completion of a real-time periodic or asynchronous process 7, or can be activated by a request for an execution of a specific real-time asynchronous process 7. The run-time scheduler 10 can schedule any of real-time periodic or asynchronous processes 7 to start execution on any of the available processors on the single processor or multiprocessor 2 at any appropriate time, let any of the real-time periodic or asynchronous processes 7 be preempted by any other real-time periodic or asynchronous processes 7 at any appropriate time if the preempting real-time process and preempted real-time process do not access a shared data memory resource, and let any of those real-time periodic or asynchronous processes 7 later resume execution on any of the available processors on the single processor or multi-processor 2, including on a processor that is different from the previously processor that any of the preempted real-time periodic or asynchronous processes 7 most recently executed on, at any appropriate time.

In a real-time system, it is critical that, once input signals from the plural input devices or systems 1 have been received by the system, the executions of real-time periodic and asynchronous processes 7, on the single processor or multiprocessor 2, must be able to complete processing of those input signals, and produce output signals that must be received by the plural output devices or systems 4 on or before very strict specified deadlines, otherwise the whole real-time system will fail with potentially very significant negative consequences, such as significant financial loss when a real-time control system for a chemical plant fails to function, or even loss of human life when an aircraft collision avoidance system fails or when the control system of a self driving car fails.

A main purpose of the system and method described in this application, is to maximize the chances that, once input signals from the plural input devices or systems 1 have been received by the system, the executions of real-time periodic and asynchronous processes 7, despite overrunning on the single processor or multiprocessor 2, will still be able to complete processing of those input signals, and produce the output signals that must be received by the plural output devices or systems 4 within the very strict specified deadlines, thereby increasing both system utilization and robustness in the presence of inaccurate estimates of the worst-case computations of the real-time processes, while simultaneously satisfying important constraints and dependencies, such as offsets, release times, precedence relations, and exclusion relations on either a single processor or a multiprocessor.

FIG. 5 provides another example of a single or multiprocessor system on which the embodiments described herein can be carried out. The real-time system includes memory 1, one or more single processors or one or more multiprocessors 2, one or more input devices or systems 3, one or more output devices or systems 4, one or more single processor or multiprocessor interrupt mechanisms 5, one or more timers 6; a plurality of real-time periodic processes $p_1, p_2, \ldots, p_n$ 7, a plurality of real-time asynchronous processes $a_1, a_2, \ldots, a_j$ 8, one or more run-time schedulers 9, one or more run-time schedules 10, one or more latest-start-time schedulers 11, one or more latest-start-time schedules 12, one or more pre-run-time schedulers 13, one or more pre-run-time schedules 14, a plurality of computed real-time process attributes 15, and other system data and application data and code 16, are stored in a memory 1. Each processor in the one or more single processors or one or more multiprocessors 2 may have local memory and shared memory (not shown). One or more pre-run-time schedulers 13 may construct one or more pre-run-time schedules 14, and one or more latest-start-time schedulers 11 may construct one or more latest-start-time schedules 12 before run-time, then one or more run-time schedulers 9 may use information in the one or more pre-run-time schedules 14, information in the one or more latest-start-time schedules 12, information in the one or more run-time schedules 6, to compute a plurality of real-time process attributes, and to schedule executions of the plurality of real-time periodic processes $p_1, p_2, \ldots, p_n$ 7, and a plurality of real-time asynchronous processes $a_1, a_2, \ldots, a_j$ 8, on the one or more single processors or one or more multiprocessors 2. The one or more run-time schedulers 9, working in combination with the one or more latest-start-time schedulers 11, may also generate or update one or more latest-start-time schedules 12, and may also modify or generate one or more run-time schedules 10 in the course of scheduling the plurality of periodic real-time processes $p_1, p_2, \ldots, p_n$ 7, and the plurality of asynchronous real-time processes $a_1, a_2, \ldots, a_j$ 8.

The plurality of real-time periodic processes $p_1, p_2, \ldots, p_n$ 7, and the plurality of real-time asynchronous processes $a_1, a_2, \ldots, a_j$ 8 may share memory and other resources.

Consequently, it is important to enforce exclusion relations on the execution of the real-time processes to prevent more than one real-time process from accessing a shared data memory resource at the same time.

The plurality of run-time schedulers 9, the plurality of latest-start-time schedulers 11, the plurality of pre-run-time schedulers 13, work together to control the execution of all the real-time periodic and asynchronous processes 7 and 8, and guarantee that the executions of the real-time periodic and asynchronous processes 7 and 8 on the one or more single processors or one or more multiprocessors 2 are completed before their respective deadlines and that all the constraints and relations among the real-time processes are satisfied.

Some applications of the present method can be in aircraft flight control, aircraft collision avoidance, control of a self driving car, plant process control, traffic control, communication systems, multimedia, signal control of the internet, electronic commerce, electronic buses, computer operation, etc.

It should be noted that, in the remaining portion of this specification, in order to avoid use of an exceedingly large number of repetitions of use of the word "real-time periodic process", or "real-time asynchronous process", these terms have been in many places herein abbreviated to the word "periodic process", and to "asynchronous process" respectively.

Periodic Processes

A periodic process consists of a computation that is executed repeatedly, once in each fixed period of time. A typical use of periodic processes is to read sensor data and update the current state of internal variables and outputs.

A periodic process p can be described by a quintuple ($o_p$, $r_p$, $c_p$, $d_p$, $prd_p$), wherein $prd_p$ is the period. $c_p$ is the worse case computation time required by process p, dp is the deadline, i.e., the duration of the time interval between the beginning of a period and the time by which an execution of process p must be completed in each period, $r_p$ is the release time, i.e., the duration of the time interval between the beginning of a period and the earliest time that an execution of process p can be started in each period, and $o_p$ is the offset, i.e., the duration of the time interval between the beginning of the first period and time 0.

When there exists flexibility in assigning an offset value for a periodic process, a permitted range of the offset, offsetlowerbound(p)≤$o_p$≤offsetupperbound(p), instead of one fixed offset, can be specified for that process. A single offset value constraint is a special case of a permitted range of offset constraint.

It is assumed that $o_p$, $r_p$, $c_p$, $d_p$, $prd_p$ as well as any other parameters expressed in time have integer values. A periodic process p can have an infinite number of periodic process executions $p_0$, $p_1$, $p_2$, . . . , with one process execution for each period. For the ith process execution $p_i$ corresponding to the ith period, $p_i$'s release time is $r_{p_i}=o_p+r_p+prd_p\times(i-1)$; and $p_i$'s deadline is $d_{p_i}=o_p+d_p+prd_p\times(i-1)$.

Either uppercase letters or lowercase letters may be used to denote the release time and deadline respectively of a periodic process execution of some periodic process p.

It is noted that it is of common practice to include the system overhead in the computation time of the processes.

Reference is made to FIG. 11 and FIG. 12 in U.S. Pat. Nos. 7,444,638, and 7,165,252, for examples of periodic processes. FIG. 11 in U.S. Pat. Nos. 7,444,638, and 7,165, 252, illustrates the periodic process $p_B=(o_{p_B}, r_{p_B}, c_{p_B}, d_{p_B}, prd_{p_B})$ where $r_{p_B}=1$, $c_{p_B}=3$, $d_{p_B}=4$, $prd_{p_B}=12$, $o_{p_B}=0$. FIG. 12 in U.S. Pat. Nos. 7,444,638, and 7,165,252, illustrates the periodic process $p_D=(o_{p_C}, r_{p_C}, c_{p_C}, d_{p_C}, prd_{p_C})$ where $r_{p_C}=0$, $c_{p_C}=4$, $d_{p_C}=4$, $prd_{p_C}=12$, $o_{p_C}=7$.

Asynchronous Processes

An example of an asynchronous process is one which consists of a computation that responds to internal or external events. A typical use of an asynchronous process is to respond to operator requests. Although the precise request times for executions of an asynchronous process a are not known in advance, usually the minimum amount of time between two consecutive requests $min_a$ is known in advance. An asynchronous process a can be described by a triple ($c_a$, $d_a$, $min_a$). $c_a$ is the worse case computation time required by process a. $d_a$ is the deadline, i.e., the duration of the time interval between the time when a request is made for process a and the time by which an execution of process a must be completed.

An asynchronous process a can have an infinite number of asynchronous process executions $a_0$, $a_1$, $a_2$, . . . , with one process execution for each asynchronous request. For the ith asynchronous process execution $a_i$ which corresponds to the ith request, if $a_i$'s request (arrival) time is $R_{a_i}$, then $a_i$'s deadline is $D_{a_i}=R_{a_i}+d_a$.

Either uppercase letters or lowercase letters may be used to to denote the request (arrival) time and deadline respectively of an asynchronous process execution of some asynchronous process a.

Schedules

If a periodic process p or an asynchronous process a has a computation time of $c_p$ or $c_a$, then it is assumed that that process execution $p_i$ or $a_i$ is composed of $c_p$ or $c_a$ process execution units. Each processor is associated with a processor time axis starting from 0 and is divided into a sequence of processor time units.

A schedule is a mapping from a possibly infinite set of process execution units to a possibly infinite set of processor time units on one or more processor time axes. The number of processor time units between 0 and the processor time unit that is mapped to by the first unit in a process execution is called the start time of that process execution. The number of time units between 0 and the time unit subsequent to the processor time unit mapped to by the last unit in a process execution is called the completion time of that process execution. A feasible schedule is a schedule in which the start time of every process execution is greater than or equal to that process execution's release time or request time, and its completion time is less than or equal to that process execution's deadline.

Reference is made to FIGS. 4, 5, 6, 8, 11A, 12A, 13A, 14A in U.S. Pat. Nos. 7,444,638, and 7,165,252, which show examples of feasible schedules, wherein the horizontal axis is the time axis, and time period segments are separated by vertical lines which represent release times and deadlines.

It should be noted that, in order to avoid use in this specification of an exceedingly large number of repetitions of use of the word "executions of process", or "executions of process i", these terms have been in many places herein abbreviated to the word "process", or to simply "i". Thus whenever there is a reference to the term "process" as related to a schedule, the term "process", or "process i", or "i" when i is the name of a process should be understood as meaning "process execution" or "the execution of process i".

Process Segments

Each process p may consist of a finite sequence of segments p(0), p(1), . . . , p(n(p)), where p(0) is the first segment and p(n(p)) is the last segment in process p. Given the release time $r_p$, deadline $d_p$ of process p and the computation time of each segment p[i] in process p, one can easily compute the release time and deadline for each segment, as described in the aforenoted 1993 article by Xu and Parnas.

Parallel computations can be represented by several processes, with various types of relations defined between individual segments belonging to different processes, and processes can be executed concurrently; thus requiring each process to be a sequence of segments does not pose any significant restrictions on the amount of parallelism that can be expressed.

Precedence and Exclusion Relations

Various types of relations such as precedence relations and exclusion relations may exist between ordered pairs of processes segments. A process segment i is said to precede another process segment j if j can only start execution after i has completed its computation. Precedence relations may exist between process segments when some process segments require information that is produced by other process segments.

A process segment i is said to exclude another process segment j if no execution of j can occur between the time that i starts its computation and the time that i completes its computation. Exclusion relations may exist between process segments when some process segments must prevent simultaneous access to shared resources such as data and I/O devices by other process segments.

Main Types of Processes

The main types of processes that are considered herein are the following:

Set P-h-k: Periodic processes with hard deadlines and known characteristics. Each such process may consist of one or more segments, with precedence relations defined on them to enforce the proper ordering of segments belonging to the same process. It is assumed that the following characteristics are known for each such process segment before run-time:
period,
worst-case execution time,
release time,
deadline,
permitted range of the offset,
the set of data that each segment reads and writes,
any exclusion relationships with other process segments,
any precedence relationships with other periodic process segments.

Set A-h-k: Asynchronous processes with hard deadlines and known characteristics. It is assumed that each such process consists of a single segment and the following are known for each such process before run-time:
deadline,
worst-case execution time,
minimum time between two consecutive requests,
the set of data that the process reads and writes,
any exclusion relationships with other process segments.

Set P-s-k: Periodic processes with soft deadlines and known characteristics. Each such process consists of one or more segments, with precedence relations defined on them to enforce the proper ordering of segments belonging to the same process. It is assumed that the following are known for each such process before run-time:
period,
worst-case execution time,
release time,
deadline,
permitted range of the offset,
the set of data that the process reads and writes,
any exclusion relationships with other process segments,
any precedence relationships with other periodic process segments.

Set A-s-k: Asynchronous processes with soft deadlines and known characteristics. It is assumed that each such process consists of a single segment and the following are known for each such process before run-time:
deadline,
worst-case execution time,
the set of data that the process reads and writes,
any exclusion relationships with other process segments.

Set A-s-u: Asynchronous processes with soft deadlines and unknown characteristics. It is assumed that each such process consists of a single segment and nothing else is known about each such process before run-time.

In the following, as well as in the method described in the 1993 article by Xu and Parnas referred to above, it is assumed that the basic scheduling unit is a segment. The terms "segment" and "process will also be considered as having the same meaning.

Pre-Run-Time Phase

Pre-Run-Time Phase 1: Generation of a Feasible Pre-Run-Time Schedule on Either a Single Processor or a Multiprocessor Embodiments of methods that can be used for generating a feasible pre-run-time schedule in the pre-run-time phase are explained in detail in U.S. Pat. Nos. 7,444,638, and 7,165,252. U.S. Pat. Nos. 7,444,638, and 7,165,252 are incorporated herein by reference.

Since embodiments of methods that can be used for generating a feasible pre-run-time schedule in the pre-run-time phase are explained in detail in U.S. Pat. Nos. 7,444,638, and 7,165,252, in the following we will only briefly describe one of the embodiments of methods to generate a feasible pre-run-time schedule in the pre-run-time phase.

In Pre-Run-Time Phase 1, Step 1, of an embodiment to generate a feasible pre-run-time schedule on either a single processor or a multiprocessor, the pre-run-time scheduler divides asynchronous processes with hard deadlines and known characteristics, referred to herein as A-h-k processes, into two subsets. One subset of asynchronous processes, referred to herein as A-h-k-p processes, are converted into new periodic processes by the pre-run-time scheduler before run-time. When the pre-run-time scheduler converts an asynchronous process into a new periodic process, it prevents possible timing conflicts with other periodic and asynchronous processes, by reserving enough "room" (time) prior to each new periodic process's deadline, to accommodate the computation times of all the periodic and asynchronous processes that have less latitude in meeting their deadlines, to allow such processes to preempt that new periodic process if possible at run-time. The processes in the other subset of asynchronous processes, referred to herein as A-h-k-a, remain asynchronous and are scheduled by the run-time scheduler at run-time. The pre-run-time scheduler reserves processor capacity for A-h-k-a processes by adding the computation time of each A-h-k-a process to the computation time of every periodic process that has a greater latitude in meeting its deadline than that A-h-k-a process, to allow each A-h-k-a process to preempt the execution of any such periodic process if possible at run-time.

Whether each asynchronous process is converted into a new periodic process or not, is determined based on whether the ratio of the processor capacity that needs to be reserved for the new periodic process, to the processor capacity that needs to be reserved for the asynchronous process if unconverted, exceeds a specified threshold.

(See U.S. Pat. No. 7,444,638, col. 20, line 45, to col. 28, line 25; and U.S. Pat. No. 7,165,252, col. 20, line 29, to col. 28, line 5, "Pre-Run-Time Phase, Step 1: Conversion of A-h-k-p-a processes," for detailed descriptions of embodiments of a Pre-Run-Time Phase 1, Step 1, to generate a feasible pre-run-time schedule.)

In Pre-Run-Time Phase 1, Step 2, of an embodiment to generate a feasible pre-run-time schedule, the pre-run-time scheduler determines the schedulability of the set of all periodic processes with hard deadlines and known characteristics, referred to herein as P-h-k processes, which also include the new periodic processes converted from A-h-k-p processes. The pre-run-time scheduler constructs a pre-run-time schedule in which one or more time slots are reserved for the execution of every P-h-k process, including every new P-h-k process converted from an A-h-k-p process. The time slots reserved for each P-h-k process also include time reserved for the executions of all A-h-k-a processes that have less latitude in meeting their deadlines than that P-h-k process, and which may preempt the execution of that P-h-k process. The pre-run-time scheduler adjusts the lengths of the periods using for example user or otherwise specified parameters which control the balance between the utilization level and the length of the pre-run-time schedule.

The pre-run-time scheduler is able to schedule periodic processes that have offsets, i.e., intervals between the start of a periodic process' first period and time zero. The pre-run-time scheduler takes advantage of any flexibility in periodic process offsets to increase schedulability. An embodiment of the present method allows the pre-run-time scheduler to use existing methods (including manual methods) which statically schedule set of processes, to construct the pre-run-time schedule of periodic processes in Step 2 and in Step 4 (to be described below), without requiring any change in the embodiments of the method used in any of the other steps of the embodiments of the present method. This allows the system and methods to have the flexibility to incorporate and take advantage of any future new static scheduling method for satisfying any additionally desired constraints among the most important and numerous type of processes in real-time applications, the periodic processes.

The pre-run-time scheduler includes a function "adjust-period" which uses a sorted list of reference periods to adjust the length of the period of each periodic process. Each reference period is equal to $2^i*3^j*5^k*7^l*11^f, \ldots$, for some integers i, j, k, l, f, . . . where $0 \le i \le exp2$, $0 \le j \le exp3$, $0 \le k \le exp5$, $0 \le l \le exp7$, $0 \le f \le exp11$, . . . exp2, exp3, exp5, exp7, exp11, . . . , are the upperbounds on the exponents i, j, k, l, f, . . . , that are applied to the prime numbers 2, 3, 5, 7, 11, . . . . Application dependent parameters are used to fine tune the exponent upperbounds which control the balance between the utilization level and the length of the pre-run-time schedule.

(See U.S. Pat. No. 7,444,638, col. 28, line 27, to col. 37, line 27; and U.S. Pat. No. 7,165,252, col. 28, line 7, to col. 36, line 47, "Pre-Run-Time Phase, Step 2: Construct a Feasible Pre-Run-Time Schedule for the P-h-k Processes," for detailed descriptions of embodiments of a Pre-Run-Time Phase 1, Step 2, to generate a feasible pre-run-time schedule.)

In Pre-Run-Time Phase 1, Step 3, of an embodiment to generate a feasible pre-run-time schedule, the pre-run-time scheduler uses knowledge about the time slots reserved for the P-h-k processes in the pre-run-time schedule, to determine, before run-time, the worst-case response times of all A-h-k-a processes. The pre-run-time scheduler may use one of two embodiments of the method, one a formula, the other a simulation procedure, for determining the worst-case response time of each A-h-k-a process. The pre-run-time scheduler verifies the schedulability of each A-h-k-a asynchronous process by checking whether its deadline is greater than or equal to its worst-case response time. Thus, the pre-run-time scheduler provides an a priori guarantee that all periodic and asynchronous processes with hard deadlines and known characteristics will always meet their deadlines.

(See U.S. Pat. No. 7,444,638, col. 37, line 28, to col. 45, line 3; and U.S. Pat. No. 7,165,252, col. 36, line 48, to col. 44, line 57, "Pre-Run-Time Phase, Step 3: Determine the Worst-Case Response Times of the A-h-k-a Processes," for detailed descriptions of embodiments of a Pre-Run-Time Phase 1, Step 3, to generate a feasible pre-run-time schedule.)

In Pre-Run-Time Phase 1, Step 4, of an embodiment to generate a feasible pre-run-time schedule, the pre-run-time scheduler determines the schedulability of all the periodic processes with soft deadlines and known characteristics, called P-s-k processes, under the condition that all the P-h-k processes and A-h-k-a processes that are guaranteed to be schedulable in the previous steps are still schedulable. The pre-run-time scheduler re-constructs the pre-run-time schedule in which one or more time slots are reserved for the execution of every P-h-k process (including every new P-h-k process converted from an A-h-k-p process), and for every P-s-k process. The time slots reserved for each P-h-k or P-s-k process also include time reserved for the executions of all A-h-k-a processes that have deadlines that are shorter than that P-h-k or P-s-k process' deadline, and which may preempt the execution of that P-h-k or P-s-k process. The pre-run-time scheduler uses the embodiments of the methods in the previous step that take into account knowledge about the time slots reserved for the P-h-k and P-s-k processes in the pre-run-time schedule to determine again, before run-time, the worst-case response times of every A-h-k-a process.

(See U.S. Pat. No. 7,444,638, col. 45, line 4, to col. 48, line 44; and U.S. Pat. No. 7,165,252, col. 44, line 59, to col. 48, line 50, "Pre-Run-Time Phase, Step 4: A Feasible Pre-Run-Time Schedule for the P-s-k and P-h-k Processes is Constructed," for detailed descriptions of embodiments of a Pre-Run-Time Phase 1, Step 4, to generate a feasible pre-run-time schedule.)

In Pre-Run-Time Phase 1, Step 5, of an embodiment to generate a feasible pre-run-time schedule, the pre-run-time scheduler uses knowledge about the time slots reserved for the P-h-k and P-s-k processes in the pre-run-time schedule to determine, before run-time, the worst-case response times of asynchronous processes with soft deadlines and known characteristics, i.e., A-s-k processes.

(See U.S. Pat. No. 7,444,638, col. 48, line 46, to col. 50, line 29; and U.S. Pat. No. 7,165,252, col. 48, line 51, to col. 50, line 47, "Pre-Run-Time Phase, Step 5: Determine the Worst-Case Response Times of the A-s-k Processes," for detailed descriptions of embodiments of a Pre-Run-Time Phase 1, Step 5, to generate a feasible pre-run-time schedule.)

At the end of an embodiment of Pre-Run-Time Phase 1, a feasible schedule for a set of processes that satisfies all the release times, deadlines, precedence and exclusion constraints, on a uniprocessor, or on a multiprocessor, will have been constructed for all occurrences of all the P-h-k and P-s-k processes within the interval [0, $\max\{o_{p_i}|\forall p_i\}$+ $3*prd_{LCM}$], where $prd_{LCM}$ is the least common multiple of the process periods.

The set of P-h-k and P-s-k processes will be referred to as the set of guaranteed periodic processes P-g.

It is hereby emphasized that, for the embodiments of the method described in the remaining part of this disclosure to function correctly and properly, it is not necessary to use the above embodiments of Pre-Run-Time Phase 1, to generate a feasible schedule. For the embodiments of the method described in the remaining part of this disclosure to function correctly and properly, any method for generating a feasible schedule can be used, as long as the feasible schedule satisfies all the important constraints that need to be satisfied by the application, including offset, release times, deadlines, precedence and exclusion constraints for all the periodic processes with hard deadlines; and worst-case response times for all the asynchronous processes with hard deadlines.

Pre-Run-Time Phase 2: Determining the Latest Start Time for Each pH-k Process Given a Feasible Pre-Run-Time Schedule on Either a Single Processor or a Multiprocessor Notation The following notation is used below to denote the beginning and end of the time slot of each process in a pre-run-time schedule, the actual start time and actual completion time of each process, the remaining worst-case computation time of each process, and the most recent actual arrival time of an asynchronous process at run-time.

s(p): s(p) is the time of the beginning of the time slot that was reserved for periodic process p in the pre-run-time schedule.

s'(x): s'(x) is the actual time that periodic process or asynchronous process x was/will be put into execution at run-time. At any time t, if periodic or asynchronous process x has been put into execution after or at time t, then t≤s'(x) is true, otherwise ¬(t≤s'(x)) is true.

s'(p) depends on the arrival times of asynchronous processes $a_j$ and whether and at what time they preempt periodic processes. s'(p) also depends on the actual execution times of other processes that are executed prior to p's execution at run-time.

e(p): e(p) is the time of the end of the time slot that was reserved for periodic process p in the pre-run-time schedule.

e'(x): e'(x) is the actual time at which asynchronous or periodic process x's execution ends at run-time. At any time t, if periodic or asynchronous process x's execution has ended after or at time t, then t≤e'(x) is true, otherwise if x's execution has not ended before or at time t, then ¬(t≤e'(x)) is true.

C'(x): C'(x) is the remaining worst-case computation time of periodic process or asynchronous process x at run-time.

R'(a): R'(a) is the most recent actual arrival time of asynchronous process a at run-time. At any time t, if asynchronous process a has arrived before or at time t, then R'(a)≤t is true, otherwise ¬(R'(a)≤t) is true. At any time t, if asynchronous process a has arrived at least once before time t and after or at time 0, then 0≤R'(a) is true, otherwise if a has never arrived before or at time t, then ¬(0≤R'(a)) is true.

Figure 1A:
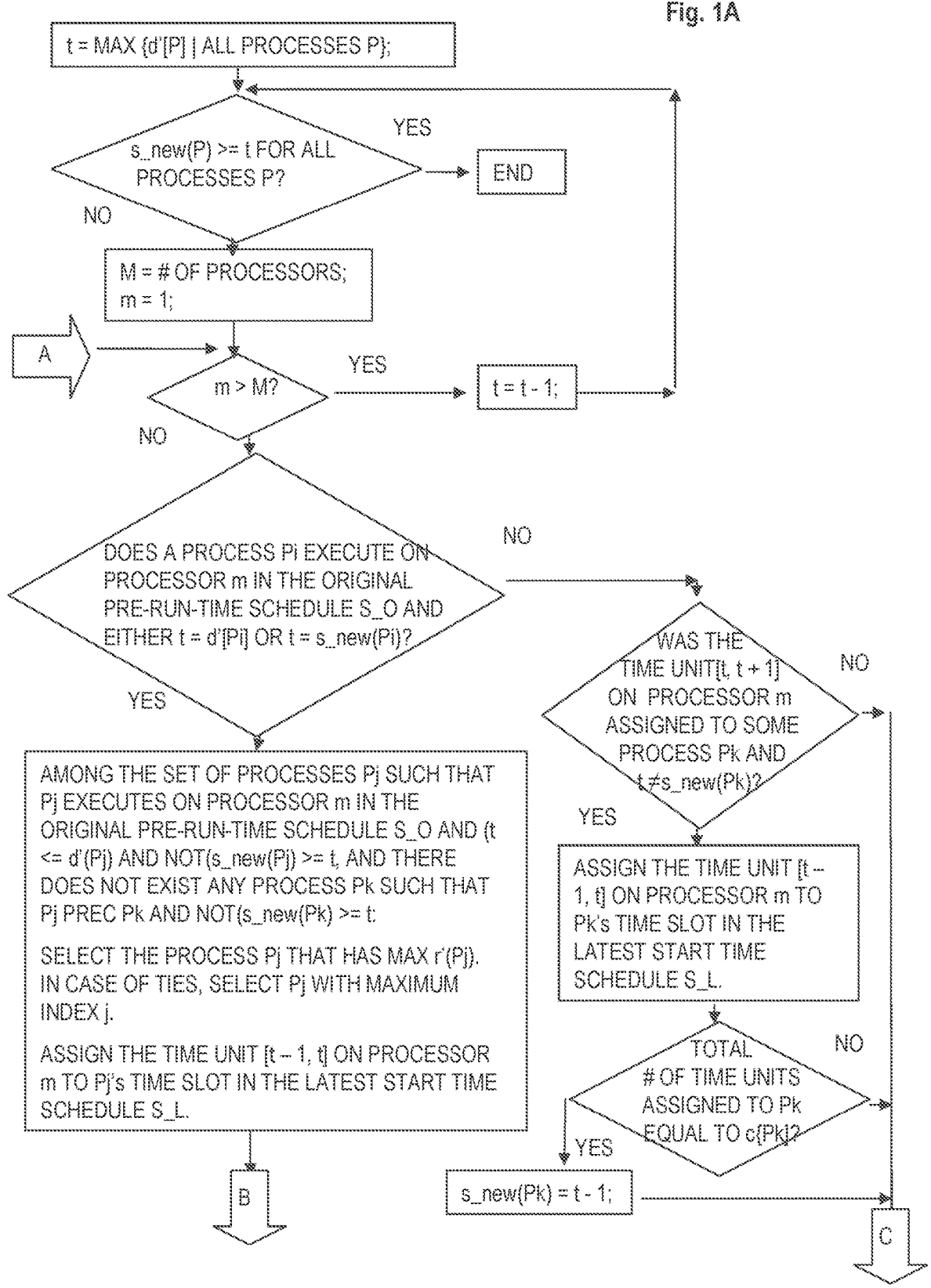
Figure 1B:
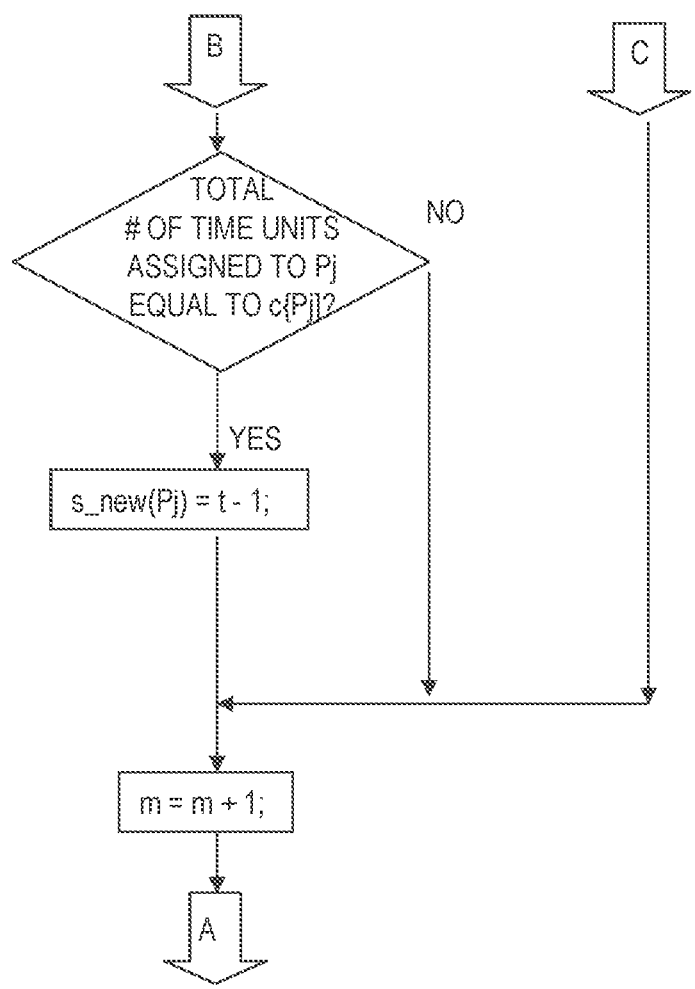
Figure 2A:
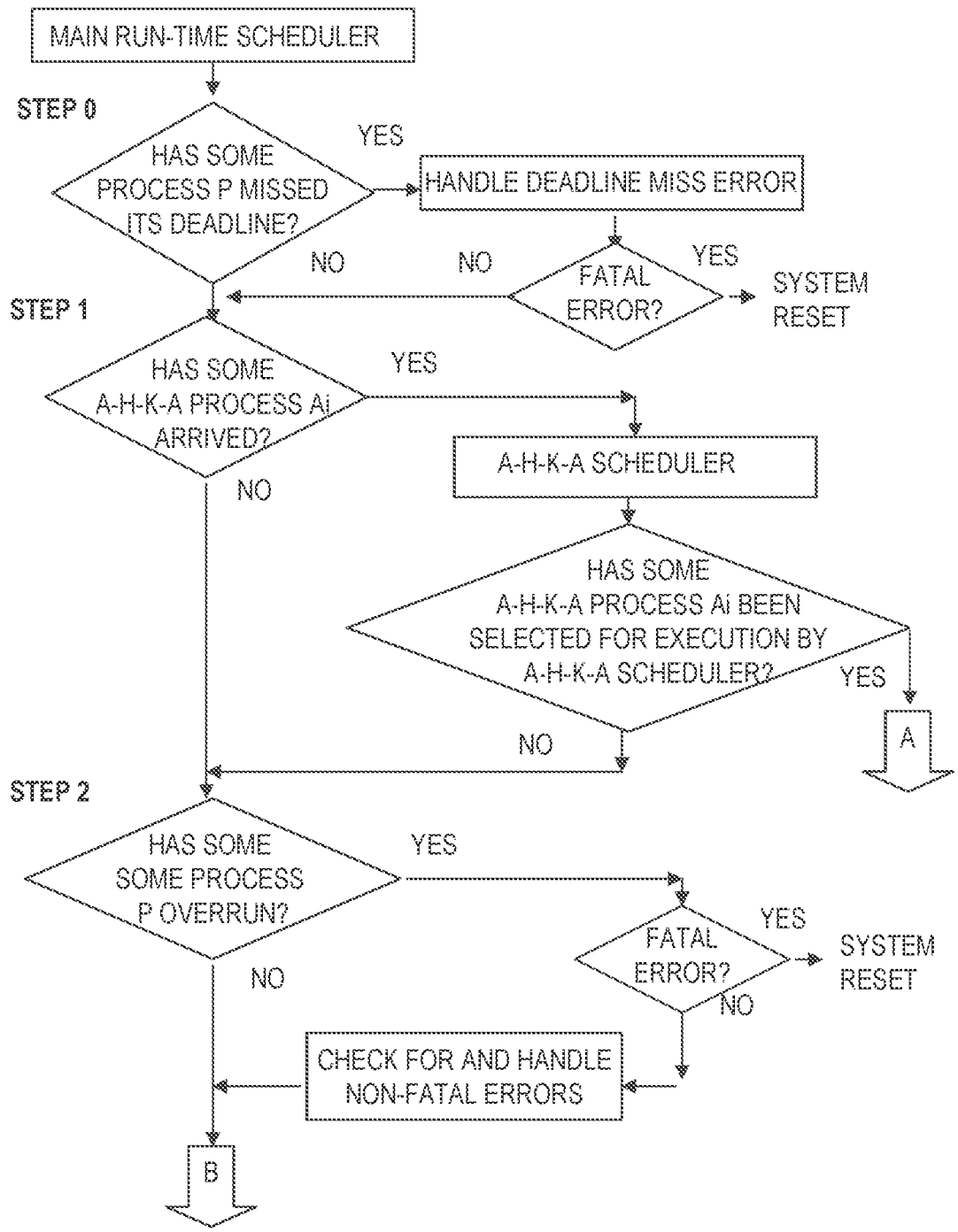
Figure 2B:
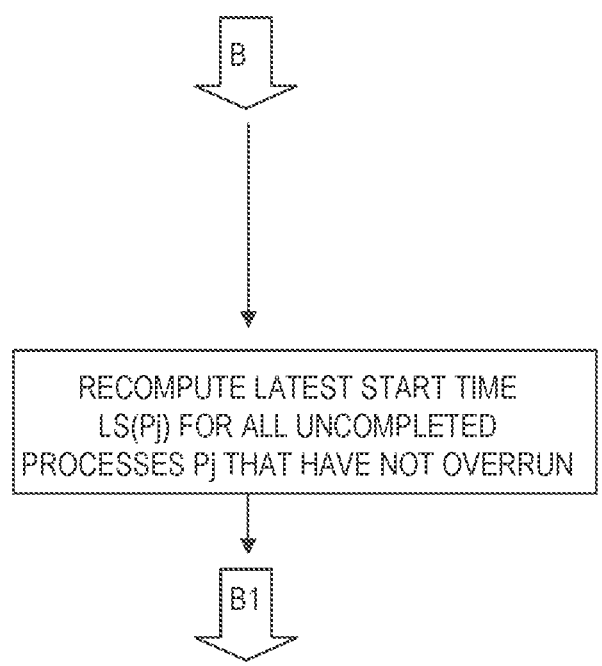
Figure 2C:
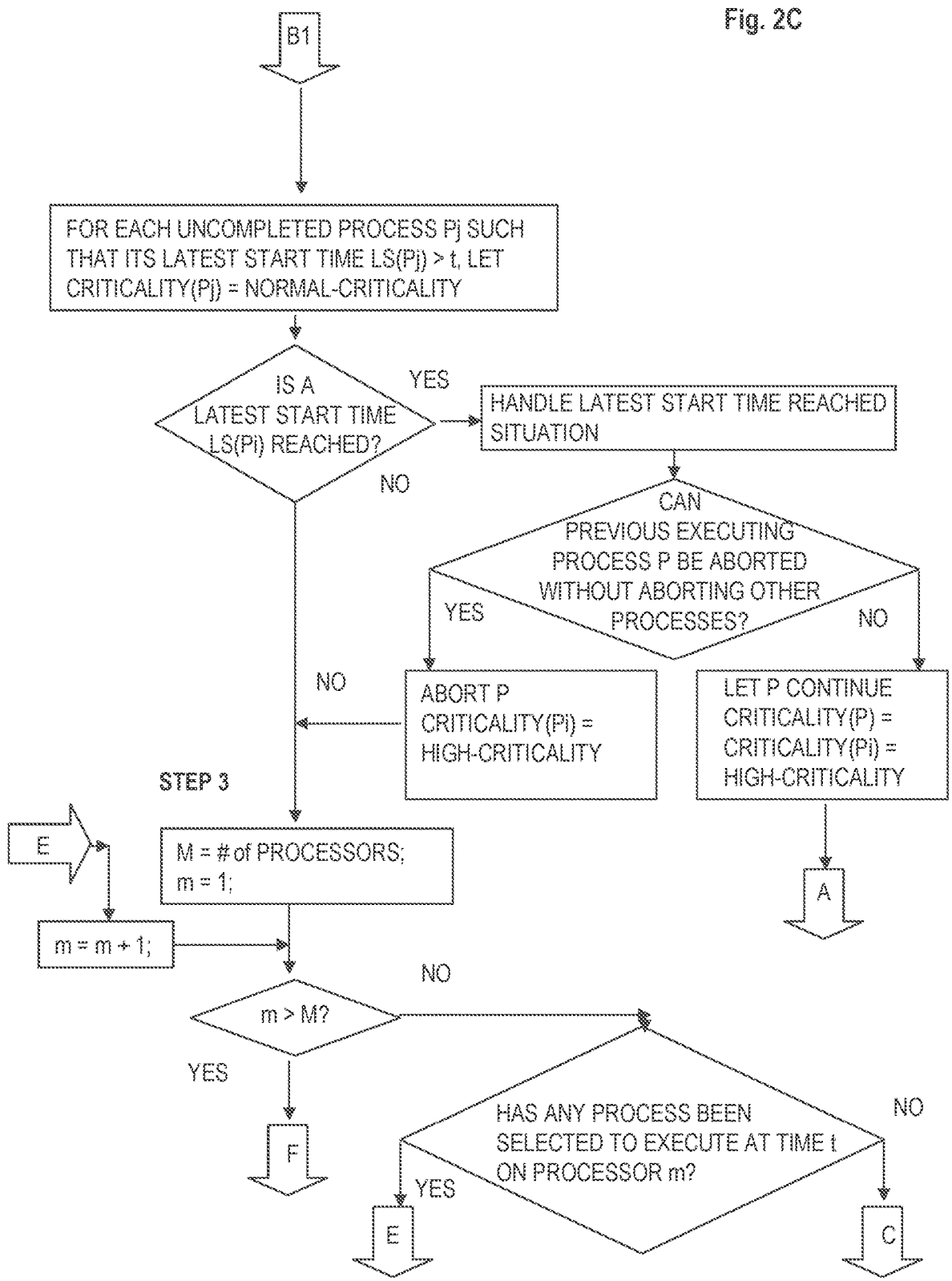
Figure 2D:
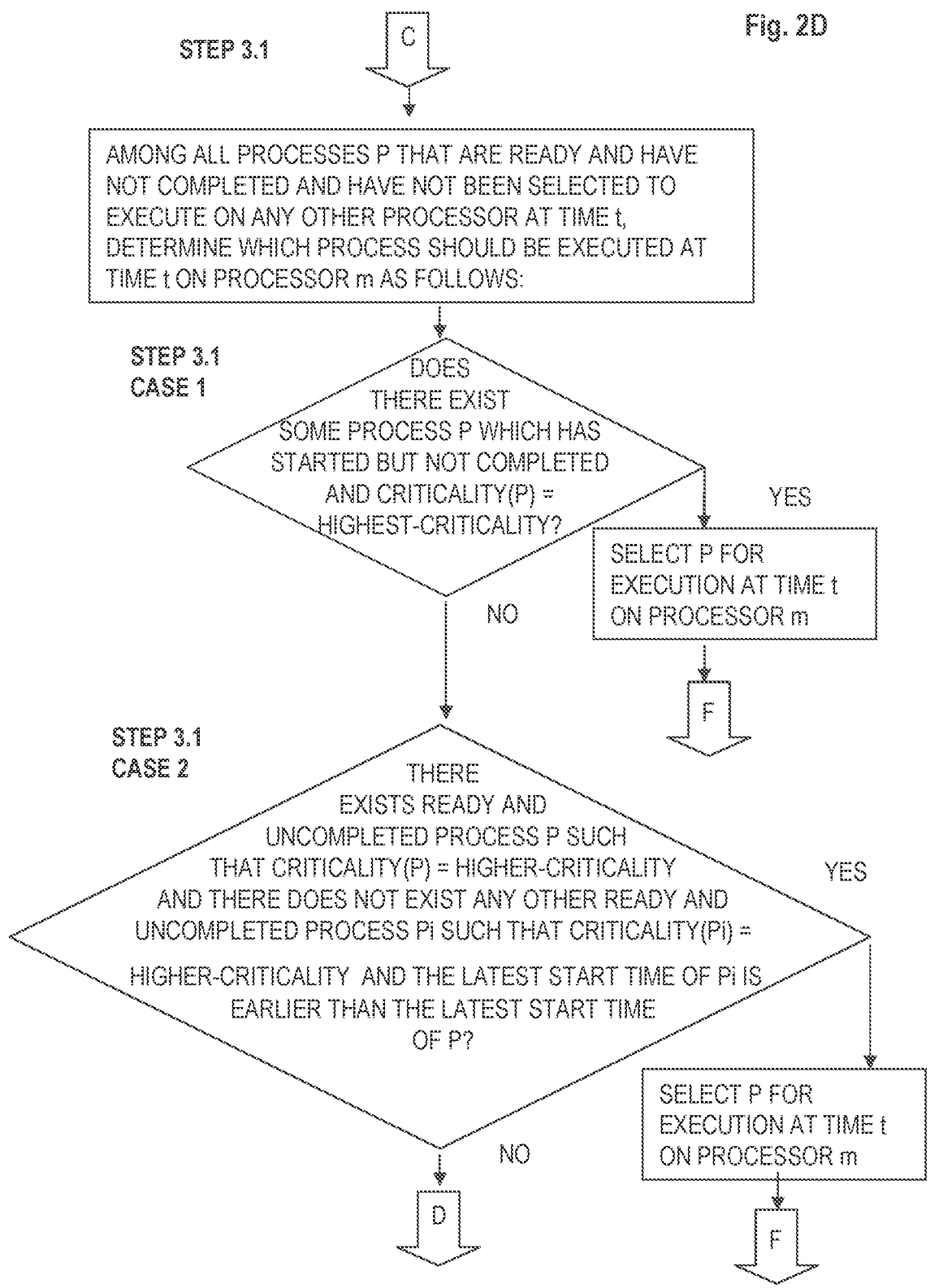
Figure 2E:
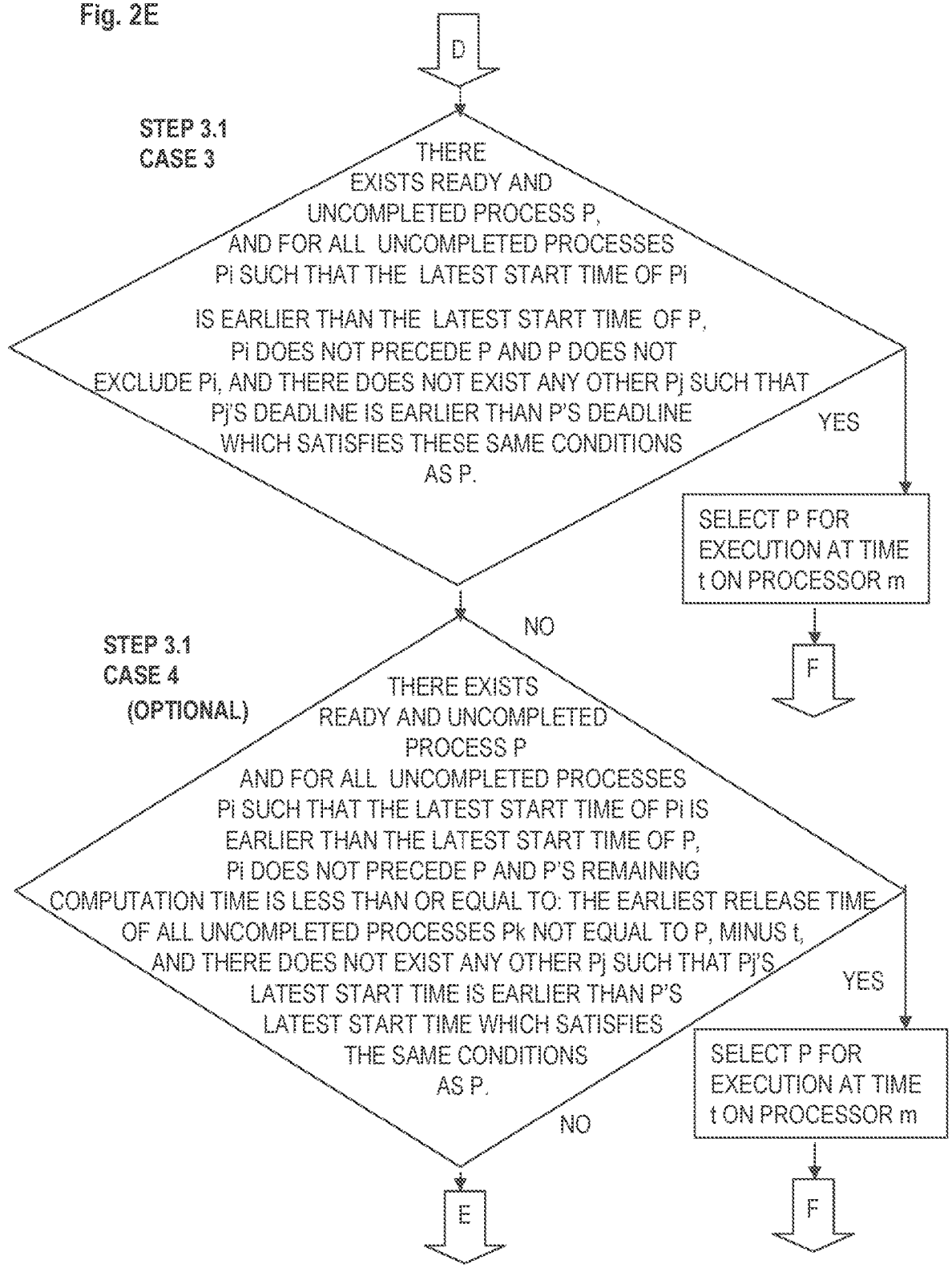
Figure 2F:
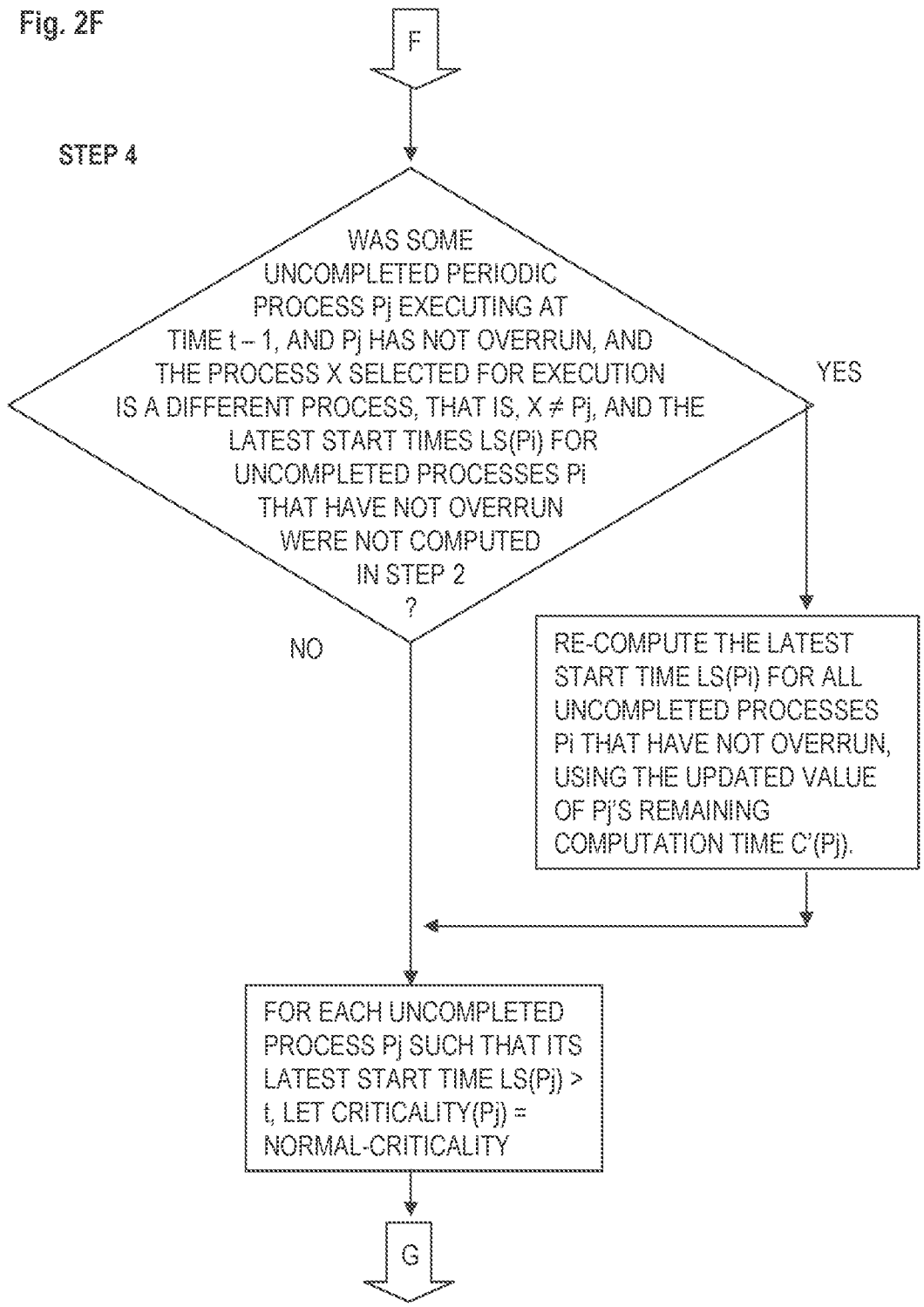
Figure 2G:
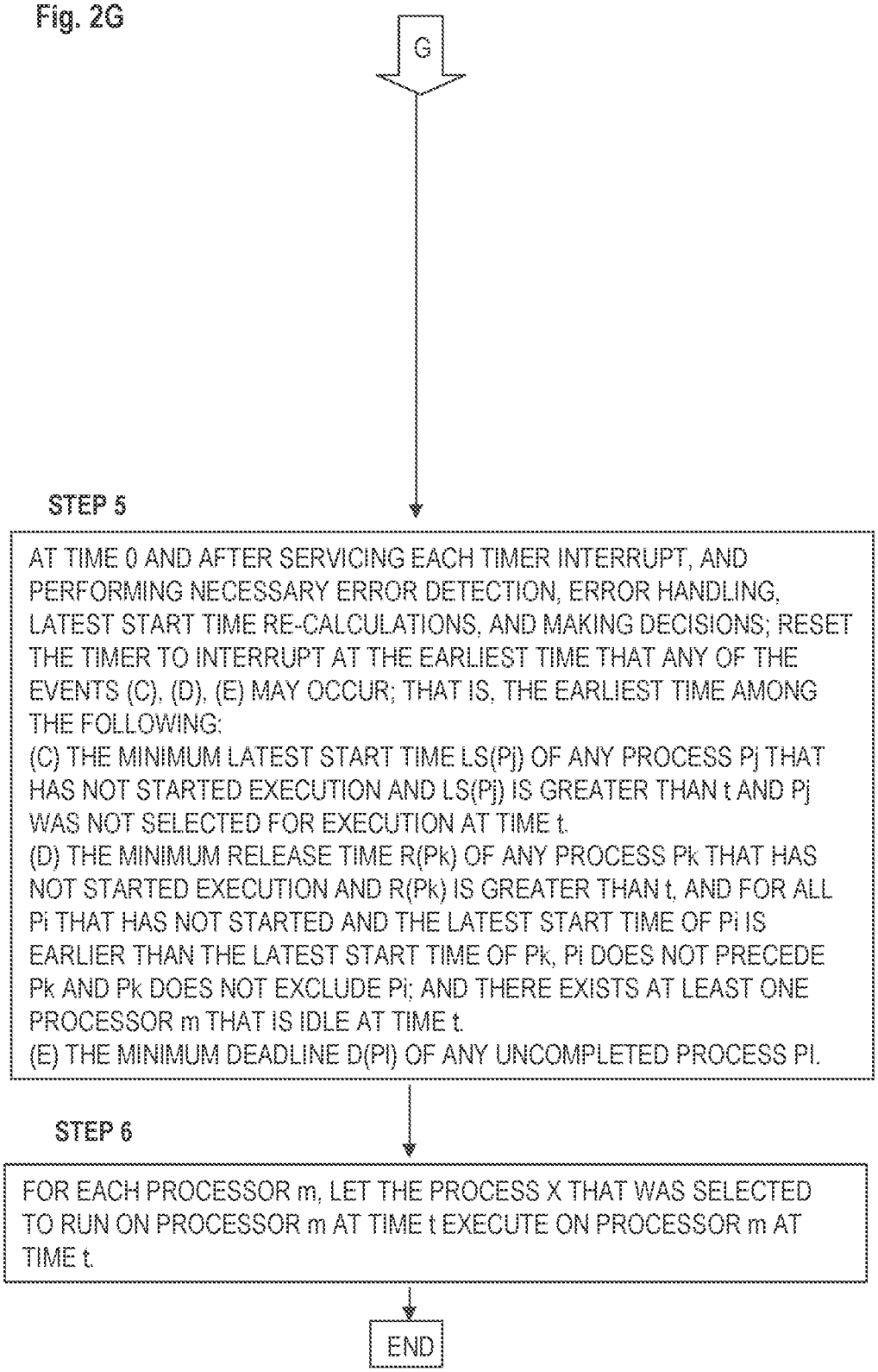

Below, we describe an illustrative embodiment of a "Multiprocessor Time Slot Right Shift" procedure, shown in FIGS. 1A-1B, for computing a "latest-start-time schedule" $S_L$ on either a single processor or a multiprocessor, for a set of uncompleted periodic processes P, such that the beginning of the time slot for each uncompleted process p in $S_L$ is equal to its "latest start time" LS[p], when given a feasible pre-run-time schedule $S_O$, on either a single processor or a multiprocessor, in which arbitrary PRECEDES and EXCLUDES relations defined on ordered pairs of processes in P are satisfied. In this an illustrative embodiment of a Multiprocessor Time Slot Right Shift procedure all processes in the original feasible pre-run-time schedule $S_O$ are shifted to the right as far as possible in the latest-start-time schedule $S_L$ on either a single processor or a multiprocessor while satisfying the PRECEDES and EXCLUDES relations.

Given any original feasible pre-run-time schedule $S_O$ on either a single processor or a multiprocessor, we first define a set of "PREC" relations on ordered pairs of processes in the set of periodic processes P in the original pre-run-time schedule $S_O$:

$\forall p_i \in P, p_j \in P$,
if $e(p_i) < e(p_j) \wedge ((p_i \text{ EXCLUDES } p_j) \vee (p_i \text{ PRECEDES } p_j))$
then let $p_i$ PREC $p_j$ Below we introduce the adjusted release time r'[i] of a process i, and the adjusted deadline d'[i] of a process i.

The adjusted release time r'[i] of process i is defined by
i) $(\neg \exists j: j \text{ PREC } i) \Rightarrow r'[i] = r[i]$;
ii) $(\exists j: j \text{ PREC } i) \Rightarrow$
  $r'[i] = \max(\{r[i]\} \cup \{r'[j] + c[j] | j \text{ PREC } i\})$ Above, i) means that for any process i, if there does not exist any other process j such that the relation j PREC i holds between processes i and j, then the adjusted release time r'[i] of process i should be equal to the original release time r[i] of i. ii) means that for any process i, if there exists any other process j such that the relation j PREC i holds between processes i and j, then the adjusted release time r'[i] of process i must be equal to the maximum of r[i] and r'[j]+c[j] for all processes j such that the relation j PREC i holds between processes i and j.

The adjusted deadline d'[i] of process i is defined by
i) $(\neg \exists j: i \text{ PREC } j) \Rightarrow d'[i] = d[i]$;
ii) $(\exists j: i \text{ PREC } j) \Rightarrow$
  $d'[i] = \min(\{d[i]\} \cup \{d'[j] - c[j] | i \text{ PREC } j\})$ Above, i) means that for any process i, if there does not exist any other process j such that relation i PREC j holds between processes i and j, then the adjusted deadline d'[i] of process i should be equal to the original deadline d[i] of i. ii) means that for any process i, if there exists any other process j such that the relation i PREC j holds between processes i and j, then the adjusted deadline d'[i] of process i must be equal to the minimum of d[i] and d'[j]−c[j] for all processes j such that the relation i PREC j holds between processes i and j.

The adjusted release time r'[j] of process j and adjusted deadline d'[i] of process i are used whenever the relation i PREC j holds between processes i and j, when computing a latest start time schedule and the latest start times for processes on a single processor or a multiprocessor.

The following illustrative embodiment of a Multiprocessor Time Slot Right Shift procedure, when given an original feasible pre-run-time schedule $S_O$ on either a single processor or a multiprocessor, computes a latest-start-time schedule $S_L$ by scheduling all processes in P starting from time t equal to the latest deadline among all the processes in P, that is, $t = \max \{d_p | \forall p \in P\}$, in reverse time order, using a "Latest-Release-Time-First" scheduling strategy that is equivalent to a reverse application of the well known Earliest-Deadline-First strategy, which satisfies all the PREC relations defined above as follows.

Let the set of processors be $M = \{m_1, \ldots, m_q, \ldots, m_N\}$. In the illustrative embodiment of a Multiprocessor Time Slot Right Shift procedure below, "$p_j$ on $m_q$ in $S_O$" means "process $p_j$ is scheduled on processor $m_q$ in the original feasible pre-run-time schedule $S_O$". "$s_{new}(p_j)$" refers to the "start time" of $p_j$, or the beginning (left hand side) of $p_j$'s time slot in the newly constructed latest-start-time schedule $S_L$, which is also equal to the time value of the left boundary of the last time unit [t−1,t] that will be assigned by the illustrative embodiment of a Multiprocessor Time Slot Right Shift procedure to $p_j$'s time slot while constructing the latest-start-time schedule $S_L$.

--- t ← max $\{d'_p \mid \forall p \in P\}$
while ¬($\forall p_i \in P : s_{new}(p_i) \geq t$) do
  begin
    for $m_q = m_1$ to $m_N$ do
      begin
        if ($\exists p_i : p_i$ on $m_q$ in $S_O \wedge (t = d'_{p_i} \vee t = s_{new}(p_i))$)
          (if there exists a periodic process $p_i$ such that
          $p_i$ was scheduled on processor $m_q$ in the original
          feasible pre-run-time schedule $S_O$ and t is
          equal to the adjusted deadline $d'_{p_i}$ of $p_i$
          or t is equal to the beginning of the time slot -continued

```
         s_new(p_i) assigned to p_i in the latest start time
            schedule S_L)
         then
         begin
            Among the set
            {p_j | p_j on m_q in S_O ∧ (t ≤ d'_{P_j} ∧ ¬(s_new(p_j) ≥ t)
               ∧(∄p_k ∈ P : p_j PREC p_k ∧ ¬(s_new(p_k) ≥ t))
            }
            (Among the set of periodic processes p_j such that
            p_j was scheduled on processor m_q in the original
            feasible pre-run-time schedule S_O and t is
            less than or equal to the adjusted deadline d'_{P_j} of
            p_j
            and the beginning of the time slot
            assigned to p_j in the latest start time schedule
            S_L, s_new(p_j), is not greater than or equal to t
            and there does not exist any other periodic
            process p_k such that p_j PREC p_k and
            and the beginning of the time slot
            assigned to p_k in the latest start time schedule
            S_L, s_new(pk), is not greater than or equal to t)
            select the process p_j that has the latest
            adjusted release time max r'_{p_j}.
            in case of ties, select the process p_j that has a
            greater process index number j.
            assign the time unit [t - 1, t] on m_q to p_j's time
            slot in the latest-start-time schedule S_L.
            if the total number of time units assigned to p_j's
            time slot is equal to c_{p_j}, then s_new(p_j) ← t - 1
         end
         else if the time unit [t, t + 1] on m_q was previously
            assigned to a process p_k and t ≠ s_new(p_k) then
         begin
            assign the time unit [t - 1, t] on m_q to p_k in the
               latest-start-time schedule S_L.
            if the total number of time units assigned to p_k's
            time slot is equal to c_{p_k}, then s_new(p_k) ← t - 1
         end
      end
      t ← t - 1
   end
```

Figure 3A:
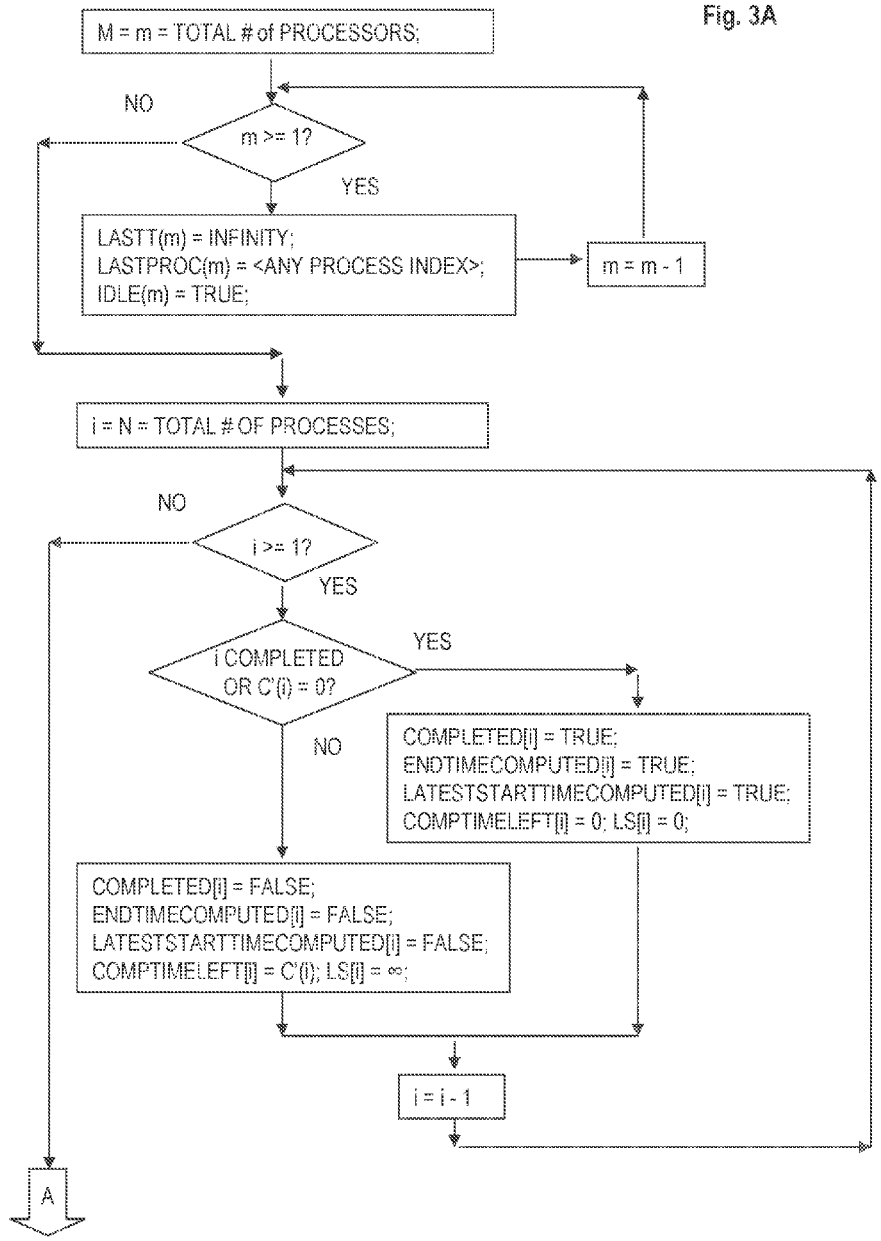
Figure 3B:
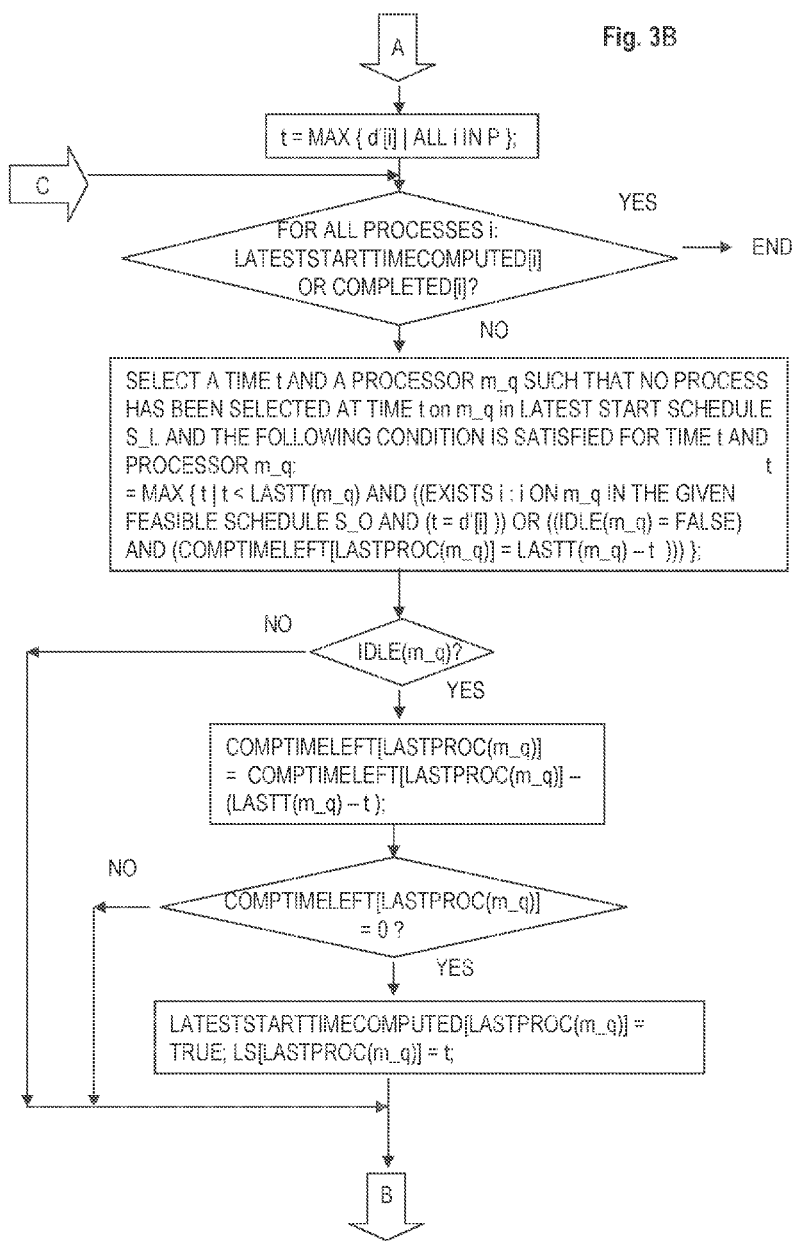
Figure 3C:
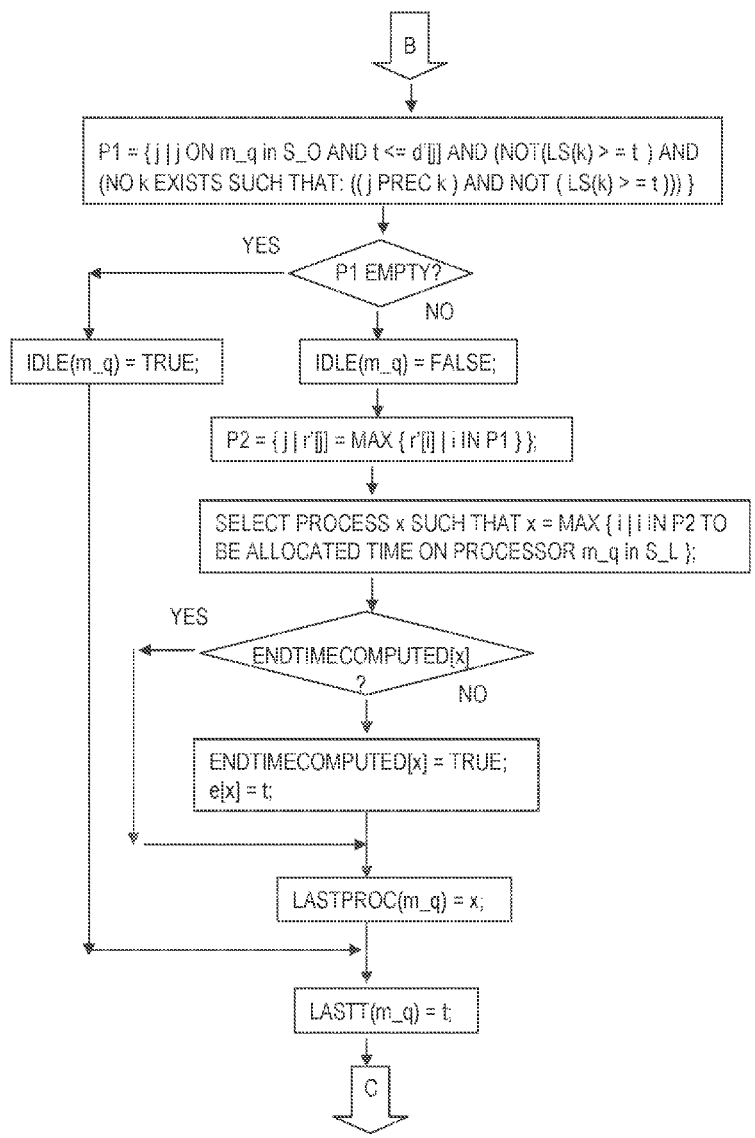

Below we introduce an alternative illustrative embodiment of a Multiprocessor Time Slot Right Shift procedure, shown in FIGS. 3A-3C, which, when given a feasible pre-run-time schedule $S_O$ on either a single processor or a multiprocessor for a set of processes with arbitrary PRECEDES and EXCLUDES relations defined on ordered pairs of processes, computes a latest-start-time schedule $S_L$, for the set of uncompleted periodic processes, while maintaining the order defined in the "PREC" relations, such that the beginning of the time slot for each uncompleted process i is equal to its "latest start time" LS[i], and all the PRECEDES and EXCLUDES relations are satisfied.

In the alternative illustrative embodiment of a Multiprocessor Time Slot Right Shift procedure, "lastt($m_q$)" is the last time that the illustrative embodiment of a Multiprocessor Time Slot Right Shift procedure tried to select a process to allocate processor time on processor $m_q$.

"lastproc($m_q$)" is the process that was last allocated processor time on processor $m_q$.

"idle($m_q$)" indicates whether there was any process selected at lastt($m_q$) on processor $m_q$.

"endtimecomputed[i]" indicates whether the end time e[i] for process i has been computed.

"lateststarttimecomputed[i]" indicates whether the latest start time LS[i] for process i has been computed.

"comptimeleft[i]" is the remaining computation time C'[i] of process i.

"i on $m_q$ in $S_O$" means "process i is scheduled on processor $m_q$ in the original feasible pre-run-time schedule $S_O$".

Alternative Illustrative Embodiment of a Multiprocessor Time Slot Right Shift Procedure for Computing a Latest-Start-Time Schedule $S_L$ and Latest Start Times for a Set of Processes with Arbitrary Precedence and Exclusion Relations on Either a Single Processor or a Multiprocessor when Given a Feasible Pre-Run-Time Schedule $S_O$

```
for each processor m do
   begin
      lastt(m)=infinity;
      lastproc(m)=<any process index>;
      idle(m)=true;
   end;
for each process i do
   begin
      if i has completed then
         % if embodiment used at run-time for re-computing
         % latest start times, then only compute latest start
         % times for uncompleted processes
         begin
            completed[i]=true;
            endtimecomputed[i]=true;
            lateststarttimecomputed[i]=true;
            comptimeleft[i]=0;
            LS[i]=0;
         end;
      else
         begin
            completed[i]=false;
            endtimecomputed[i]=false;
            lateststarttimecomputed[i]=false;
            comptimeleft[i]=C'[i];
            LS[i]=infinity;
         end;
   end;

t = max{d[i]' | ∀ i ∈ P};
while not(for all processes i: ((completed[i]) or
      (lateststarttimecomputed[i] = true)) do
   begin
      select a time t and a processor m_q such that
      no process has been selected at time t on m_q in S_L
      and the following condition is satisfied
      for time t and processor m_q:
      t = max{ t | t < lastt(m_q) ∧ ( (∃ i: i on m_q in S_O
         ∧ (t = d[i]') ) ∨ ((idle(m_q) = false)
         ∧ (comptimeleft[lastproc(m_q)] = lastt(m_q) - t)))};
      if idle(m_q) = false then
         begin
            % lastproc(m_q) can be allocated time on processor
            % m_q in S_L until no remaining computation time
            % left (C' = 0):
            comptimeleft[lastproc(m_q)]
               = comptimeleft[lastproc(m_q)] - (lastt(m_q) - t);
            if comptimeleft[lastproc(m_q)] = 0 then
               begin
                  lateststarttimecomputed[lastproc(m_q)] = true;
                  LS[lastproc(m_q)] = t;
               end;
         end;
      P_1 = { j | j on m_q in S_O ∧
            t ≤ d[j]' ∧ (¬(LS(j) ≥ t) ∧
            (∄ k: ((j PREC k) ∧ ¬(LS(k) ≥ t))) ) };
      if P_1 is empty then idle(m_q) = true;
         % no process selected at time t on m_q in S_L
      else
         begin
            % a process was selected at time t
            % on processor m_q in S_L
            idle(m_q) = false;
            P_2 = {j | r'[j] = max {r'[i] } i ∈ P_1 } };
            select process x such that x = max { i | i ∈P_2 }
            to be allocated time on processor m_q in S_L;
```

```
            if not endtimecomputed[x] then
                begin
                    endtimecomputed[x] = true;
                    e[x] = t;
                end;
                lastproc(m_q) =x;
            end;
            lastt(m_q) = t;
        end.
```

Note that in the illustrative embodiments of a Multiprocessor Time Slot Right Shift procedure above, the adjusted release time r'[j] of process j and adjusted deadline d'[i] of process i are used whenever the relation i PREC j holds between processes i and j, when computing a latest start time schedule and the latest start times for processes on a single processor or a multiprocessor.

Example 1

FIG. 4A shows an original feasible pre-run-time schedule $S_O$ for the set of processes A, B, C, D, E, F, G, H, I, J, K, L, X, Y, Z on two processors. It is assumed that the following precedence and exclusion relations must be satisfied: E PRECEDES Y, K EXCLUDES Y, X EXCLUDES Z, and Y EXCLUDES Z.

Because E PRECEDES Y and E is ordered before Y in the original feasible pre-run-time schedule shown in FIG. 4A, the "E PREC Y" relation is defined.

Because K EXCLUDES Y and K is ordered before Y in the original feasible pre-run-time schedule shown in FIG. 4A, the "K PREC Y" relation is defined.

Because X EXCLUDES Z and X is ordered before Z in the original feasible pre-run-time schedule shown in FIG. 4A, the "X PREC Z" relation is defined.

Because Y EXCLUDES Z and Y is ordered before Z in the original feasible pre-run-time schedule shown in FIG. 4A, the "Y PREC Z" relation is defined.

From the "K PREC Y" and "Y PREC Z" relations, the "K PREC Z" relation is defined.

From the set of "PREC" relations defined above, we can define the set of adjusted release times as follows:

From the "E PREC Y" relation, we can define the adjusted release time of Y, r'[Y]=r[E]+c[E]=12+2=14.

From the "Y PREC Z" relation, we can define the adjusted deadline of A, d'[Y]=d[Z]−c[Z]=18−1=17.

From the "K PREC Y" and "Y PREC Z" relations, we can define the adjusted deadline of K, d'[K]=d'[Y]− c[Y]=(d[Z]− c[Z])−c[Y]=18−12=15.

FIG. 4B shows the latest-start-time schedule $S_L$ and the latest start times at time t=0:
LS(A)=7, LS(B)=7, LS(C)=9, LS(D)=10, LS(E)=12, LS(F) =11, LS(G)=1, LS(H)=3, LS(I)=1, LS(J)=4, LS(K)=6, LS(L)=14, LS(X)=15, LS(Y)=15, LS(Z)=17 for the set of processes A, B, C, D, E, F, G, H, H, I, J, K, L, X, Y, Z on two processors computed by the illustrative embodiment of a Multiprocessor Time Slot Right Shift procedure from the feasible pre-run-time schedule $S_O$ in FIG. 4A.

Run-Time Phase: First Illustrative Embodiment of the Method

In the following we present a first illustrative embodiment of the method, shown in FIGS. 2A-2G, for handling real-time process overruns on either a single processor or multiprocessors at run-time.

At run-time, the main run-time scheduler uses the latest start times for scheduling periodic processes on either a single processor or a multiprocessor, such that multiple processor resources are effectively utilized: process executions can be selectively preempted by other process executions and can migrate from one processor to another processor at any time and as many times as necessary at run time to provide greater flexibility in utilizing any unused processor capacity and meeting deadlines.

At the start of each system major cycle corresponding to the least common multiple of the process periods, the latest-start-time schedule will be initialized/restored to be consistent with an initial feasible latest-start-time schedule of all the uncompleted processes on a single processor or multiprocessor which simultaneously satisfies important constraints and dependencies, such as offsets, release times, precedence relations, and exclusion relations, which can be computed before run-time (off-line) with the illustrative embodiments of a Multiprocessor Time Slot Right Shift procedure described earlier.

A process x may be assigned a "criticality level", criticality(x), that is either NORMAL-CRITICALITY, HIGHER-CRITICALITY or HIGHEST-CRITICALITY. Initially, the criticality of all processes is set to NORMAL-CRITICALITY.

First Illustrative Embodiment of the Main-Run-Time-Scheduler Method on Either a Single Processor or a Multiprocessor:

With this illustrative embodiment of the method, given a latest-start-time schedule of all the processes, at run-time there are the following main situations when the run-time scheduler may need to be invoked to perform a scheduling action:

(a) At a time t when some asynchronous process a has arrived and made a request for execution.

(b) At a time t when some process x has just completed its computation.

(c) At a time t that is equal to the latest start time $LS(p_j)$ of a process $p_j$.

(d) At a time t that is equal to the release time $r_{p_k}$ of some process $p_k$ that has not started execution when at least one processor m is idle, that is, there does not exist any process $p_j \in P$-g that is currently running on processor m.

(e) At a time t that is equal to the deadline $d_{p_i}$ of an uncompleted process $p_i$. (In this case, $p_i$ has just missed its deadline, and the system should handle the error.)

In situation (a) above, the run-time scheduler is usually invoked by an interrupt handler responsible for servicing requests generated by an asynchronous process.

In situation (b) above, the run-time scheduler is usually invoked by a kernel function responsible for handling process completions.

In situations (c), (d), and (e) above, the run-time scheduler is invoked by programming the single processor or multi-processor timer interrupt mechanism to interrupt at the appropriate time.

First Illustrative Embodiment of the Run-Time Scheduler Method

Let t be the current time.

Step 0.

In situation (e) above, check whether any process p has missed its deadline $d_p$.

If so perform error handling.

if $\exists p, d_p \leq t \wedge \neg(e'(p) \leq t)$:

(p's deadline has passed, but p has not completed.)

then Handle_Deadline_Miss_Error(p)

Step 1.
  In situation (a) above, if an A-h-k-a process $a_i$ has arrived, execute the A-h-k-a-Scheduler-Subroutine (the A-h-k-a Scheduler-Subroutine is described in [11]).
  If some A-h-k-a process $a_i$ is selected for execution at time t by the A-h-k-a Scheduler, then goto Step 3 below.
Step 2.
  Whenever the run-time scheduler is invoked due to any of the situations (b), (c) and (d) above at time t:
  If t=0, or if at time t, the end of the current system major cycle corresponding to the least common multiple of the process periods prdLCM has been reached, then initialize/restore the latest-start-time schedule and latest start times to be consistent with the initial latest-start-time schedule SL, which was computed before run-time by any of the illustrative embodiments of a Multiprocessor Time Slot Right Shift procedure; otherwise re-compute latest start times $LS(p_j)$ for uncompleted processes $p_j$.
  In situation (c) above, at a time t when the latest start time $LS(p_i)$ of another process $p_i$ has just been reached, some process p may have overrun, that is, C'(p)=0, and p has not completed.
  If there exists any process p that has overrun, then check the process p which has overrun for possible errors.
  When re-computing latest start times, if some process p has overrun, i.e., its remaining computation time, C'(p), is 0, then it is possible that the latest start time $LS(p_i)$ for some uncompleted process $p_i$ could be further increased.
  For each uncompleted process $p_j$, if its latest start time is greater than t, that is, $LS(p_j)>t$, as a result of re-computing the latest start times, and its criticality was previously set to HIGHER-CRITICALITY, then its criticality should be reset, that is, criticality($p_j$)=NORMAL-CRITICALITY.
  If after recomputing latest start times $LS(p_j)$ for uncompleted processes $p_j$, there does not exist any uncompleted process $p_i$ such that the current time t is equal to the latest start time $LS(p_i)$, then goto to Step 3 below. Uncompleted process p may be selected to continue execution in Step 3.
  If after recomputing latest start times $LS(p_i)$ for uncompleted processes $p_j$, the current time t is equal to a latest start time $LS(p_i)$ for some uncompleted process $p_i$, then check whether any process p has overrun and cannot continue without causing another process $p_i$ to start later than $p_i$'s latest start time $LS(p_i)$. If so handle the situation. (When handling such overrun situations, one possible option would be to abort p immediately, in order to guarantee that $p_i$ will not miss its deadline; However, there may exist circumstances in which process $p_i$ cannot start before the preceding process p has completed, and $p_i$ would also have to be aborted if p is aborted; in such cases it may be worth the risk to simply let p continue, and hope that both processes can complete before $p_i$'s deadlines. If the system designer decides to adopt the latter option, then the criticality level of the preceding process p, criticality(p) should also be set to HIGHER-CRITICALITY, so that p will be scheduled before $p_i$ in Case 2 of Step 3 below.)
  if $\exists p, C'(p)=0 \land \neg(e'(p) \leq t)$
    (there exists p that has overrun, that is, C'(p)=0 and p has not completed)
  then Re-compute_Latest_Start_Times
  Check_For_Possible_Overrun_Errors(p)
  For $\forall p_j, \neg(e'(p) \leq t) \land LS(p_j) \geq t \land$ criticality($p_j$)=HIGHER-CRITICALITY:
    (for all uncompleted processes $p_j$ such that $p_j$'s latest time $LS(p_j)$ is greater than the current time t, and its criticality was previously set to HIGHER-CRITICALITY:)
  let criticality($p_j$)=NORMAL-CRITICALITY
  if $\exists p_i, LS(p_i)=t$
    (after re-computing the latest start times, there does not exist any process $p_i$ that needs to start because the current time t is $p_i$'s latest start time.)
  then goto Step 3
  else
  if $\exists p, s'(p) \leq t \land \neg(e'(p) \leq t) \land \exists p_i, LS(p_i)=t \land (p$ EXCLUDES $p_i \lor p$ PRECEDES $p_i)$
    (there exists p that has already started and has not completed, and there exists $p_i$ that needs to start because the current time t is $p_i$'s latest start time; but $p_i$ cannot be started before p has completed, because p EXCLUDES $p_i$, or p PRECEDES $p_i$.)
  then Handle_Overrun_Situation(p)
Increase the criticality level of any process p for which p's latest start time has been reached after re-computing the latest start times.
  if $\exists p, p \in$ P-g: (LS(p)=t)
    (there exists p such that its latest start time LS(p) is equal to t. Starting from time t, p's criticality level will be increased to be higher than all processes that have not yet completed and their latest start times have not been reached.)
  then criticality(p)←HIGHER-CRITICALITY
Step 3.
  For each processor m such that no process has been selected to execute at time t on processor m, execute Step 3.1 as follows:
Step 3.1.
  Among all processes that are ready and have not completed and have not been selected to execute on any other processor at time t, determine which process should be executed at time t on processor m as follows.
begin (Case 1)
  if $\exists p, p \in$ P-g: $\neg(e'(p) \leq t) \land$ criticality(p)=HIGHEST-CRITICALITY
    (there exists p that has not completed and has a criticality level equal to HIGHEST-CRITICALITY.)
  then select p for execution at time t on processor m.
  else (Case 2)
  if $\exists p, p \in$ P-g: $\neg(e'(p) \leq t) \land$ criticality(p)=HIGHER-CRITICALITY $\land$
    ($\exists p_i, p_i \in$ P-g: criticality($p_i$)=HIGHER-CRITICALITY $\land \neg(e'(p_i) \leq t) \land LS(p_i)<LS(p)))$
    (there exists a critical process p with criticality level equal to HIGHER-CRITICALITY that has not completed, and there does not exist any other critical process $p_i$ with criticality level equal to HIGHER-CRITICALITY that has not yet completed, such that the latest start time of $p_i$ is earlier than the latest start time of p)
  then select p for execution at time t on processor m.
  else (Case 3)
  if $\exists p, p \in$ P-g: $r_p \leq t \land \neg(e'(p) \leq t) \lor \forall p_i, p_i \in$ P-g, $\neg(e'(p_i) \leq t), LS(p_i)<LS(p): \neg((p_i$ PRECEDES p)$\land(p$ EXCLUDES $p_i)) \land d_p=\min\{d_{p_j} | p_j \in$ P-g: $r_{p_j} \leq t \land \neg(e'(p_j) \leq t) \land \forall p_i, p_i \in$ P-g, $\neg(e'(p_i) \leq t), LS(p_i)<LS(p_j): \neg((p_i$ PRECEDES $p_j) \lor (p_i$ EXCLUDES $p_i))\}$
    (there exists p that is ready and has not completed, and for all $p_i$ that has not completed and the latest start time of $p_i$ is earlier than the latest start time of p, $p_i$ does not PRECEDE p and p does not EXCLUDE $p_i$; and there does not exist any other $p_j$ such that its deadline is earlier than p's deadline and which satisfies these same conditions as p.)
  then select p for execution at time t on processor m.

else (Case 4) (optional)
if $\exists p, p \in P\text{-g}: r_p \leq t \wedge \neg(e'(p) \leq t) \wedge \forall p_i, p_i \in P\text{-g}, \neg(e'(p_i) \leq t),$
$LS(p_i) < LS(p): \neg(p_i \text{ PRECEDES } p) \wedge C'(p) \leq$
$(\min\{r_{p_k} | p \neq p_k \wedge \neg(e'(p_k) \leq t)\} - t) \wedge (\max\{d_{p_k} | p \neq p_k \wedge \neg(e'(p_k) \leq t)\} > d_p - C'(p))$
$\wedge LS(p) = \min\{LS(p_j) | p_j \in P\text{-g}: r_{p_j} \leq t \wedge \neg(e'(p_j) \leq t) \wedge \forall_{pi},$
$p \in P\text{-g}, \neg(e'(p_i) \leq t), LS(p_i) < LS(p_j): \neg(p_i \text{ PRECEDES } p_j) \wedge C'(p_j) \leq (\min\{r_{p_k} | p_j \neq p_k \wedge \neg(e'(p_k) \leq t)\} - t)\} \wedge$
$(\max\{d_{p_k} | p_j \neq p_k \wedge \neg(e'(p_k) \leq t)\} > d_{p_j} - C'(p_j))$
(there exists p that is ready and has not completed, and for all $p_i$ that has not completed and the latest start time of $p_i$'s time slot is earlier than the latest start time of p, $p_i$ does not PRECEDE p, and p's remaining computation time is less than or equal to: the earliest release time of all uncompleted processes $p_k$ that are not equal to p, minus t; and there does not exist any other $p_j$ such that its latest start time is earlier than p's latest start time and which satisfies these same conditions as p.)
then criticality(p)←HIGHEST-CRITICALITY
select p for execution at time t on processor m.
(End of Step 3.1.)
Step 4.
If some uncompleted periodic process $p_j$, $\neg(e'(p_j) \leq t)$ was executing at time t−1, and $p_j$ has not overrun, but process $p_j$ was not selected for execution at time t on any processor ($p_j$ is preempted at time t by some other process); or if some process has just completed its computation, and if the latest start time $LS(p_i)$ for uncompleted processes had not been previously re-computed in Step 2, then re-compute the latest start time $LS(p_i)$ for uncompleted processes $p_i$ ($\neg(e'(p_i) \leq t)$), using the updated value of $p_j$'s remaining computation time $C'(p_j)$. For each uncompleted process $p_j$, if its latest start time is greater than t, that is, $LS(p_j) > t$, as a result of re-computing the latest start times, and its criticality was previously set to HIGHER-CRITICALITY, then its criticality should be reset, that is, criticality($p_j$)=NORMAL-CRITICALITY.
Step 5.
At time 0 and after servicing each single processor or multiprocessor timer interrupt mechanism interrupt, and performing necessary error detection, error handling, latest start time re-calculations, and making scheduling decisions; —reset the single processor or multiprocessor timer interrupt mechanism to interrupt at the earliest time that any of the events (c), (d), and (e) above may occur as follows:
Next_Interrupt_Time=min{D, LS, R}
where
$D = \min\{d_{p_i} | (d_{p_i} > t) \wedge \neg(e'(p_i) \leq t))\}$
$LS = \min\{LS(p_j) | \neg(e'(p_j) \leq t)\}$
$R = \min\{r_{p_k} | (\neg(s'(p_k) \leq t) \wedge r_{p_k} > t$
$\wedge (\forall p_i, p_i \in P\text{-g}, \neg(s'(p_k) \leq t) \wedge LS(p_i) < LS(p_k):$
$\neg((p_i \text{ PRECEDES } p_k) \vee (p_k \text{ EXCLUDES } p_i)))$
$\wedge (\exists m: (\neg(\exists p_j \in P\text{-g}: p_j \text{ was selected to execute at run-time t on processor m}))\}$
(R is equal to the earliest release time $r_{p_k}$ such that $p_k$ has not started, and for all $p_i$ that has not started and the latest start time of $p_i$ is earlier than the latest start time of $p_k$, $p_i$ does not PRECEDE $p_k$ and $p_k$ does not EXCLUDE $p_i$; and exists at least one processor m that is idle at time t.)
Step 6.
For each process x that was selected to execute on a processor m in the previous steps, let the selected process x execute at run-time t on processor m.
(If a selected process x was previously executing on some processor $m_q$ at time t−1, then one may let process x continue to execute on the same processor $m_q$ at time t.)

(End of Main Run-Time Scheduler)

An important and desirable property of this method is that, in a case where there may not be enough spare time available, one can always "skip" re-computing some subset of the latest start times LS(p) at any time, and rely on the most recently computed latest start times LS(p) to schedule the processes, while still guaranteeing that all the processes' timing constraints will be satisfied, with the only consequence being a possible reduction in the length of time that some processes may be allowed to overrun, because some recent process underruns may not have been taken into account.

Example 2

Here we demonstrate how an embodiment of the run-time scheduler will handle possible overruns and underruns of the set of processes A, B, C, D, E, F, G, H, I, J, K, L on two processors shown in FIG. 4A of Example 1, generating the run-time execution scenario shown in FIG. 4C, using the latest start times LS(A), LS(B), LS(C), LS(D), LS(E), LS(F), LS(G), LS(H), LS(I), LS(J), LS(K), LS(L), LS(X), LS(Y), LS(Z) of the processes A, B, C, D, E, F, G, H, I, J, K, L, X, Y, Z shown in FIGS. 4B, 4D, 4E, 4F, 4G, 4H, 4I, 4J and 4K with any of the embodiments of a Multiprocessor Time Slot Right Shift Procedure.

In the pre-run-time phase, any of the embodiments of a Multiprocessor Time Slot Right Shift Procedure, will compute the initial latest-start-time-schedule on two processors shown in FIG. 4B, with the following latest start times for time t=0 (see Example 1):
LS(A)=7, LS(B)=7, LS(C)=9, LS(D)=10, LS(E)=12, LS(F)=11, LS(G)=1, LS(H)=3, LS(I)=1, LS(J)=4, LS(K)=6, LS(L)=14, LS(X)=15, LS(Y)=15, LS(Z)=17.

The initial latest-start-time schedule and the latest start times and end times for the set of processes are computed off-line by any of the embodiments of a Multiprocessor Time Slot Right Shift procedure from the original feasible pre-run-time schedule, and will be used at run-time t=0, and at the beginning of each Least Common Multiple of the process periods.

FIG. 4D shows a latest-start-time schedule and the latest start times and end times for the set of processes A, B, C, D, E, F, G, H, M, I, J, K, L, X, Y, Z on two processors computed at run-time t=1.

FIG. 4E shows part of a latest-start-time schedule and the latest start times of processes H, I, J on two processors at run-time t=2; and part of a latest-start-time schedule and the latest start times of processes H, B, I, J, A on two processors at run-time t=3.

FIG. 4F shows part of a latest-start-time schedule and the latest start times of processes H, B, J, A on two processors at run-time t=4; and part of a latest-start-time schedule and the latest start times of processes H, B, C, F, E, A, D on two processors at run-time t=6 FIG. 4G shows part of a latest-start-time schedule and the latest start times of processes B, C, F, E, A, D on two processors at run-time t=7; and part of a latest-start-time schedule and the latest start times of processes B, C, F, E, D, K on two processors at run-time t=8.

FIG. 4H shows part of a latest-start-time schedule and the latest start times of processes C, F, E, X, D, K, Y, Z on two processors at run-time t=9; and part of a latest-start-time schedule and the latest start times of processes F, E, X, D, Y, Z on two processors at run-time t=10.

FIG. 4I shows part of a latest-start-time schedule and the latest start times of processes F, E, X, Y, Z on two processors at run-time t=11; and part of a latest-start-time schedule and the latest start times of processes E, X, L, Y, Z on two processors at run-time t=12.

FIG. 4J shows part of a latest-start-time schedule and the latest start times of processes L, Y, Z on two processors at run-time t=14; and part of a latest-start-time schedule and the latest start times of processes L, Z on two processors at run-time t=17.

FIG. 4K shows part of a latest-start-time schedule and the latest start time of process L on two processors at run-time t=18; and part of a latest-start-time schedule on two processors at run-time t=20.

FIG. 4C shows a possible run-time execution on two processors of the set of processes A, B, C, D, E, F, G, H, I, J, K, L, X, Y, Z shown in FIG. 4A of Example 1. In FIG. 4C, G, A, D underruns, while J, K, X, Y overruns. The portions of the run-time execution during which J, K, X, Y overruns are shown using dashed lines.

At run-time t=0: the run-time scheduler will select process K and L in Case 3 of Step 3 to run on processor $m_1$ and processor $m_2$ respectively, because K and L are the only processes that are ready at time t=0.

At t=0 in Step 5, the single processor or multiprocessor timer interrupt mechanism will be programmed to interrupt at process G and I's latest start time LS(G)=LS(I)=1, before actually dispatching K and L for execution in Step 6.

At time t=1: the run-time scheduler will select process G and I in Case 2 of Step 3 to run on processor $m_1$ and processor $m_2$ respectively, because LS(G)=LS(I)=1: the latest start time of G and I has been reached at time t=1 (the criticality of G and I would be set to HIGHER-CRITICALITY). After re-computing the latest-start-times at time 1, LS(K)=14, LS(L)=17.

At t=1 in Step 5, the single processor or multiprocessor timer interrupt mechanism will be programmed to interrupt at process H's latest start time LS(H)=3, before actually dispatching G and I for execution in Step 6.

At t=2: process G underruns. The run-time scheduler will allow process I to continue to execute, since LS(I)=2. The run-time scheduler will select process J in Case 3 of Step 3 to execute because J has the earliest deadline among all processes that are ready and have not been selected to run on a processor at time 2. At time 2, LS(I)=2.

At t=2 in Step 5, the single processor or multiprocessor timer interrupt mechanism will be programmed to interrupt at process H's latest start time LS(H)=3, before actually dispatching J for execution in Step 6.

At time t=3: the run-time scheduler will allow process I to continue to execute, since LS(I)=3. The run-time scheduler will select process H in Case 2 of Step 3 to execute, because LS(H)=3: the latest start time of H has been reached at time t=3. At time 3, LS(I)=3, LS(J)=5.

At t=3 in Step 5, the single processor or multiprocessor timer interrupt mechanism will be programmed to interrupt at process J's latest start time LS(J)=5, before actually dispatching H for execution in Step 6.

At time t=4: process I completes. The run-time scheduler will allow process H to continue to execute, since LS(H)=4. The run-time scheduler will select process J in Case 3 of Step 3 to execute because J has the earliest deadline among all processes that are ready and have not been selected to run on a processor at time 4.

At t=4 in Step 5, the single processor or multiprocessor timer interrupt mechanism will be programmed to interrupt at process A and B's latest start time LS(A)=LS(B)=7, before actually dispatching J for execution in Step 6. At time 4, LS(H)=4.

At time t=5: J overruns. In at least one version of the run-time scheduler, it is not necessary to activate the run-time scheduler when a process overruns. J is able to continue execution.

At run-time t=6: J completes after overrunning. The run-time scheduler will allow process H to continue to execute, since LS(H)=6. The run-time scheduler will select process A in Case 3 of Step 3 to execute because A has the earliest deadline among the processes that are ready at time t=6.

Note that J was able to utilize the unused processor capacity made available at run-time by the underrun of G; be preempted by H, then migrate to a different processor, then overrun. (Similarly, K utilizes the unused processor capacity made available by the underruns of A to overrun, while all the processes meet their deadlines.) At t=6 in Step 5, the single processor or multiprocessor timer interrupt mechanism will be programmed to interrupt at process B's latest start time LS(B)=7, before actually dispatching A for execution in Step 6.

At time t=7: process H completes. The run-time scheduler will select process B in Case 2 of Step 3 to execute because LS(B)=7: the latest start time of B has been reached at time t=7. The run-time scheduler will select process A in Case 3 of Step 3 to execute because A has the earliest deadline among the processes that are ready at time t=7.

At t=7 in Step 5, the single processor or multiprocessor timer interrupt mechanism will be programmed to interrupt at process C's latest start time LS(C)=9, before actually dispatching B for execution in Step 6.

At time t=8: process A underruns and completes. The run-time scheduler will select process B in Case 2 of Step 3 to continue to execute because LS(B)=8. The run-time scheduler will also select process C in Case 3 of Step 3 to execute because process C has the earliest deadline among all processes that are ready.

At t=8 in Step 5, the single processor or multiprocessor timer interrupt mechanism will be programmed to interrupt at process D's latest start time LS(D)=10, before actually dispatching B for execution in Step 6.

At time t=9: process B completes. The run-time scheduler will select process C in Case 2 of Step 3 to continue to execute because LS(C)=9. The run-time scheduler will select process K in Case 3 of Step 3 to execute because process K has the earliest deadline among all processes that are ready.

At t=9 in Step 5, the single processor or multiprocessor timer interrupt mechanism will be programmed to interrupt at process D's latest start time LS(D)=10, before actually dispatching K for execution in Step 6.

At time t=10: process C completes while process K overruns. The run-time scheduler will select process D in Case 2 of Step 3 to run on processor $m_2$, because LS(D)=10: the latest start time of D has been reached at time t=10. The run-time scheduler will select process K in Case 3 of Step 3 to execute because process K has the earliest deadline among all processes that are ready.

At t=10 in Step 5, the single processor or multiprocessor timer interrupt mechanism will be programmed to interrupt at process F's latest start time LS(F)=11, before actually dispatching D for execution in Step 6.

At time t=11: process K completes after overrunning while process D underruns and completes. The run-time scheduler will select process F in Case 2 of Step 3 to run, because LS(F)=11: the latest start time of F has been reached at time t=11. The run-time scheduler will also select process X in Case 3 of Step 3 to run because process X has the earliest deadline among all processes that are ready.

At t=11 in Step 5, the single processor or multiprocessor timer interrupt mechanism will be programmed to interrupt at process E's latest start time LS(E)=12, before actually dispatching F and X for execution in Step 6.

At time t=12: process F completes. The run-time scheduler will select process E in Case 2 of Step 3 to run, because LS(E)=12: the latest start time of E has been reached at time t=12. The run-time scheduler will also select process X in Case 3 of Step 3 to run because process X has the earliest deadline among all processes that are ready.

At t=12 in Step 5, the single processor or multiprocessor timer interrupt mechanism will be programmed to interrupt at process Y's latest start time LS(Y)=15, before actually dispatching E for execution in Step 6.

At time t=13: X overruns. The run-time scheduler is not activated. X is able to continue execution.

At time t=14: process E completes. The run-time scheduler will also select process X in Case 3 of Step 3 to run because process X has the earliest deadline among all processes that are ready. The run-time scheduler will also select process Y in Case 3 of Step 3 to run because process Y has the earliest deadline among the remaining processes that are ready.

At t=14 in Step 5, the single processor or multiprocessor timer interrupt mechanism will be programmed to interrupt at process L's latest start time LS(L)=17, before actually dispatching L for execution in Step 6.

At time t=16: Y overruns, while X continues to overrun. The run-time scheduler is not activated.

At time t=17: both X and Y complete before their respective deadlines after overrunning. The run-time scheduler will select processes L and Z to execute as L and Z are the only processes that have not completed.

At t=17 in Step 5, the single processor or multiprocessor timer interrupt mechanism will not be programmed to interrupt since L and Z have been selected to run and they are the only processes that have not completed.

At time t=18: Z completes before its deadline. L is selected to continue to execute as L is the only process that has not completed.

At time t=20: the last process L completes before its deadline.

Example 3

The following example demonstrates how an embodiment generates the run-time execution scenario on a single processor shown in FIG. 7C, in which processes A and D are allowed to overrun, when given the feasible pre-run-time schedule shown in FIG. 7A.

In FIG. 7C, the portions of the run-time execution during which A and D overruns are respectively shown using dashed lines.

Suppose that an embodiment of the main run-time scheduler needs to schedule the five periodic processes A, B, C, D, E, F, on a single processor when given the feasible pre-run-time schedule shown in FIG. 7A.

It is assumed that the following exclusion relations are defined: A EXCLUDES B, and F EXCLUDES E.

It is assumed that the following precedence relations are defined: E PRECEDES D.

We first define a set of "PREC" relations on ordered pairs of processes in the set of periodic processes P in the original feasible pre-run-time schedule shown in FIG. 7A:

Because A EXCLUDES B and B is ordered before A in the original feasible pre-run-time schedule shown in FIG. 7A, the "B PREC A" relation is defined.

Because F EXCLUDES E and E is ordered before F in the original feasible pre-run-time schedule shown in FIG. 7A, the "E PREC F" relation is defined.

Because E PRECEDES D and E is ordered before D in the original feasible pre-run-time schedule shown in FIG. 7A, the "E PREC D" relation is defined.

From the set of "PREC" relations defined above, we can define the set of adjusted release times as follows: From the "B PREC A" relation, we can define the adjusted release time of A, r'[A]=r[B]+c[B]=2+3=5.

From the "E PREC F" relation, we can define the adjusted release time of A, r'[F]=r[E]+c[E]=10+2=12.

From the "E PREC D" relation, we can define the adjusted release time of A, r'[D]=r[E]+c[E]=10+2=12.

Note that according to the definition of adjusted release times and adjusted deadlines above, all other adjusted release times and adjusted deadlines of the processes A, B, C, D, E, F, except for r'[A]=5, r'[F]=12, r'[D]=12, are the same as their corresponding original release times and original deadlines.

Also note that adjusted release times and adjusted deadlines of processes are only used for determining the latest start times of each uncompleted process that has not overrun. The run-time scheduler will use the original release times and original deadlines of each process together with the latest start times of each uncompleted process that has not overrun, when scheduling the processes at run-time.

In the pre-run-time phase of an embodiment, one may use any of the Multiprocessor Time Slot Right Shift Procedures when given the original pre-run-time schedule in FIG. 7A to compute the initial latest-start-time schedule and latest start times at time t=0 illustrated in FIG. 7B.

Here we demonstrate how the run-time scheduler in an embodiment will schedule the set of processes A, B, C, D, E, F, generating the run-time execution scenario shown in FIG. 7(c), in which processes A and D are allowed to overrun, using latest start times LS(A), LS(B), LS(C), LS(D), LS(E), LS(F) of the processes A, B, C, D, E, F.

In the pre-run-time phase, the embodiment for computing the latest start times, will compute the latest start time schedule shown in FIG. 7B and the following latest start time values for time t=0:
LS(C)=1; LS(B)=2; LS(A)=6, LS(E)=11, LS(D)=13, LS(F)=14.

At run-time t=0: the run-time scheduler will be invoked since t=r[A]=r[C]=r[F]=0. The run-time scheduler will select process C for execution in Case 3 of Step 3 at time 0.

At t=0 in Step 5, the single processor or multiprocessor timer interrupt mechanism will be programmed to interrupt at process B's latest start time LS(B)=2, before actually dispatching C for execution in Step 6.

At t=1: process C underruns, completing its computation at time 1 and invoking the run-time scheduler.

At t=1, the processor will be idle, because the run-time scheduler cannot select process A or process F for execution according to the conditions that must be satisfied in Case 3 of Step 3 at time 1, even though the release times of both A and F are 0, because for A there exists B such that B has not completed and the end of the time slot for B is earlier than the end of the time slot for A in the pre-run-time schedule; and for F there exists E such that E has not completed and the end of the time slot for E is earlier than the end of the time slot for F in the pre-run-time schedule. Note that if A was allowed to execute at time 1, it could cause B to miss its deadline since A EXCLUDES B. Similarly, if F was allowed to execute at time 1, it could cause E to miss its deadline since F EXCLUDES E. FIG. 7D shows the latest-start-time schedule at t=1 and at t=2. The latest start times of all the uncompleted processes will remain unchanged.

At t=1 in Step 5, the single processor or multiprocessor timer interrupt mechanism will be programmed to interrupt at process B's latest start time LS(B)=2, before idling the processor since no process was selected for execution in Step 6.

At t=2: the single processor or multiprocessor timer interrupt mechanism will interrupt at the latest start time for B, LS(B)=2, and invoking the run-time scheduler. The run-time scheduler will set criticality(B) to HIGHER-CRITICALITY in Step 2. Then the run-time scheduler will select process B for execution in Case 2 of Step 3 at time 2.

At t=2 in Step 5, the single processor or multiprocessor timer interrupt mechanism will be programmed to interrupt at process B's deadline $d_B$=5, before actually dispatching B for execution in Step 6.

At t=4, B underruns, completing its computation and invoking the run-time scheduler. Then the run-time scheduler will select process A for execution in Case 3 of Step 3 at time 4. FIG. 7E shows the latest-start-time schedule at t=4. The latest start times of all the uncompleted processes will remain unchanged.

At t=4, the single processor or multiprocessor timer interrupt mechanism will be programmed to interrupt at process A's deadline $d_A$=9, before actually dispatching A for execution in Step 6.

At t=9, A completes after overrunning, but still meets its deadline. The processor is idle at t=9, because the run-time scheduler cannot select process F for execution according to the conditions that must be satisfied in Case 3 of Step 3 at time 1, even though the release times of F is 0, because for F there exists E such that E has not completed and the end of the time slot for E is earlier than the end of the time slot for F in the pre-run-time schedule. Note that if F was allowed to execute at time 9, it could cause E to miss its deadline since F EXCLUDES E. The scheduler also cannot schedule D for execution at time 9, because E PRECEDES D, and E has not yet completed its computation. FIG. 7F shows the latest-start-time schedule at t=9 and at t=10. The latest start times of all the uncompleted processes will remain unchanged.

At t=9 in Step 5, the single processor or multiprocessor timer interrupt mechanism will be programmed to interrupt at process E's release time r[E]=10, before idling the processor since no process was selected for execution in Step 6.

At t=10, the single processor or multiprocessor timer interrupt mechanism interrupts at process E's release time r[E]=10, invoking the scheduler. The scheduler will select process E for execution in Case 3 of Step 3 at time 10.

At t=10, the single processor or multiprocessor timer interrupt mechanism will be programmed to interrupt at process E's deadline $d_E$=13, before actually dispatching A for execution in Step 6.

At t=12: process E completes its computation and invokes the run-time scheduler. The run-time scheduler will select process D for execution in Case 3 of Step 3 at time 12. FIG. 7G shows the latest-start-time schedule at t=12. The latest start times of all the uncompleted processes will remain unchanged.

At t=12 in Step 5, the single processor or multiprocessor timer interrupt mechanism will be programmed to interrupt at the latest start time for F, LS(F)=14, before actually dispatching D for execution in Step 6.

At t=14, the single processor or multiprocessor timer interrupt mechanism interrupts at the latest start time for F, LS(F)=14, invoking the scheduler. The run-time scheduler will set criticality(F) to HIGHER-CRITICALITY in Step 2. Then the run-time scheduler will select process F for execution in Case 2 of Step 3 at time 14. Process D will be preempted by F. D still has not completed its computation at time 14. FIG. 7H shows the latest-start-time schedule at t=14.

At t=14, the single processor or multiprocessor timer interrupt mechanism will be programmed to interrupt at process D's deadline $d_D$=17, before actually dispatching F for execution in Step 6.

At t=16, F underruns, completing its computation. The run-time scheduler will select D and in Case 3 of Step 3 at time 16, allowing process D to continue to overrun.

FIG. 7I shows the latest-start-time schedule at t=16.

At t=16, the single processor or multiprocessor timer interrupt mechanism will be programmed to interrupt at process D's deadline $d_D$=17, before actually dispatching D for execution in Step 6.

At t=17, process D completes its computation before its deadline expires, despite overrunning.

Run-Time Phase: Second Illustrative Embodiment of the Method

We present a second illustrative embodiment of the method, shown in FIGS. 9A-9H, for handling real-time process overruns on either a single processor or multiprocessors at run-time. A significant advantage of the second illustrative embodiment of the method for real time processes handling real-time process overruns on either a single processor or multiprocessors at run-time is that it reduces the worst-case time complexity of the run-time scheduler for re-computing latest start times and for selecting processes for execution a single processor or multiprocessor at run-time.

This is significant in practice in hard real-time and embedded single processor or multiprocessor system real-world applications, because it is very important to strive to minimize the run-time overhead of the scheduler as much as possible, especially in a hard real-time and embedded single processor or multiprocessor system with limited processor and system resources.

The illustrative embodiments of a Multiprocessor Time Slot Right Shift procedure described earlier, can be used before run-time, to compute an "initial latest-start-time schedule" on a single processor or multiprocessor for uncompleted periodic processes in which the beginning of the time slot of each uncompleted process is the "initial latest start time" for that process.

The second illustrative embodiment of the run-time scheduling method introduced here will at the beginning of each LCM of the process periods, use the "initial latest-start-time schedule" computed by the illustrative embodiment of a Multiprocessor Time Slot Right Shift procedure introduced earlier. Then it will continue to make further changes to the latest start time schedule to re-compute latest start times and schedule the processes on a single processor or multiprocessor during run-time.

FIG. 8A shows a feasible pre-run-time schedule on two processors for processes A, B, C, D, E, F, G, X, Y, Z, in which the exclusion constraint D EXCLUDES Y is satisfied. FIG. 8B shows a possible run-time execution scenario on two processors for A, B, C, D, E, F, G, X, Y, Z. FIG. 8C shows an initial latest-start-time schedule on two processors for processes A, B, C, D, E, F, G, X, Y, Z, that can be computed before run-time using the illustrative embodiments of a Multiprocessor Time Slot Right Shift procedure described earlier. The initial latest-start-time schedule and the initial latest start times and end times will be used at run-time t=0, and at the beginning of each Least Common Multiple of the process periods. FIG. 8D-8O show latest-start time schedules on two processors that could be re-computed during run-time more efficiently by the second illustrative embodiment of the method here. The scheduling of processes A, B, C, D, E, F, G, X, Y, Z in FIG. 8B is discussed in Example 10.

Second Illustrative Embodiment of the Method for Re-Computing Latest Start Times and for Selecting Processors for Execution on a Single Processor or Multiprocessor at Run-Time In the following, we will describe a second illustrative embodiment of the method for efficiently re-computing latest-start-times, and portions of a latest-start-time schedule, that are affected by the preemption or completion (or overrun) of a process on a single processor or multiprocessor at run-time.

Note that in the present embodiment the latest-start-time schedule and the latest start time LS(p) will only be re-computed for a subset of the uncompleted processes that have not overrun; in this exemplary embodiment, we will only re-compute the latest-start-time schedule and latest start time for each uncompleted process p that has not overrun, i.e., p has a remaining worst-case computation time that is greater than zero.

Main Data Structures Used in the Second Illustrative Embodiment of the Method for Re-Computing Latest Start Times The latest-start-time schedule on a single processor or multiprocessor produced by using the illustrative embodiments of a Multiprocessor Time Slot Right Shift procedure described earlier, can be used as the initial feasible latest-start-time schedule used by this second illustrative embodiment of the method.

Suppose that in the latest-start-time schedule there are a total of n time slots, numbered 1, 2, n, where the first time slot is numbered 1, and the last time slot is numbered n.

The data associated with each time slot i in the latest-start-time schedule is represented by the data structure:
structure {
  s: int;
  e: int;
  l: int;
  p: int;
  prev: int;
  next: int;
  succ: int;
  active: Boolean;
} timeslot[i];

timeslot[i].s is the start time of time slot i;
timeslot[i].e is the end time of time slot i;
timeslot[i].l is the length of time slot i;
timeslot[i].p is the index of the process that was allocated that time slot;
timeslot[i].prev is the index of the time slot which is positioned immediately before time slot i in a sequence of time slots in which the order of the time slots corresponds to the order of increasing start times of the time slots;
timeslot[i].next is the index of the time slot which is positioned immediately after time slot i in a sequence of time slots in which the order of the time slots corresponds to the order of increasing start times of the time slots;
timeslot[i].succ is the index of the time slot belonging to the same process which is positioned after time slot i in a sequence of time slots in which the order of the time slots corresponds to the order of increasing start times of the time slots; timeslot[i].active is the active/inactive status of the process that was allocated that time slot.

We use the index variable, topindex, to store the index of the first active time slot which has the earliest start time of all time slots in a sequence of time slots that corresponds to the latest start time schedule in which the order of the time slots is consistent with the order of increasing start times of the time slots.

We also use the following time slot index arrays to keep track of the indexes of the first and last active time slots for each process p in the sequence of time slots that corresponds to the latest start time schedule.

firstindex[p]: which stores the index of the first (leftmost) active time slot that was allocated to process p in a latest-start-time schedule;

lastindex[p]: which stores the index of the last (rightmost) active time slot that was allocated to process p in a latest-start-time schedule;

Example 4

The latest-start-time schedule on two processors in FIG. 8C has a total of 15 time slots. The index of each time slot is shown in parentheses above each time slot. The first active time slot which has the earliest start time of all time slots in the latest start time schedule in FIG. 8C is timeslot[1], so topindex=1.

Time slots are not required to have time slot index numbers that are consecutive, or have time slot index numbers that reflect their exact position in the latest-start-time schedule, as over time, some time slots will become inactive. Note that the order of the time slots in the latest start time schedule is defined by the "prev" and "next" pointers in each time slot.

The time slot timeslot[10] with index 10 in FIG. 8C would have the following time slot data values: timeslot[10].s=8; timeslot[10].e=9; timeslot[10].l=1; timeslot[10].prev=9; timeslot[10].next=11; timeslot[10].succ=14; Assuming that process X has not yet completed (or overrun) and has a unique process index value equal to some value P(X), then timeslot[10].p=P(X); timeslot[10].active=true.

In FIG. 8C, firstindex[P(X)]=3; lastindex[P(X)]=14.

Second Illustrative Embodiment of the Method for Recomputing Latest Start Times on a Single Processor or Multiprocessor at Run Time At the start of each system major cycle corresponding to the least common multiple of the process periods, the time slot data will be initialized/restored to be consistent with an initial latest-start-time schedule of all the uncompleted processes on a single processor or multiprocessor which simultaneously satisfies important constraints and dependencies, such as offsets, release times, precedence relations, and exclusion relations, which can be computed off-line with the illustrative embodiments of a Multiprocessor Time Slot Right Shift procedure described earlier.

During run-time, the time slots in the latest-start-time schedule and the process latest start times may change when the remaining computation time of some of the processes change, which happens when some process has completed (or overruns) or is preempted. Note that we define a "preempted" process to be a process that has a remaining computation time that is greater than zero, when it was forced to relinquish the processor to some other process according to the run-time scheduler method. Note that processes that have overrun, that is, their remaining computation time is less than or equal to zero, are not defined as "preempted", and no time slots will be allocated to processes that have overrun in the latest-start-time schedule.

At any time t during run-time, only re-compute the latest start times LS(p) for each process p that was previously executing at time t−1, and which at time t was preempted because another process p1 has become ready and has a latest start time LS(p1) which is earlier than p's latest start time, that is LS(p1)<LS(p).

(See Pseudo Code for Second Illustrative Embodiment of the Method of Re-Computing the Latest Start Time Schedule and Latest Start Times at Run-Time on a Single Processor or Multiprocessor)

Step (A)

The time slots belonging to process p in the most recent latest-start-time schedule are examined in the order of from left to right starting from firstindex[p], and continuing to the next time slot belonging to p by following the pointer "succ" in each time slot. Note that the order of the time slots in the latest start time schedule is defined by the "prev" and "next" pointers in each time slot. A temporary variable, timelength (p), is initialized to have a value that is equal to the most recent executed time length of process p. Then the time slot length is compared with timelength(p).

If the time slot length is greater than timelength(p), then the start time of that time slot will be increased by timelength(p) while the length of that time slot will be reduced by timelength(p), and the start time of the corresponding time slot in the new latest-start-time schedule will be equal to the new latest start time for that process; otherwise timelength(p) will be reduced by the time slot length, and the time slot will be removed from the sequence of time slots in which the order of the time slots corresponds to the order of increasing start times of the time slots; and the procedure will be repeated for the next time slot that belongs to that process.

Example 5

In the run-time execution scenario illustrated in FIG. 8B, at time t=2, process A was preempted, and the temporary variable, timelength(p), will be initialized to the most recent executed time length, which is 2. At time t=2, the most recent latest-start-time schedule which is represented by the sequence of time slots in which the order of the time slots corresponds to the order of increasing start times of the time slots is shown in FIG. 8C. The second illustrative embodiment of the method starts by examining A's first time slot in the latest-start-time schedule, which is timeslot[1]. Since the length of timeslot[1] is 1 which is less than the value of timelength(p) which is 2, timeslot[1] will be removed from the latest start time schedule and timelength(p) will be reduced by the length of timeslot[1], so the new value of timelength will be 1. Finally A's next time slot, timeslot[15], has a length which is greater than timelength(p), so then the start time of that timeslot[15] will be increased by timelength(p) while the length of that timeslot[15] will be reduced by timelength(p), resulting in the start time of timeslot[15] being increased by 1, from 12 to 13; while the new length of timeslot[15] is reduced by 1, from 2 to 1; and the latest start time of A, LS(A) will be set to the new start time of timeslot[15], which is 13 in the new latest start time schedule shown in FIG. 8D.

Step (B)

The new start time of the time slot of process p which is equal to the new latest start time of p, LS(p), will be compared with the start time of the next time slot in the sequence of time slots which represents the latest start time schedule.

If LS(p) is greater than the start time of the next time slot in the sequence of time slots, then the position of the time slot belonging to p which is equal to the new latest start time of p in the sequence of time slots, will be switched with the position of the next time slot in the sequence of time slots. Repeat this step until the next time slot in the sequence of time slots has a start time that is greater or equal to the latest start time of p, so that the order of the time slots will always be consistent with the order of the start times of the time slots.

Example 6

In the run-time execution scenario illustrated in FIG. 8B, at time t=7, process B was preempted. At time t=7, the new latest start time of B, LS(B)=10 is equal to the start time of B's timeslot[11] as shown in FIG. 8I. Since LS(B)=10 is greater than the start time of the next time slot timeslot[12] in the sequence of time slots, so the position of timeslot[11] belonging to B will be switched with the position of the next time slot timeslot[12] belonging to Y in the sequence of time slots as defined by the "prev" and "next" pointers in each time slot.

Second Illustrative Embodiment of the Method for Selecting Processes for Execution on a Single Processor or Multiprocessor at Run Time (See Pseudo Code for Second Illustrative Embodiment of the Method of Scheduling Processes with Latest Start Times and Processes that Overrun for Execution on a Single Processor or a Multiprocessor at Run Time.)

Step (C)

If the latest start time of any process p has been reached at the current time t, that is, LS(p)=t, then select p for execution at time t.

Example 7

At time t=2 in the run-time execution scenario illustrated in FIG. 8B, C will be selected for execution in Step (C) because the latest start time of C has been reached, that is, LS(C)=2 in the latest start time schedule shown in FIG. 8D.

Step (D)

Assume that the number of processes that have reached their latest start times and have been selected for execution in Step (C) is n1. If n1 is less than the number of processors m, and there exists any process p1 that has overrun, then select up to m−n1 processes that have overrun for execution at time t.

Example 8

At time t=6 in the run-time execution scenario illustrated in FIG. 8B, the number of processes that have reached their latest start times n1=0 as shown in FIG. 8H and hence no process had been selected in Step (C). The number of available processors after Step (C) is (m−n1)=(2−0)=2. There exists one process F that has overrun, so F will be selected for execution in Step (D).

Step (E)

Assume that the total number of processes that have overrun and that have been selected for execution in Step (D) is n2. If n1+n2 is less than the number of processors m, then select up to m−(n1+n2) processes that have not overrun and have the m−(n1+n2) earliest latest start times among all processes p that are ready, that is, r(p) is less than or equal to the current time t, and there does not exist any uncompleted process p1 such that p1 precedes or excludes p (i.e., "p1 PREC p" [18][21]), by performing a sequential search of the time slots starting from the first time slot that corresponds to a process that has not been selected in Step (C) in the sequence of time slots that represents the latest start time schedule, and stopping as soon as m−(n1+n2) processes have been found or the end of the sequence of time slots has been reached.

Example 9

At time t=6 in the run-time execution scenario illustrated in FIG. 8B, no process had been selected in Step (C), and only one overrunning process F was selected in Step (D). The number of available processors after Step (C) and Step (D) is m−(n1+n2)=(2−1)=1. Among all processes that are ready at time t=6, process B has the earliest latest start time LS(B)=9 as shown in FIG. 8H. So B will be selected for execution on the (m−n)=(2−1)=1 available processors in Step (E).

Second Illustrative Embodiment of the Main-Run-Time-Scheduler Method

At run-time, the main run-time scheduler uses the second illustrative embodiments of the method described above for scheduling periodic processes.

With this Second Illustrative Embodiment of the Main-Run-Time-Scheduler Method, given a latest-start-time schedule of all the processes, at run-time there are the following main situations when the run-time scheduler may need to be invoked to perform a scheduling action:

(a) At a time t when some asynchronous process a has arrived and made a request for execution.

(b) At a time t when some process x has just completed its computation.

(c) At a time t that is equal to the latest start time $LS(p_j)$ of a process $p_j$.

(d) At a time t that is equal to the release time $R_p k$ of some process $p_k$.

(e) At a time t that is equal to the deadline $d_{p_i}$, of an uncompleted process $p_i$. (In this case, $p_i$ has just missed its deadline, and the system should handle the error.)

In situation (a) above, the run-time scheduler is usually invoked by an interrupt handler responsible for servicing requests generated by an asynchronous process.

In situation (b) above, the run-time scheduler is usually invoked by a kernel function responsible for handling process completions.

In situations (c), (d), and (e) above, the run-time scheduler is invoked by programming the single processor or multiprocessor timer interrupt mechanism to interrupt at the appropriate time.

Second Illustrative Embodiment of the Run-Time Scheduler Method

Let t be the current time.

Step 0.

In situation (e) above, check whether any process p has missed its deadline $d_p$. If so perform error handling.

Step 1.

In situation (a) above, if an A-h-k-a process $a_i$ has arrived, execute the A-h-k-a-Scheduler-Subroutine (the A-h-k-a Scheduler-Subroutine is described in [14]).

Step 2.

Whenever the run-time scheduler is invoked due to any of the situations (b), (c) and (d) above at time t:

If t=0, or if at time t, the end of the current system major cycle corresponding to the least common multiple of the process periods prdLCM has been reached, then initialize/restore the latest-start-time schedule and latest start times to be consistent with the initial latest-start-time schedule SL, which was computed before run-time by an embodiment of a Multiprocessor Time Slot Right Shift procedure; otherwise, apply the Second Illustrative Embodiment of the Method For Recomputing Latest Start Times on a Single Processor Or a Multiprocessor above for each process p that was previously executing at time t−1.

Applying the Second Illustrative Embodiment of the Method For Recomputing Latest Start Times on a Single Processor Or a Multiprocessor will do the following:

The latest start time LS(p) for each uncompleted process p that was previously executing at time t−1 and has not overrun at time t will be re-computed.

Any process p that was previously executing at time t−1 but has either completed or has overrun at time t will be removed from the re-computed latest start time schedule.

Step 3.

Use the Second Illustrative Embodiment of the Method For Selecting Process to Run on a Single Processor Or a Multiprocessor to select up to m processes if possible to execute on the m processors at time t.

Step 4.

At time 0 and after servicing each single processor or multiprocessor timer interrupt mechanism interrupt, and performing necessary error detection, error handling, latest start time re-calculations, and making scheduling decisions; —reset the single processor or multiprocessor timer interrupt mechanism to interrupt at the earliest time that any of the events (c), (d), and (e) above may occur.

Step 5.

Let the processes that were selected in Step 3 start to execute at run-time t. (If a selected process x was previously executing on some processor $m_q$ at time t−1, then one may let process x continue to execute on the same processor $m_q$ at time t.)

(End of Second Illustrative Embodiment of Main Run-Time Scheduler Method)

An important and desirable property of this method is that, in a case where there may not be enough spare time available, one can always "skip" re-computing some subset of the latest start times LS(p) at any time, and rely on the most recently computed latest start times LS(p) to schedule the processes, while still guaranteeing that all the processes' timing constraints will be satisfied, with the only consequence being a possible reduction in the length of time that some processes may be allowed to overrun, because some recent process underruns may not have been taken into account.

Example 10

FIG. 8A shows a feasible pre-run-time schedule on two processors for processes A, B, C, D, E, F, G, X, Y, Z. It is assumed that the following precedence and exclusion relations must be satisfied: D EXCLUDES Y.

Because D EXCLUDES Y and D is ordered before Y in the original feasible pre-run-time schedule shown in FIG. 8A, the "D PREC Y" relation is defined.

From the "D PREC Y" relation, we can define the adjusted release time of Y, r'[Y]=r[D]+c[D]=7+2=9.

From the "D PREC Y" relation, we can define the adjusted deadline of D, d'[D]=d[Y]− c[Y]=11−2=9.

FIG. 8C shows an initial latest-start-time schedule on two processors for processes A, B, C, D, E, F, G, X, Y, Z, that can be computed before run-time using the illustrative embodiment of a Multiprocessor Time Slot Right Shift procedure described earlier. The initial latest-start-time schedule and the latest start times and end times for the set of processes are computed off-line by the procedure from the original feasible pre-run-time schedule, and will be used at run-time t=0, and at the beginning of each Least Common Multiple of the process periods.

FIG. 8B shows a possible run-time execution scenario on two processors for A, B, C, D, E, F, G, X, Y, Z, that results from using the Second Illustrative Embodiment of the Main-Run-Time-Scheduler Method above.

FIG. 8D 8O show latest-start time schedules on two processors that could be re-computed during run-time more efficiently by the Second Illustrative Embodiment of the Method For Recomputing Latest Start Times on a Single Processor Or a Multiprocessor At Run Time. The scheduling of processes A, B, C, D, E, F, G, X, Y, Z in FIG. 8B on two processors is discussed below.

In the possible run-time execution on two processors of the set of processes A, B, C, D, E, F, G, X, Y, Z shown in FIG. 8B, E, G, D, Y underruns, while F, B, C, A overruns. The portions of the run-time execution during which F, B, C, A overrun are shown using dashed lines.

In the pre-run-time phase, an embodiment of a Multiprocessor Time Slot Right Shift procedure for computing the latest start times, such as the procedure described earlier, will compute the initial latest start time schedule and the initial latest start time values shown in FIG. 8C for use at run time t=0.
The initial latest-start-time schedule and the latest start times and end times for the set of processes are computed off-line by an embodiment of a Multiprocessor Time Slot Right Shift procedure, and will be used at run-time t=0, and at the beginning of each Least Common Multiple of the process periods. At run-time t=0: the run-time scheduler will select process A and X to run on processor $m_1$ and processor $m_2$ respectively, because A and X are the only processes that are ready at time t=0.

At t=0, the single processor or multiprocessor timer interrupt mechanism will be programmed to interrupt at process C's latest start time LS(C)=2, before actually dispatching A and X for execution.

At time t=2: after re-computing the latest-start-times for A and X at time 2, LS(A)=13, LS(X)=8, as shown in FIG. 8D. The run-time scheduler will select process C and X to run on processor $m_1$ and processor $m_2$ respectively, because C and X have the earliest latest start times among all processes that are ready, LS(C)=2, LS(X)=8.
At t=2, the single processor or multiprocessor timer interrupt mechanism will be programmed to interrupt at process F's release time r(F)=3, before actually dispatching C and X for execution.

At time t=3: after re-computing the latest-start-times for C and X at time 3, LS(C)=3, LS(X)=11, as shown in FIG. 8E. The run-time scheduler will select process C and F to run on processor $m_1$ and processor $m_2$ respectively, because C and F have the earliest latest start times among all processes that are ready, LS(C)=3, LS(F)=4.
At t=3, the single processor or multiprocessor timer interrupt mechanism will be programmed to interrupt at process E's latest start time LS(E)=LS(F)=4, before actually dispatching C and F for execution.

At time t=4: after re-computing the latest-start-times for C and F at time 4, LS(C)=6, LS(F)=7, as shown in FIG. 8F.
The run-time scheduler will select process C and E to run on processor $m_1$ and processor $m_2$ respectively, because C and E have the earliest latest start times among all processes that are ready, LS(C)=6, LS(E)=4.
At t=4, the single processor or multiprocessor timer interrupt mechanism will be programmed to interrupt at process G's latest start time LS(G)=r(B)=5, before actually dispatching C and E for execution.

At time t=5: E underruns. After re-computing the latest-start-times for C at time 5, LS(C)=11 as shown in FIG. 8G. The run-time scheduler will select process F and G to run on processor $m_1$ and processor $m_2$ respectively, because F and G have the earliest latest start times among all processes that are ready, LS(F)=7, LS(G)=5.
At t=5, the single processor or multiprocessor timer interrupt mechanism will be programmed to interrupt at process D's latest start time LS(D)=7, before actually dispatching F and G for execution.

At time t=6: G underruns, while F overruns. The run-time scheduler will select process F and B to run on processor $m_1$ and processor $m_2$ respectively, because F has overrun and no other process latest start time has been reached; while the run-time scheduler will select B because B has the earliest latest start time among all other processes that are ready, LS(B)=9 as shown in FIG. 8H.
At t=6, the single processor or multiprocessor timer interrupt mechanism will be programmed to interrupt at process D's latest start time LS(D)=7, before actually dispatching F and B for execution.

At time t=7: After re-computing the latest-start-times for B at time 7, LS(B)=10 as shown in FIG. 8I. The run-time scheduler will select process F and D to run on processor $m_1$ and processor $m_2$ respectively, because LS(D)=7; while the run-time scheduler will select F which has overrun because no other process' latest start time has been reached.
At t=7, the single processor or multiprocessor timer interrupt mechanism will be programmed to interrupt at process Y's latest start time LS(Y)=9, before actually dispatching F and D for execution.

At time t=8: D underruns, while F completes before its deadline despite overrunning. The run-time scheduler will select process B and Y to run on processor $m_1$ and processor $m_2$ respectively, because B and Y have the earliest latest start times among all processes that are ready, LS(Y)=9, LS(B)=10 as shown in FIG. 8J.
At t=8, the single processor or multiprocessor timer interrupt mechanism will be programmed to interrupt at process C anf X's latest start time LS(C)=LS(X)=11, before actually dispatching Y and B for execution.

At time t=9: Y underruns, while B overruns. The run-time scheduler will select process B and C to run on processor $m_1$ and processor $m_2$ respectively, because B has overrun and no other process' latest start time has been reached; and because C has the earliest latest start time among all other processes that are ready, LS(C)=11 as shown in FIG. 8K.
At t=9, the single processor or multiprocessor timer interrupt mechanism will be programmed to interrupt at process X's latest start time LS(X)=11, before actually dispatching C and B for execution.

At time t=10: both B and C overrun. If no other event had caused the run-time scheduler to be invoked, then B and C will simply be allowed to continue to execute. (If the run-time scheduler had been invoked for any reason at time t=10, it will select process B and C to run on processor $m_1$ and processor $m_2$ respectively, because B and C have overrun and no other process' latest start time has been reached, and the single processor or multiprocessor timer interrupt mechanism will be programmed to interrupt at process X's latest start time LS(X)=11, before actually dispatching C and B for execution. FIG. 8L shows the re-computed latest start times if the run-time scheduler had been invoked at time t=10.)

At time t=11: B completes before its deadline despite overrunning. The run-time scheduler will select process C and X to run on processor $m_1$ and processor $m_2$ respectively, because LS(X)=11; while the run-time scheduler will select C which has overrun, because no other process's latest start time has been reached.

At t=11, the single processor or multiprocessor timer interrupt mechanism will be programmed to interrupt at process A's latest start time LS(A)=13, before actually dispatching X and C for execution. FIG. 8M shows the re-computed latest start times at time t=11.

At time t=12: C completes before its deadline despite overrunning. After re-computing the latest start time of X, LS(X)=12, as shown in FIG. 8N. The run-time scheduler will select process A and X to run on processor $m_1$ and processor $m_2$ respectively, because A and X are the only uncompleted processes.

At time t=13: A overruns, LS(X)=13. FIG. 8O shows the re-computed latest start times if the run-time scheduler had been invoked at time t=13. Similar to the case at time t=10, if no other event had caused the run-time scheduler to be invoked, then X will simply be allowed to continue to execute.

At time t=14: both A and X complete before their deadline despite A overrunning.

Pseudo Code for Second Illustrative Embodiment of the Method of Re-Computing the Latest Start Time Schedule and Latest Start Times at Run-Time on a Single Processor or Multiprocessor)

% Step (A)
% Process p has just been preempted or has just completed
% or has just overrun
% Examine time slots of p in order of increasing time slot
% start times starting from firstindex[p], and continuing
% to the next time slot that belongs to p by following the
% "succ" pointer in each time slot that belongs to p.
% It is assumed that topindex stores the index of the time slot
% with the earliest start time.

```
p = most_recent_executing_process;
timelength(p) = most_recent_executed_time_length(p);
overrun_or_completed(p) = false; done(p) = false;
index(p) = firstindex[p];
while((timelength(p) ≥ timeslot[index(p)].1) and not(done(p))) do
   begin
      timelength(p) = timelength(p) – timeslot[index(p)].1;
      % remove timeslot from linked list
      if (topindex = index(p)) then
         begin
            topindex = timeslot[index(p)].next;
            timeslot[index(p)].next.prev = 0;
         end
      else
         begin
            timeslot[timeslot[index(p)].next].next =
               timeslot[index(p)].next ;
            timeslot[timeslot[index(p)].next].prev =
               timeslot[index(p)].prev;
         end
      timeslot[index(p)].active = false;
      if (timelength(p) = 0) then
         begin
            % p has either overrun or has completed at time t
            overrun_or_completed(p) = true;
            done(p) = true;
```

```
            exit;
         end
      else
         % go to next timeslot for p
         index(p) = timeslot[index(p)].succ;
   end
% timelength(p) < timeslot[index(p)].1
% This is the firstindex[p] timeslot for p
% in the new latest start-time schedule
timeslot[index(p)].s = timeslot[index(p)].s + timelength(p);
timeslot[index(p)].1 = timeslot[index(p)].e –
       – timeslot[index(p)].s;
timelength(p) = 0;
done(p) = true;
LS[timeslot[index(p)]] = timeslot[index(p)].s;
firstindex(p) = index(p);
```

% Step (B)
% If the next time slot in the linked list has an earlier start time
% then exchange positions with the next time slot. Repeat until
% order of time slots in linked list is consistent with order of
% start times.

```
while( (timeslot[index(p)].s >
   timeslot[timeslot[index(p)].next].s))
   and not(timeslot[index(p)].next = 0)) do
   begin
      if (not(timeslot[timeslot[index(p)].next].next = 0)) then
         % at least two time slots follow timeslot[index(p)]
         % exchange positions of timeslot[index(p)] with
         % next time slot
         begin
            timeslot[timeslot[timeslot[index(p)].next].next].prev =
               index(p);
            timeslot[timeslot[index(p)].prev].next =
               timeslot[index(p)].next ;
            timeslot[timeslot[index(p)].next].prev =
               timeslot[index(p)].prev;
            timeslot[index(p)].prev =
               timeslot[index(p)].next ;
            templastindex = timeslot[timeslot[index(p)].next]. next;
            timeslot[timeslot[index(p)].next].next = index (p) ;
            timeslot[index(p)].next = templastindex;
         end
      else
         % only one time slot follows timeslot[index(p)].
         % exchange positions of timeslot[index(p)] with
         % next time slot.
         % timeslot[index(p)] will become last time slot.
         begin
            timeslot[timeslot[index(p)].prev].next =
               timeslot[index(p)].next ;
            timeslot[timeslot[index(p)].next].prev =
               timeslot[index(p)].prev;
            timeslot[index(p)].prev =
               timeslot[index(p)].next ;
            timeslot[index(p)].next.next = index (p) ;
            timeslot[index(p)].next = 0;
         end
   end
```

PSEUDO Code for Second Illustrative Embodiment of the Method of Scheduling Processes with Latest Start Times and Processes that Overrun for Execution on a Single Processor or Multiprocessor at Run Time)

% Step (C)
% Check whether the processes with the earliest latest start
% times at the top of the sequence of time slots have reached
% their latest start times at the current time t.
% Record any process that has reached its latest start time in
% the array reachedLS[i], 0≤i≤m−1.
% NreachedLS stores the number of such processes.
% It is assumed that topindex stores the index of the time slot
% with the earliest start time.
currentIndex=topindex;
done=false;
NreachedLS=0;
    while ((LS(timeslot[currentIndex].p)≤t) and not(done))
        do
        begin
            reachedLS [NreachedLS]=timeslot [currentIndex].p;
            NreachedLS=NreachedLS+1;
            if (NreachedLS≥m) then done=true;
            currentIndex=timeslot [currentIndex].next;
        end
    end
% Step (D)
% The number of processes that have reached their
% latest start time in Step (C) is NreachedLS.
% If NreachedLS is less than the number of processors m,
% then select up to m−NreachedLS processes that have
% overrun.
% It is assumed that the total number of processes that have
% overrun is TotalO, and their process indexes are stored in
% the array overrunP[j], 0≤j≤n−1, in the order of
% increasing deadlines.
% Selected processes that have overrun are stored in the
    array
% selectedO[k], 0≤i≤m−1.
% The total number of selected processes that have overrun
% is stored in the array NselectedO[1], 0≤1≤n−1.
NselectedO=0;
while((NselectedO+NreachedLS)<m) and
    (NselectedO<TotalO) and not(done)) do
        begin
        selectedO [NselectedO]=overrunP [NselectedO];
        NselectedO=NselectedO+1;
        if ((NselectedO+NreachedLS)≥m) then done=true;
    end
% Step (E)
% The number of processors is m, and the total number of
% processes selected in Step (C) and Step (D) above
% is (NselectedO+NreachedLS). Try to find (m−
% (NselectedO+NreachedLS) processes with the (m−
% (NselectedO+NreachedLS) earliest latest start times
    among
% all processes that are ready and have not overrun and there
% are no uncompleted processes p1 such that p1 PREC p
% (PREC(p) is set to true if this condition is not satisfied)
% and record them in the array candidate[i], 0≤i≤m−1.
% NcandidatesFound stores the number of execution can-
    didates
% found.
% Note that at the end of Step (C) currentIndex was set to
    the
% index of the time slot corresponding to the process p with
% the earliest latest start time LS(p) such that LS(p)>t.
NcandidatesFound=0;
while(not(done)) do
    begin
        if ((LS(timeslot [currentIndex].p)=timeslot [currentIndex].s)
            and (r(timeslot[currentIndex].p)≤t)
            and not(PREC(p))) then
            begin
            candidate [NcandidatesFound]=timeslot [currentIndex].p;
            NcandidatesFound=NcandidatesFound+1;
            if (((NcandidatesFound+NreachedLS+NselectedO)
                ≥m)
                then done=true;
            end
        if (currentIndex=0) then done=true;
        currentIndex=timeslot[currentIndex].next;
    end Advantages of the Second Illustrative Embodiment of the Method for Re-Computing Latest Start Times and Scheduling Processes on a Single Processor or Multiprocessor at Run Time A significant advantage of the Second Illustrative Embodiment of the Method For Re-computing Latest Start Times and Scheduling Processes on a Single Processor or Multiprocessor is that it reduces the worst-case time complexity of the run-time scheduler for re-computing latest start times and for selecting processes for execution a single processor or multiprocessor at run-time.

This is significant in practice in hard real-time and embedded single processor or multiprocessor system real-world applications, because it is very important to strive to minimize the run-time overhead of the scheduler as much as possible, especially in hard real-time and embedded single processor or multiprocessor systems with limited processor and system resources.

Some of the strategies that have been employed in this second illustrative embodiment of the method to achieve the reduction of the worst-case time complexity of the run-time scheduler for re-computing latest start times and for selecting processes for execution on a single processor or multiprocessor at run-time are listed below:

(a) The second illustrative embodiment of the method only needs to re-compute the latest start time for a subset of the uncompleted processes that have not overrun, in this illustrative embodiment, the processes that were previously executing at time t−1, and had just been preempted, instead of re-computing the latest start times for all the uncompleted processes.

(b) In addition, the second illustrative embodiment of the method only needs to visit each time slot of the processes that were previously executing at time t−1 and had just been preempted at most once.

(c) At the start of each system major cycle corresponding to the least common multiple of the process periods, the time slot data will be initialized/restored to be consistent with a feasible latest-start-time schedule on a single processor or multiprocessor of all the uncompleted processes, the "initial latest-start-time schedule", which can be computed off-line with the illustrative embodiment of a Multiprocessor Time Slot Right Shift procedure described earlier.

(d) The second illustrative embodiment of the method for selecting processes for execution at any time t during run-time is also highly efficient, because the second illustrative embodiment of the method only needs to examine the first few time slots in the sequence of time slots in order to find the processes that have the earliest latest start times among all processes that are ready, since the order of the time slots is always consistent with the order of the latest start times of the processes that are associated with each of the time slots.

We have shown a plurality of exemplary embodiments of the present invention with different characteristics and different advantages, to be used either before run-time, or during run-time, for generating different latest-start-time schedules with different characteristics and different advantages, and for computing latest start times of real-time processes, and a plurality of run-time schedulers with different characteristics and advantages, which at run-time, uses either the original or latest-start-time schedules to compute latest start times for each process; and then uses those latest start times of the processes in the feasible latest-start-time schedule, to effectively handle process underruns and overruns while scheduling the processes on either a single processor or a multiprocessor, so that processes that need to overrun, can effectively and systematically utilize any spare processor capacity, including any spare processor capacity that becomes available when other processes underrun, to maximize their chances of still meeting their respective deadlines, despite overrunning, thereby increasing both system utilization and robustness in the presence of inaccurate estimates of the worst-case computations of the real-time processes, while simultaneously satisfying important constraints and dependencies, such as offsets, release times, precedence relations, and exclusion relations on either a single processor or a multiprocessor. In all of the exemplary embodiments, multiple processor resources are effectively utilized: process executions can be selectively preempted by other process executions and can migrate from one processor to another processor at any time and as many times as necessary at run time to provide greater flexibility in utilizing any unused processor capacity and meeting deadlines.

When embodiments of the method are used at run-time to re-compute the latest start times LS(p) for uncompleted processes, one can effectively reduce the run-time computation effort, by pre-computing most of the values that are used by the second illustrative embodiment of the method, so that much of the computation can be performed by table lookup.

Another important and desirable property of the embodiments of the method is that, in a case where there may not be enough spare time available, one can always "skip" re-computing some subset of the latest start times LS(p) at any time, and rely on the most recently computed latest start times LS(p) to schedule the processes, while still guaranteeing that all the processes' timing constraints will be satisfied, with the only consequence being a possible reduction in the length of time that some processes may be allowed to overrun, because some recent process underruns may not have been taken into account. Note that there will always exist at least one set of valid latest start times LS(p)—the initial set of latest start times that are computed before run-time.

During run-time, if there are few idle intervals and time is tight, then it may be advantageous to use an embodiment to only compute the latest start time for the next process or a limited number of processes, or even skip re-computing the latest start times and only rely on the most recently computed latest start times, in order to reduce run-time system overhead.

According to yet another embodiment of the present invention, one can construct a feasible latest-start-time schedule SL on a single processor or a multiprocessor without first constructing a separate pre-run-time schedule SO, for the set of periodic processes that satisfies all the release times, deadlines, precedence and exclusion constraints, for all occurrences of all the periodic processes within the interval [0, prdLCM], where prdLCM is the least common multiple of the process periods, in which the beginning of the time slot for each uncompleted process p in SL is equal to its latest start time LS[p], by scheduling all processes in P starting from time t equal to the latest deadline among all the processes in P, in reverse time order, using a Latest-Release-Time-First" scheduling strategy that is equivalent to a reverse application of the well known Earliest-Deadline-First strategy that also satisfies precedence and exclusion constraints, then at run-time using a run-time scheduler which uses the information provided in the feasible latest-start-time schedule SL, including all PREC relations in the feasible latest-start-time schedule SL, to schedule the periodic processes, such that multiple processor resources can be effectively utilized: process executions can be selectively preempted by other process executions and can migrate from one processor to another processor at any time and as many times as necessary at run time to provide greater flexibility in utilizing any unused processor capacity and meeting deadlines.

According to yet another embodiment of the present invention, the single processor or multiprocessor interrupt mechanism can be programmed to only interrupt/preempt as few processes as possible, so that the run-time scheduler only needs to reschedule as few processes as possible to execute on the available processors whenever at run-time the run-time scheduler is invoked to perform a scheduling action at any of the following times:

(a) At a time t when some asynchronous process a has arrived and made a request for execution.
(b) At a time t when some process x has just completed its computation.
(c) At a time t that is equal to the latest start time LS(pj) of a process pj.
(d) At a time t that is equal to the release time Rpk of some process pk.
(e) At a time t that is equal to the deadline dpi of an uncompleted process pi. (In this case, pi has just missed its deadline, and the system should handle the error.)

when the run-time scheduler is invoked to perform a scheduling action in situations (a), (c), (d) if the number of asynchronous processes that have arrived at time t plus the number of processes for which a latest start time has been reached at time t plus the number of processes for which a release time has been reached at time t is n1; the number of processors idle at time t is n2, and the total number of processes currently executing at time t is n3, then only at most min{n3, max{0, n1−n2}} of the currently executing processes may need to be interrupted/preempted, in order for the newly arrived asynchronous processes or periodic processes that have just become ready or their latest start times have just been reached to be scheduled for execution on one of the processors;

In the above case, one may select the processes which have the latest deadlines, or have the latest latest start times among the currently executing processes to be interrupted/preempted.

when the run-time scheduler is invoked to perform a scheduling action in situations (b), (e), when a process has completed or a process has reached its deadline, no other currently executing process may need to be interrupted/preempted.

A person understanding the above-described illustrative embodiments of the method may now conceive of alternative designs, using the principles described herein. All such designs which fall within the scope of the claims appended hereto are considered to be part of the present method.

While the above description contains many specificities, these should not be construed as limitations on the scope of any embodiment, but as exemplifications of various embodiments thereof. Many other ramifications and variations are possible within the teachings of the various embodiments.

Thus the scope should be determined by the appended claims and their legal equivalents, and not by the examples given.

What is claimed is:

1. A system for scheduling, preempting, and dispatching executions of a plurality of periodic processes with hard deadlines on a single processor or on a multiprocessor while accessing a plurality of data memory resources in an embedded hard-real-time computer system with high assurance requirements which allows periodic processes with hard deadlines to overrun while guaranteeing satisfaction of predetermined constraints, comprising:
   (A) one or more processors to execute said plurality of periodic processes with hard deadlines, each periodic process with a hard deadline in said plurality of periodic processes with hard deadlines having an estimated worst-case computation time, the executions of said plurality of periodic processes with hard deadlines by said one or more processors being required to satisfy the predetermined constraints comprising:
   (A1) period for said each periodic process with a hard deadline,
   (A2) release time for said each periodic process with a hard deadline,
   (A3) deadline for said each periodic process with a hard deadline,
   (A4) exclusion relations wherein each exclusion relation being defined between a selected pair of periodic processes with hard deadlines in said plurality of periodic processes with hard deadlines, and said selected pair of periodic processes with hard deadlines being prevented from accessing any one of said shared data memory resources at the same time,
   (B) one or more timers which allow the system to determine at any time:
   (B1) a current time, and,
   (B2) a remaining worst-case computation time for each uncompleted periodic process with a hard deadline,
   (C) a single processor or multiprocessor timer interrupt mechanism which in combination with said one or more timers can be programmed to interrupt and cause the preemption of the executions of one or more particularly chosen periodic processes with hard deadlines on one or more particularly chosen processors at particularly chosen times,
   (D) a memory which stores latest-start-times for one or more uncompleted periodic processes with hard deadlines that have not overrun including uncompleted periodic processes with hard deadlines that have not overrun which have been preempted wherein
   (D1) each of the latest-start-times for said one or more uncompleted periodic processes with hard deadlines that have not overrun being either equal to a previously stored latest-start-time or being equal to an updated latest-start-time which may be greater than a previously stored latest-start-time if the remaining computation times of one or more periodic processes with hard deadlines have decreased due to completion or partial completion of said one or more periodic processes with hard deadlines, and
   (D2) if each of said one or more uncompleted periodic processes with hard deadlines that have not overrun is able to start on or before its latest-start-time and the length of time that each of said one or more uncompleted periodic processes with hard deadlines that have not overrun is executed by said one or more processors is less than or equal to the length of its remaining worst-case computation time then satisfaction of said predetermined constraints for all said one or more uncompleted periodic processes with hard deadlines that have not overrun can be guaranteed, and
   (D3) each of said latest-start-times for one of said one or more uncompleted periodic processes with hard deadlines that have not overrun being equal to a beginning time of a time slot in a sequence of time slots on one or more processor time axes in a latest-start-time schedule,
   (D3.1) said latest-start-time schedule comprising mapping from the executions of said one or more uncompleted periodic processes with hard deadlines that have not overrun to said sequence of time slots on one or more processor time axes, each of the time slots in said sequence of time slots having a beginning time and an end time, each one of the time slots in said sequence of time slots being reserved for execution of one of said one or more uncompleted periodic processes with hard deadlines that have not overrun, the positions of the end time and the beginning time of each of the time slots in said sequence of time slots being such that the executions of said one or more uncompleted periodic processes with hard deadlines that have not overrun will satisfy said predetermined constraints,
   (D3.2) if an exclusion relation is defined between any first uncompleted periodic process with a hard deadline that has not overrun and any second uncompleted periodic process with a hard deadline that has not overrun and a first time slot in said sequence of time slots being reserved for said any first uncompleted periodic process with a hard deadline that has not overrun and a second time slot in said sequence of time slots being reserved for said any second periodic process with a hard deadline that has not overrun are either on different processor time axes or are on a same processor axis, then there will not exist any overlap in time between said first time slot in said sequence of time slots and said second time slot in said sequence of time slots in said latest-start-time schedule,
   (E) a run-time scheduler which is activated by interrupts generated by said single processor or multiprocessor timer interrupt mechanism in combination with said one or more timers, or activated at time zero or activated by the completion of a periodic process with a hard deadline, and which on each activation:
   (E1) computes and stores in said memory one or more updated latest-start-times for said one or more uncompleted periodic processes with hard deadlines that have not overrun if
   (E1.1) there is enough time available to compute said one or more updated latest-start-times, and
   (E1.2) said one or more updated latest-start-times are greater than the latest-start-times most recently stored in said memory for said one or more uncompleted periodic processes with hard deadlines that have not overrun when the remaining computation times of said one or more periodic processes with hard deadlines have decreased due to completion or partial completion of said one or more periodic processes with hard deadlines, (E2) schedules for execution one or more particular uncompleted periodic processes with hard deadlines that have not overrun on one or more particular processors among said one or more processors at any particular time when the latest-start-time for each of said one or more particular uncompleted periodic processes with hard deadlines that have not overrun has been reached at said any particular time, (E3) allows preemption, at run-time, of the executions of one or more first specific periodic processes on one or more first processors by the executions of one or more second specific periodic processes at any appropriate time if the latest start time for each of said one or more second specific periodic processes has been reached and for each of said one or more first specific periodic processes either the latest start time of said each of said one or more first specific periodic processes has not been reached or said each of said one or more first specific periodic processes has already overrun at said any appropriate time, and allows resumption, at run-time, of the execution of said each of said one or more first specific periodic processes on any available second processor at any later appropriate time wherein said any available second processor may either be different from or identical to any of said one or more first processors, (E4) performs error handling if the deadline for any uncompleted periodic process with a hard deadline has been reached, (E5) programs said single processor or multiprocessor timer interrupt mechanism to interrupt and re-activate the run-time scheduler at future times including (E5.1) latest-start-times of uncompleted periodic processes with hard deadlines that have not overrun, and (E5.2) deadlines of uncompleted periodic processes with hard deadlines, (E6) allows any selected uncompleted periodic process with a hard deadline to overrun until the latest start time of another uncompleted periodic process with a hard deadline or until the deadline of said any selected uncompleted periodic process with a hard deadline has been reached, (F) a plurality of input devices or systems which provide input signals that require processing by the periodic processes with hard deadlines, and (G) a plurality of output devices or systems which receive the output results of a subset of the periodic processes with hard deadlines on or before the hard deadlines of said subset of the periodic processes with hard deadlines, whereby during run-time any uncompleted periodic process with a hard deadline is permitted to overrun until the latest start time of another uncompleted periodic process with a hard deadline or until the deadline of said any uncompleted periodic process with a hard deadline has been reached, and the latest start times can be updated during run-time when their values can be increased due to completion or partial completion of one or more periodic processes with hard deadlines, so that uncompleted periodic processes with hard deadlines can utilize any spare processor capacity to overrun when needed, including spare capacity that becomes available when other periodic processes with hard deadlines underrun, and effectively utilize multiple processor resources by allowing process executions to be selectively preempted by other process executions and migrate from one processor to another processor at any time and as many times as necessary at run time to provide greater flexibility in utilizing any unused processor capacity, thus increasing the chances that uncompleted periodic processes with hard deadlines will still be able to complete their computations despite overrunning, while guaranteeing satisfaction of important predetermined timing constraints including deadlines for all uncompleted periodic processes with hard deadlines that have not overrun and including exclusion relations which prevent processes from concurrently accessing a shared data memory resource, reduce the chances of total system failure, and increase both processor utilization and system robustness in the presence of inaccurate estimates of the worst-case computation times of periodic processes with hard deadlines.

2. The system as defined in claim 1, wherein said latest-start-time schedule is generated by scheduling the uncompleted periodic processes with hard deadlines that have not overrun on a single processor or on a multiprocessor in reverse time order starting from a time that is equal to the latest deadline among the deadlines of the uncompleted periodic processes with hard deadlines that have not overrun, using a latest-release-time-first scheduling strategy that is equivalent to a reverse application of an earliest-deadline-first strategy which allows any first uncompleted periodic process with a hard deadline that has not overrun to preempt any second uncompleted periodic process with a hard deadline that has not overrun at any appropriate time if said any first uncompleted periodic process with a hard deadline that has not overrun and said any second uncompleted periodic process with a hard deadline that has not overrun do not access a shared data memory resource and which satisfies said predetermined constraints for uncompleted periodic processes with hard deadlines that have not overrun on a single processor or on a multiprocessor.

3. The system as defined in claim 1, wherein the run-time scheduler programs said single processor or multiprocessor timer interrupt mechanism to interrupt and re-activate the run-time scheduler at future times including release-times of uncompleted periodic processes with hard deadlines that have not overrun on a single processor or on a multiprocessor.

4. The system as defined in claim 1, wherein said predetermined constraints further include precedence relations, each precedence relation being defined between a first periodic process with a hard deadline and a second periodic process with a hard deadline in said plurality of periodic processes with hard deadlines, said second periodic process with a hard deadline cannot start execution before the end of the execution of said first periodic process with a hard deadline on a single processor or on a multiprocessor.

5. The system as defined in claim 2, wherein the run-time scheduler programs said single processor or multiprocessor timer interrupt mechanism to interrupt and re-activate the run-time scheduler at future times including release-times of uncompleted periodic processes with hard deadlines that have not overrun on a single processor or on a multiprocessor.

6. The system as defined in claim 2, wherein said predetermined constraints further include precedence relations, each precedence relation being defined between a first periodic process with a hard deadline and a second periodic process with a hard deadline in said plurality of periodic processes with hard deadlines, said second periodic process with a hard deadline cannot start execution before the end of the execution of said first periodic process with a hard deadline on a single processor or on a multiprocessor.

7. A method for scheduling, preempting, and dispatching executions of a plurality of periodic processes with hard deadlines on a single processor or on a multiprocessor while accessing a plurality of data memory resources in an embedded hard-real-time computer system with high assurance requirements which allows periodic processes with hard deadlines to overrun while guaranteeing satisfaction of predetermined constraints, comprising:

(A) providing one or more processors to execute said plurality of periodic processes with hard deadlines, each periodic process with a hard deadline in said plurality of periodic processes with hard deadlines having an estimated worst-case computation time, the executions of said plurality of periodic processes with hard deadlines by said one or more processors being required to satisfy the predetermined constraints comprising:

(A1) period for said each periodic process with a hard deadline, (A2) release time for said each periodic process with a hard deadline, (A3) deadline for said each periodic process with a hard deadline, (A4) exclusion relations wherein each exclusion relation being defined between a selected pair of periodic processes with hard deadlines in said plurality of periodic processes with hard deadlines, and said selected pair of periodic processes with hard deadlines being prevented from accessing any one of said shared data memory resources at the same time, (B) providing one or more timers which allow the system to determine at any time:

(B1) a current time, and, (B2) a remaining worst-case computation time for each uncompleted periodic process with a hard deadline, (C) providing a single processor or multiprocessor timer interrupt mechanism which in combination with said one or more timers can be programmed to interrupt and cause the preemption of the executions of one or more particularly chosen periodic processes with hard deadlines on one or more particularly chosen processors at particularly chosen times, (D) providing a memory which stores latest-start-times for one or more uncompleted periodic processes with hard deadlines that have not overrun including uncompleted periodic processes with hard deadlines that have not overrun which have been preempted wherein (D1) each of said latest-start-times for said one or more uncompleted periodic processes with hard deadlines that have not overrun being either equal to a previously stored latest-start-time or being equal to an updated latest-start-time which may be greater than a previously stored latest-start-time if the remaining computation times of one or more periodic processes with hard deadlines have decreased due to completion or partial completion of said one or more periodic processes with hard deadlines, and (D2) if each of said one or more uncompleted periodic processes with hard deadlines that have not overrun is able to start on or before its latest-start-time and the length of time that each of said one or more uncompleted periodic processes with hard deadlines that have not overrun is executed by said one or more processors is less than or equal to the length of its remaining worst-case computation time then satisfaction of said predetermined constraints for all said one or more uncompleted periodic processes with hard deadlines that have not overrun can be guaranteed, and (D3) each of said latest-start-times for one of said one or more uncompleted periodic processes with hard deadlines that have not overrun being equal to a beginning time of a time slot in a sequence of time slots on one or more processor time axes in a latest-start-time schedule, (D3.1) said latest-start-time schedule comprising mapping from the executions of said one or more uncompleted periodic processes with hard deadlines that have not overrun to said sequence of time slots on one or more processor time axes, each of the time slots in said sequence of time slots having a beginning time and an end time, each one of the time slots in said sequence of time slots being reserved for execution of one of said one or more uncompleted periodic processes with hard deadlines that have not overrun, the positions of the end time and the beginning time of each of the time slots in said sequence of time slots being such that the executions of said one or more uncompleted periodic processes with hard deadlines that have not overrun will satisfy said predetermined constraints, (D3.2) if an exclusion relation is defined between any first uncompleted periodic process with a hard deadline that has not overrun and any second uncompleted periodic process with a hard deadline that has not overrun and a first time slot being reserved for said any first uncompleted periodic process with a hard deadline that has not overrun and a second time slot being reserved for said any second periodic process with a hard deadline that has not overrun are either on different processor time axes or are on a same processor axis, then there will not exist any overlap in time between said first time slot and said second time slot in said latest-start-time schedule, (E) providing a run-time scheduler which is activated by interrupts generated by said single processor or multiprocessor timer interrupt mechanism in combination with said one or more timers, or activated at time zero or activated by the completion of a periodic process with a hard deadline, and which on each activation:

(E1) computes and stores in said memory one or more updated latest-start-times for said one or more uncompleted periodic processes with hard deadlines that have not overrun if (E1.1) there is enough time available to compute said one or more updated latest-start-times, and (E1.2) said one or more updated latest-start-times are greater than the latest-start-times most recently stored in said memory for said one or more uncompleted periodic processes with hard deadlines that have not overrun when the remaining computation times of said one or more periodic processes with hard deadlines have decreased due to completion or partial completion of said one or more periodic processes with hard deadlines, (E2) schedules for execution one or more particular uncompleted periodic processes with hard deadlines that have not overrun on one or more particular processors among said one or more processors at any particular time when the latest-start-time for each of said one or more particular uncompleted periodic processes with hard deadlines that have not overrun has been reached at said any particular time, (E3) allows preemption, at run-time, of the executions of one or more first specific periodic processes on one or more first processors by the executions of one or more second specific periodic processes at any appropriate time if the latest start time for each of said one or more second specific periodic processes has been reached and for each of said one or more first specific periodic processes either the latest start time of said each of said one or more first specific periodic processes has not been reached or said each of said one or more first specific periodic processes has already overrun at said any appropriate time,
and allows resumption, at run-time, of the execution of said each of said one or more first specific periodic processes on any available second processor at any later appropriate time wherein said any available second processor may either be different from or identical to any of said one or more first processors,
(E4) performs error handling if the deadline for any uncompleted periodic process with a hard deadline has been reached,
(E5) programs said single processor or multiprocessor timer interrupt mechanism to interrupt and re-activate the run-time scheduler at future times including
(E5.1) latest-start-times of uncompleted periodic processes with hard deadlines that have not overrun, and
(E5.2) deadlines of uncompleted periodic processes with hard deadlines,
(E6) allows any selected uncompleted periodic process with a hard deadline to overrun until the latest start time of another uncompleted periodic process with a hard deadline or until the deadline of said any selected uncompleted periodic process with a hard deadline has been reached,
(F) providing a plurality of input devices or systems which provide input signals that require processing by the periodic processes with hard deadlines, and
(G) providing a plurality of output devices or systems which receive the output results of a subset of the periodic processes with hard deadlines on or before the hard deadlines of said subset of the periodic processes with hard deadlines,
whereby during run-time any uncompleted periodic process with a hard deadline is permitted to overrun until the latest start time of another uncompleted periodic process with a hard deadline or until the deadline of said any uncompleted periodic process with a hard deadline has been reached, and the latest start times can be updated during run-time when their values can be increased due to completion or partial completion of one or more periodic processes with hard deadlines, so that uncompleted periodic processes with hard deadlines can utilize any spare processor capacity to overrun when needed, including spare capacity that becomes available when other periodic processes with hard deadlines underrun, and effectively utilize multiple processor resources by allowing process executions to be selectively preempted by other process executions and migrate from one processor to another processor at any time and as many times as necessary at run time to provide greater flexibility in utilizing any unused processor capacity, thus increasing the chances that uncompleted periodic processes with hard deadlines will still be able to complete their computations despite overrunning, while guaranteeing satisfaction of important predetermined timing constraints including deadlines for all uncompleted periodic processes with hard deadlines that have not overrun and including exclusion relations which prevent processes from concurrently accessing a shared data memory resource, reduce the chances of total system failure, and increase both processor utilization and system robustness in the presence of inaccurate estimates of the worst-case computation times of periodic processes with hard deadlines.

8. The method as defined in claim 7, wherein said latest-start-time schedule is generated by scheduling the uncompleted periodic processes with hard deadlines that have not overrun on a single processor or on a multiprocessor in reverse time order starting from a time that is equal to the latest deadline among the deadlines of the uncompleted periodic processes with hard deadlines that have not overrun, using a latest-release-time-first scheduling strategy that is equivalent to a reverse application of an earliest-deadline-first strategy which allows any first uncompleted periodic process with a hard deadline that has not overrun to preempt any second uncompleted periodic process with a hard deadline that has not overrun at any appropriate time if said any first uncompleted periodic process with a hard deadline that has not overrun and said any second uncompleted periodic process with a hard deadline that has not overrun do not access a shared data memory resource and which satisfies said predetermined constraints for uncompleted periodic processes with hard deadlines that have not overrun on a single processor or on a multiprocessor.

9. The method as defined in claim 7, wherein the run-time scheduler programs said single processor or multiprocessor timer interrupt mechanism to interrupt and re-activate the run-time scheduler at future times including release-times of uncompleted periodic processes with hard deadlines that have not overrun on a single processor or on a multiprocessor.

10. The method as defined in claim 7, wherein said predetermined constraints further include precedence relations, each precedence relation being defined between a first periodic process with a hard deadline and a second periodic process with a hard deadline in said plurality of periodic processes with hard deadlines, said second periodic process with a hard deadline cannot start execution before the end of the execution of said first periodic process with a hard deadline on a single processor or on a multiprocessor.

11. The method as defined in claim 8, wherein the run-time scheduler programs said single processor or multiprocessor timer interrupt mechanism to interrupt and re-activate the run-time scheduler at future times including release-times of uncompleted periodic processes with hard deadlines that have not overrun on a single processor or on a multiprocessor.

12. The method as defined in claim 8, wherein said predetermined constraints further include precedence relations, each precedence relation being defined between a first periodic process with a hard deadline and a second periodic process with a hard deadline in said plurality of periodic processes with hard deadlines, said second periodic process with a hard deadline cannot start execution before the end of the execution of said first periodic process with a hard deadline on a single processor or on a multiprocessor.

* * * * *